(12) United States Patent
Van Ee

(10) Patent No.: US 11,565,192 B2
(45) Date of Patent: Jan. 31, 2023

(54) LETTER CUBES

(71) Applicant: Jonathan Hendrik Van Ee, Dublin, CA (US)

(72) Inventor: Jonathan Hendrik Van Ee, Dublin, CA (US)

( * ) Notice: Subject to any disclaimer, the term of this patent is extended or adjusted under 35 U.S.C. 154(b) by 0 days.

(21) Appl. No.: 17/305,453

(22) Filed: Jul. 7, 2021

(65) Prior Publication Data

US 2022/0040590 A1    Feb. 10, 2022

Related U.S. Application Data

(60) Provisional application No. 62/706,231, filed on Aug. 6, 2020.

(51) Int. Cl.
| | |
|---|---|
| *A63H 33/08* | (2006.01) |
| *G09B 1/36* | (2006.01) |
| *A63H 33/06* | (2006.01) |
| *A63H 33/04* | (2006.01) |

(52) U.S. Cl.
CPC ......... *A63H 33/086* (2013.01); *A63H 33/062* (2013.01); *G09B 1/36* (2013.01); *A63H 33/046* (2013.01)

(58) Field of Classification Search
CPC .............................. A63H 33/086; A63H 33/08
USPC .......................................................... 446/124
See application file for complete search history.

(56) References Cited

U.S. PATENT DOCUMENTS

| | | | | |
|---|---|---|---|---|
| 176,144 | A * | 4/1876 | McDougall | A63F 9/0098 273/272 |
| 1,412,204 | A * | 4/1922 | Derby | G09B 17/00 273/156 |
| 1,472,536 | A * | 10/1923 | Thomson | A63H 33/108 446/117 |
| 1,895,611 | A * | 1/1933 | Doak | G09B 1/36 446/117 |
| D163,085 | S * | 5/1951 | Bishop | 446/128 |
| 2,885,822 | A * | 5/1959 | Onanian | A63H 33/101 174/138 D |
| 3,205,611 | A * | 9/1965 | Onanian | A63H 33/042 285/425 |
| 3,270,452 | A * | 9/1966 | D Elia | G09F 7/02 40/594 |
| 3,305,945 | A * | 2/1967 | Crawford | A63F 3/0423 273/156 |

(Continued)

*Primary Examiner* — Eugene L Kim
*Assistant Examiner* — Matthew B Stanczak

(57) ABSTRACT

The Letter Cubes are block to make buildings that do not just make a statement with their rooms, walls and the like, but also make verbal statements with the blocks themselves. It has a series of three-dimensional fonts made with metal, plastic, ceramic, glass, recycled materials and other materials that magnetically, with knobs, hooks, snaps and tubes (and combinations of these and other interfaces) assemble into walls, buildings and other structures that communicate messages. These alphabets also have a series of related pieces that include numbers, punctuation and additional knobs, beams and panels that enable construction of a wide range of buildings, toys, structures and objects that are artistic, toys, games and that are otherwise useful as boxes, chairs, tables, etc. The invention comes in its own box that is assembled further to the same logic as the alphabets so it does not have packaging waste.

3 Claims, 63 Drawing Sheets

(56) References Cited

U.S. PATENT DOCUMENTS

| | | | | |
|---|---|---|---|---|
| 3,488,881 A * | 1/1970 | Walter | A63H 33/08 | 446/95 |
| 3,822,487 A * | 7/1974 | Koch | G09B 17/00 | 40/620 |
| 3,903,617 A * | 9/1975 | Evans | G09B 17/00 | 434/171 |
| 4,003,144 A * | 1/1977 | Maddestra | A63F 9/0098 | 446/122 |
| 4,037,846 A * | 7/1977 | Zeeman | A63F 9/12 | 273/157 R |
| 4,129,960 A * | 12/1978 | Gale | A63H 33/088 | 446/128 |
| 4,182,072 A * | 1/1980 | Much | A63H 33/065 | 446/124 |
| 4,212,118 A * | 7/1980 | Baldwin | G09B 19/025 | 434/208 |
| 4,778,392 A * | 10/1988 | Mitchell | G09B 1/00 | 229/113 |
| 4,802,854 A * | 2/1989 | Davis | A63F 9/0098 | 446/124 |
| 5,000,713 A * | 3/1991 | Cheng | A63H 33/06 | 446/128 |
| 5,003,746 A * | 4/1991 | Wilston | A63H 33/08 | 52/592.1 |
| 5,223,316 A * | 6/1993 | Nemzin | G09F 7/08 | 428/45 |
| 5,275,567 A * | 1/1994 | Whitfield | G09B 21/003 | 434/112 |
| 5,306,198 A * | 4/1994 | Forman | A63H 33/10 | 446/124 |
| 5,447,433 A * | 9/1995 | Perry, Jr. | G09B 17/00 | 446/128 |
| 5,553,856 A * | 9/1996 | Barnard | A63F 9/0098 | 273/156 |
| 5,554,062 A * | 9/1996 | Goldsen | A63F 9/0098 | 446/124 |
| 5,567,159 A * | 10/1996 | Tehan | G09B 1/36 | 434/167 |
| 5,581,922 A * | 12/1996 | Heimann | G09B 1/36 | 40/605 |
| 5,702,105 A * | 12/1997 | Glikmann | A63F 9/0098 | 273/272 |
| 5,803,743 A * | 9/1998 | Kaufman | G09B 17/00 | 434/167 |
| 5,833,465 A * | 11/1998 | Jarzewiak | G09B 1/36 | 446/125 |
| 5,924,906 A * | 7/1999 | Grafton | A63H 33/10 | 446/124 |
| 6,029,974 A * | 2/2000 | Povitz | A63H 33/086 | 273/156 |
| 6,679,780 B1 * | 1/2004 | Shih | A63F 9/1204 | 273/156 |
| 6,685,477 B1 * | 2/2004 | Goldman | G09B 1/36 | 434/178 |
| 6,736,691 B1 * | 5/2004 | Bach | A63H 33/101 | 446/116 |
| 7,267,598 B2 * | 9/2007 | Glickman | A63H 33/086 | 446/124 |
| 7,452,211 B1 * | 11/2008 | Helsel | G09B 1/40 | 434/403 |
| 7,666,054 B2 * | 2/2010 | Glickman | A63H 33/086 | 446/124 |
| 8,746,699 B1 * | 6/2014 | Pruzan | A63F 9/0098 | 273/156 |
| D785,703 S * | 5/2017 | Skaggs | D19/59 | |
| 9,666,096 B2 * | 5/2017 | Tapia | G09B 1/02 | |
| 9,858,827 B2 * | 1/2018 | Shirvani | G09B 1/36 | |
| 10,376,804 B2 * | 8/2019 | Lu | F21V 23/001 | |
| 10,617,968 B2 * | 4/2020 | Davis | A63H 33/108 | |
| 2003/0162154 A1 * | 8/2003 | Hinshaw | G09B 1/36 | 434/171 |
| 2003/0234488 A1 * | 12/2003 | Povitz | A63F 9/1208 | 273/156 |
| 2005/0191932 A1 * | 9/2005 | Lin | A63H 33/086 | 446/85 |
| 2006/0048475 A1 * | 3/2006 | Lin | A63H 33/088 | 52/589.1 |
| 2011/0236119 A1 * | 9/2011 | Richer | B43K 27/04 | 401/35 |
| 2012/0309260 A1 * | 12/2012 | Coon | A63H 33/108 | 446/124 |
| 2013/0189653 A1 * | 7/2013 | Milne | G09B 1/36 | 434/159 |
| 2013/0302763 A1 * | 11/2013 | Edwards | G09B 5/06 | 434/362 |
| 2014/0011422 A1 * | 1/2014 | Channin | A63H 33/08 | 446/85 |
| 2014/0308872 A1 * | 10/2014 | Petillo | A63H 33/088 | 446/127 |
| 2015/0174502 A1 * | 6/2015 | Saigo | A63H 33/04 | 446/124 |
| 2015/0343320 A1 * | 12/2015 | Lee | A63H 33/086 | 446/120 |
| 2017/0178523 A1 * | 6/2017 | Shirvani | G09B 1/36 | |
| 2017/0283114 A1 * | 10/2017 | Marschall | B65D 21/0224 | |
| 2018/0056205 A1 * | 3/2018 | Lu | F21L 4/02 | |
| 2018/0240350 A1 * | 8/2018 | White | G09B 1/36 | |
| 2019/0299113 A1 * | 10/2019 | Lee | A63H 33/086 | |
| 2021/0027642 A1 * | 1/2021 | Dior | A63F 9/1208 | |
| 2021/0065581 A1 * | 3/2021 | Taylor | A63F 9/10 | |
| 2022/0040590 A1 * | 2/2022 | Van Ee | A63F 3/0423 | |

* cited by examiner

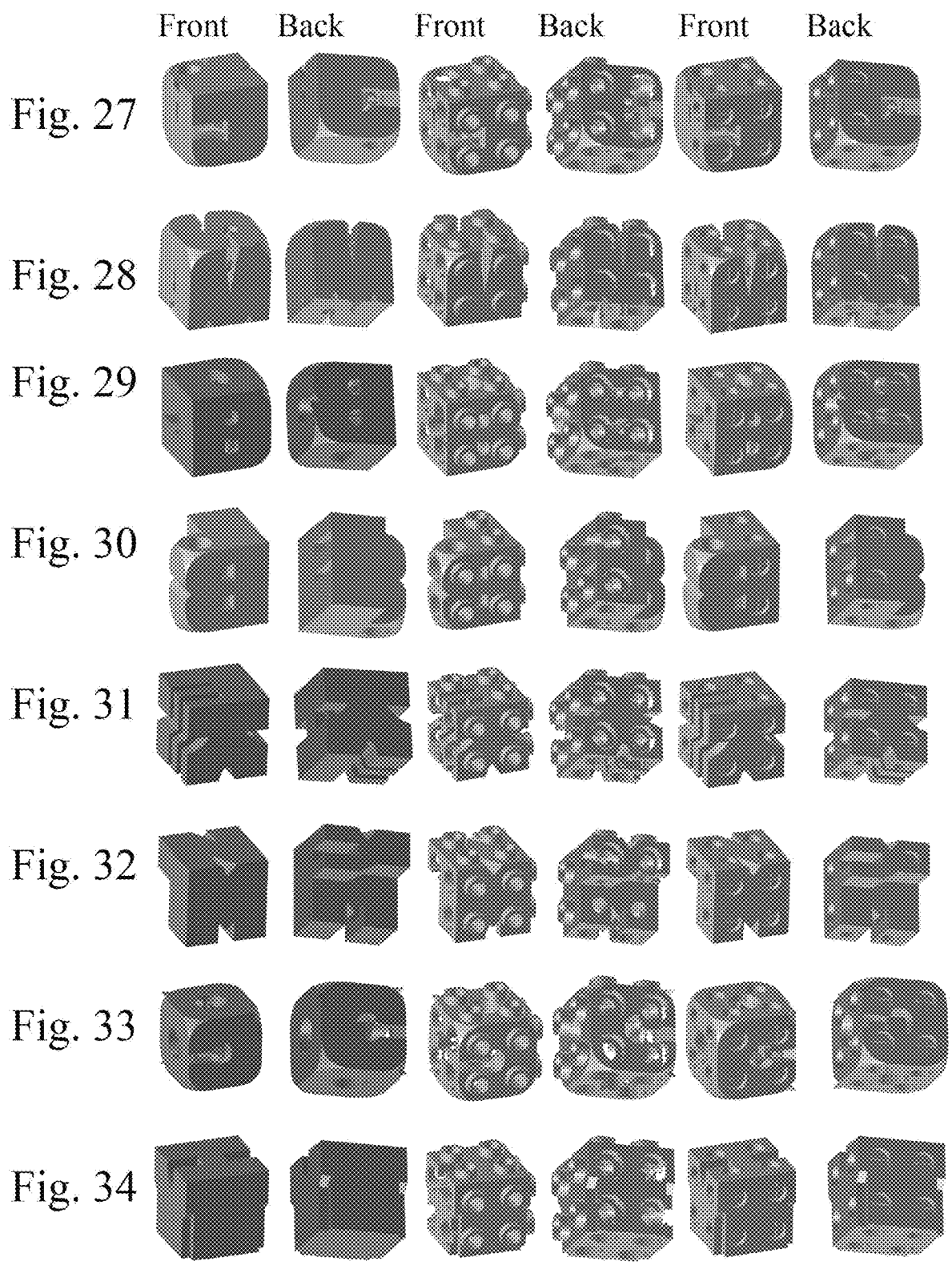

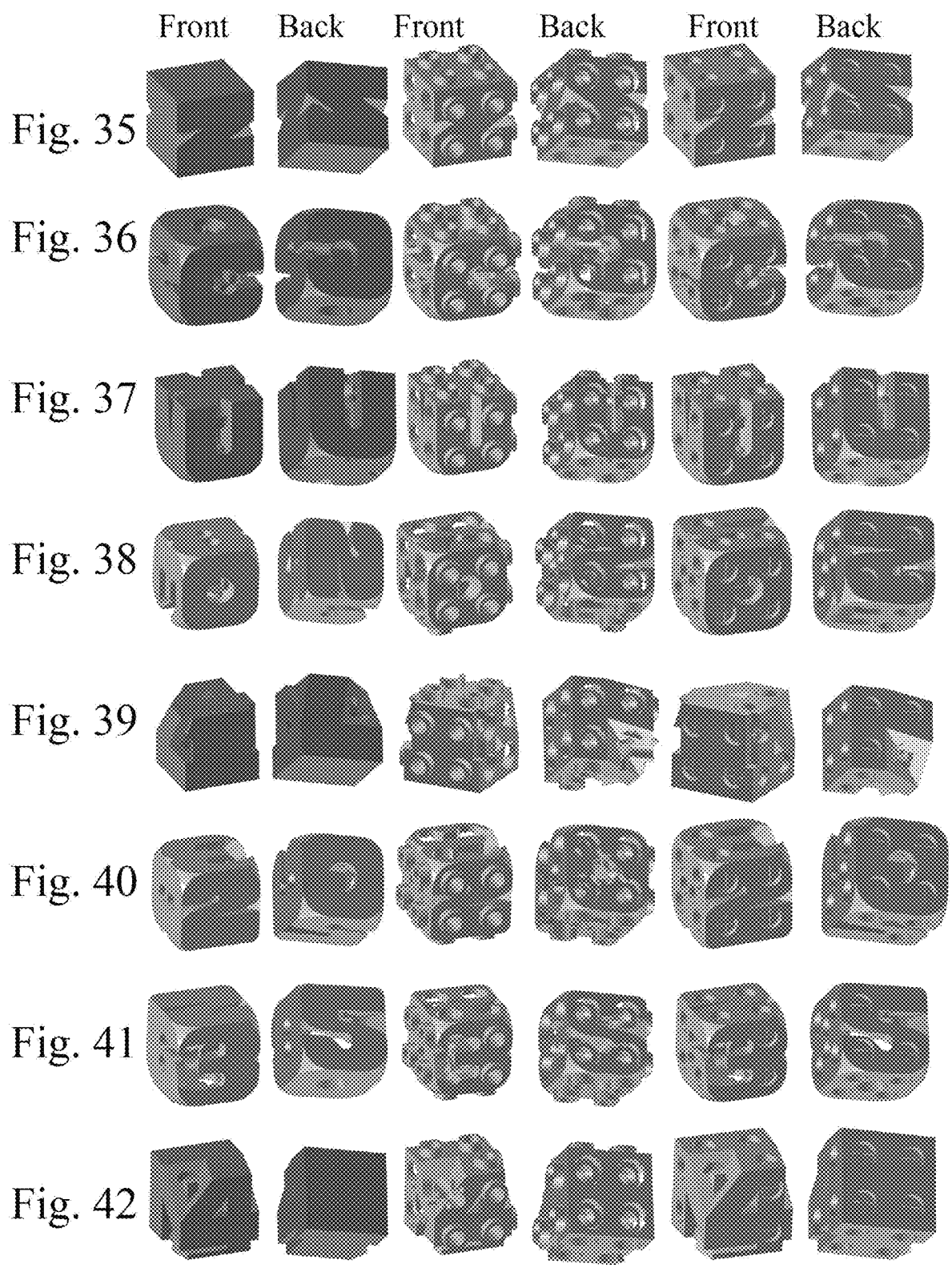

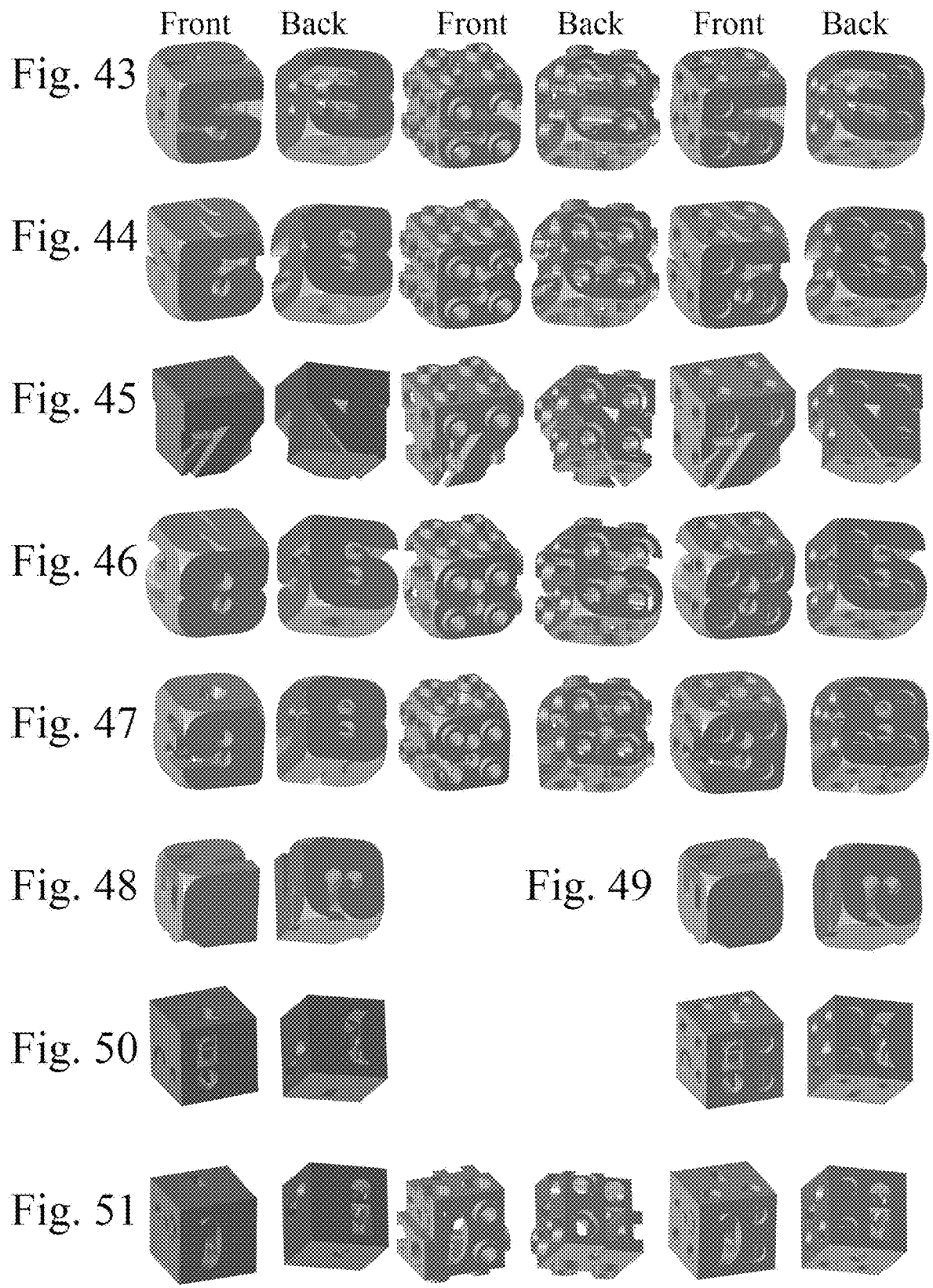

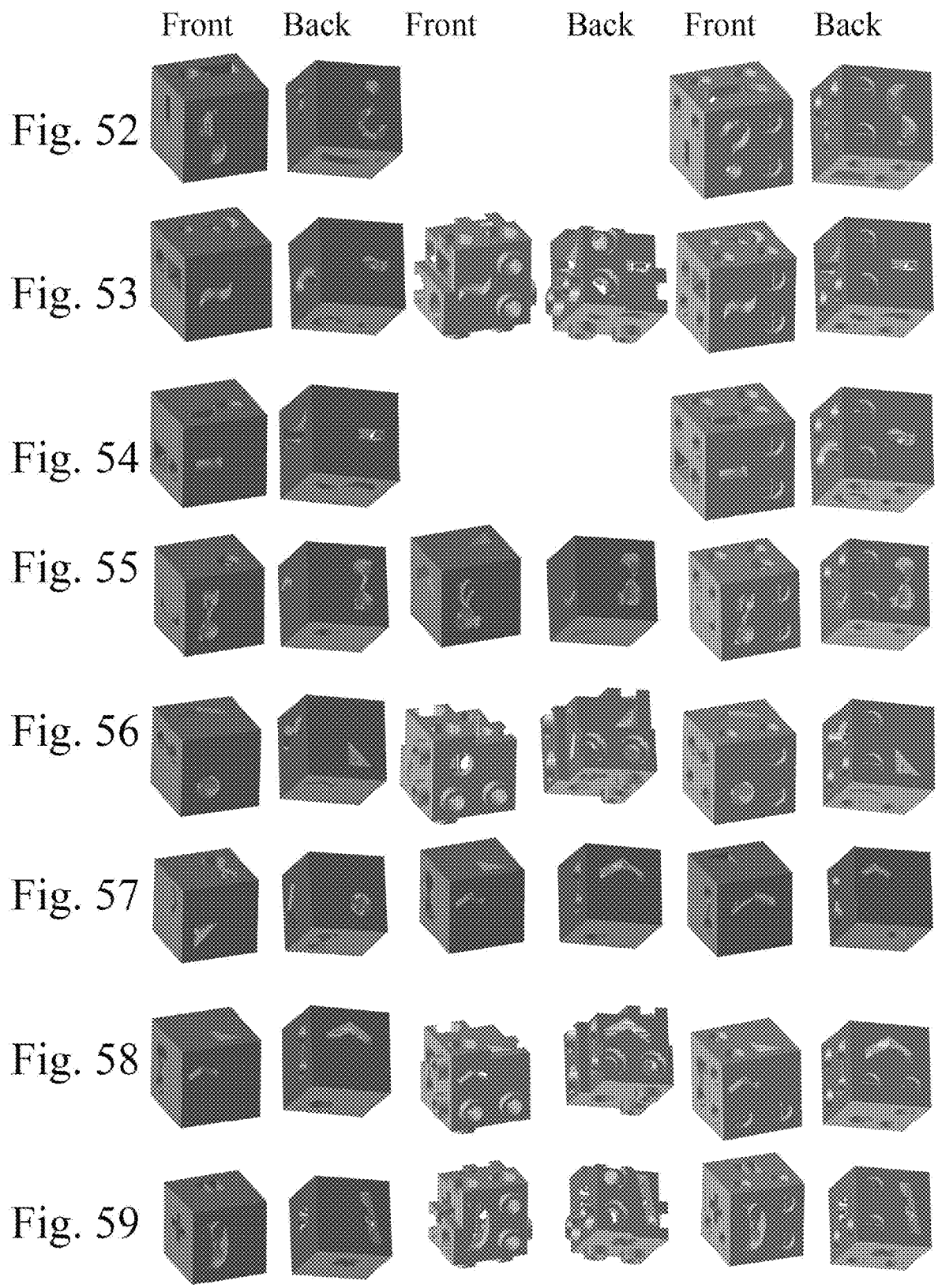

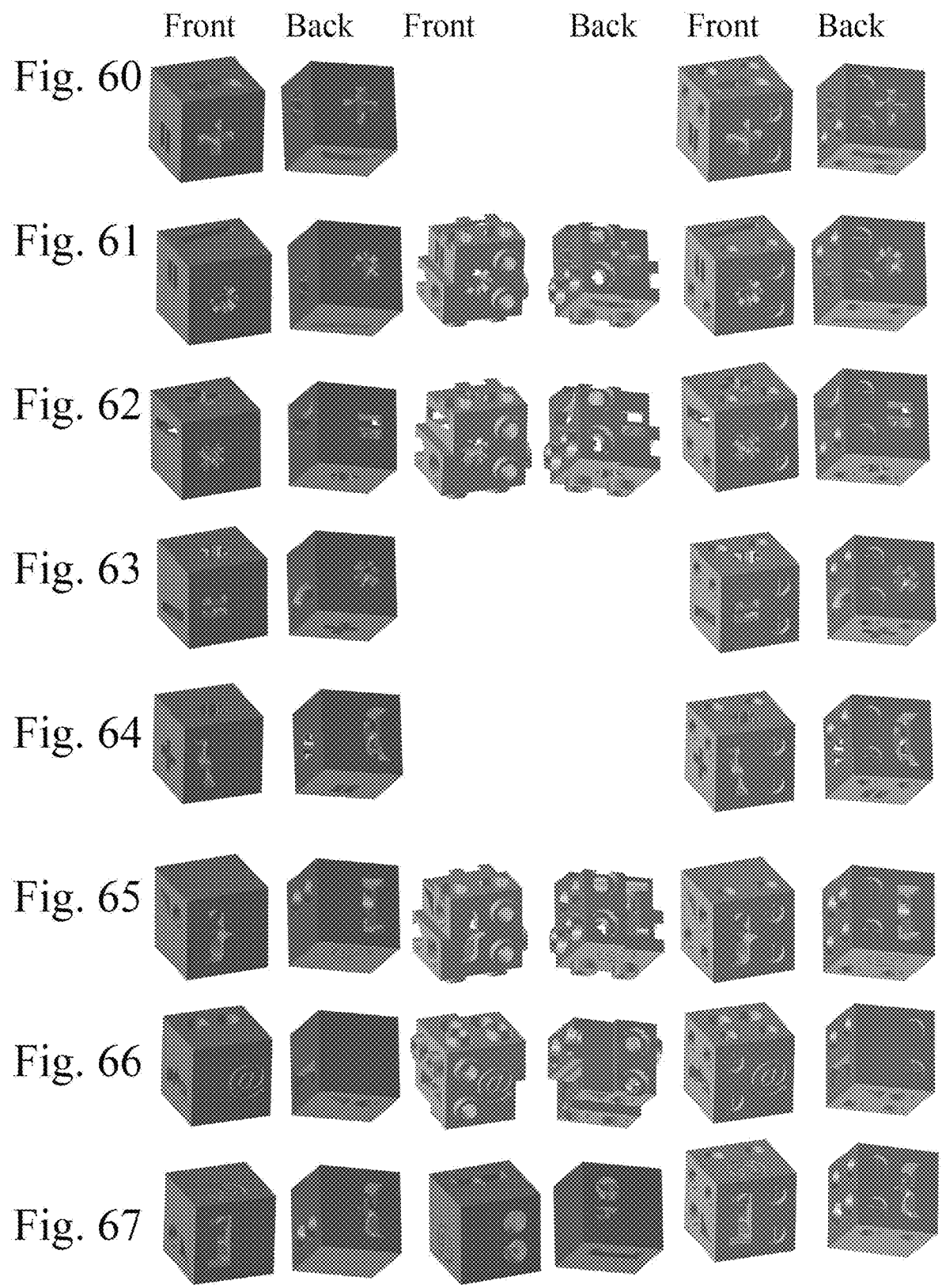

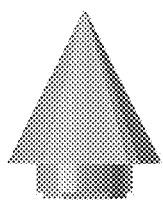 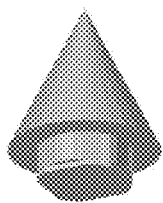 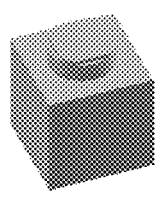 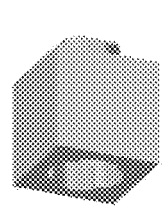
Fig. 84A    Fig. 84B    Fig. 85A    Fig. 85B
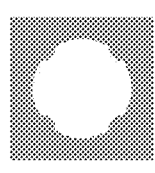 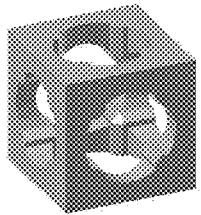 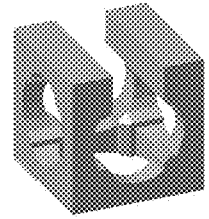 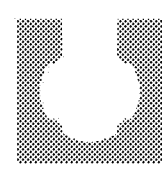
Fig. 86A    Fig. 86B    Fig. 87A    Fig. 87B
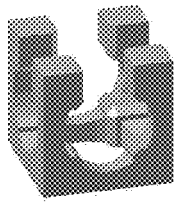 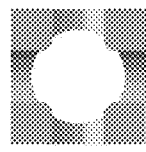 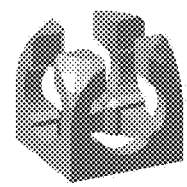 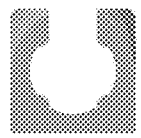
Fig. 88A    Fig. 88B    Fig. 89A    Fig. 89B
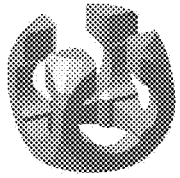 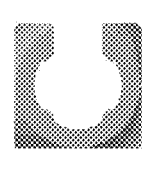 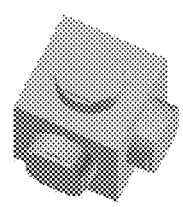 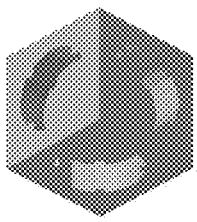
Fig. 90A    Fig. 90B    Fig. 91A    Fig. 91B

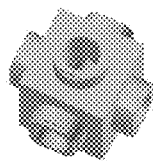 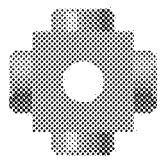 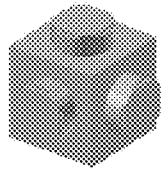 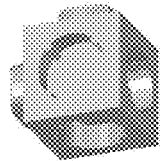
Fig. 92A    Fig. 92B    Fig. 93A    Fig. 93B
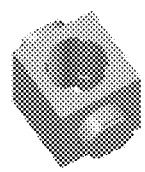 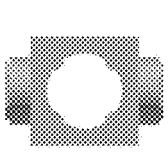 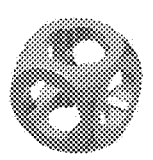 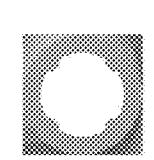
Fig. 94A    Fig. 94B    Fig. 95A    Fig. 95B
  
Fig. 96A    Fig. 96B    Fig. 96C
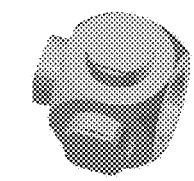 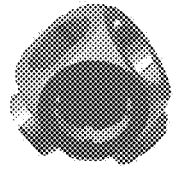 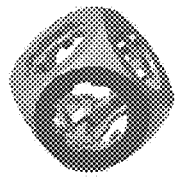
Fig. 97A    Fig. 97B    Fig. 98

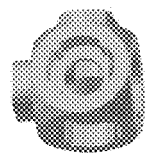 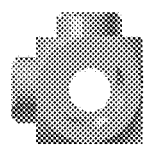 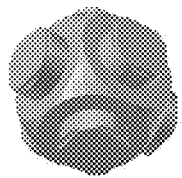
Fig. 99A	Fig. 99B	Fig. 100
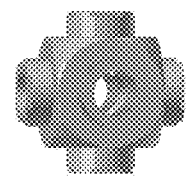 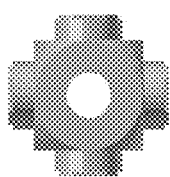 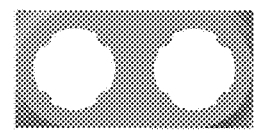 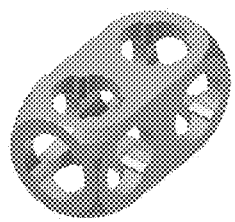
Fig. 101A	Fig. 101B	Fig. 102A	Fig. 102B
 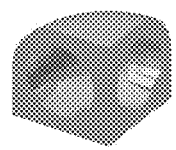 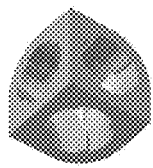 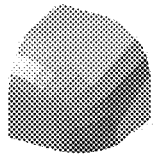
Fig. 103A	Fig. 103B	Fig. 104A	Fig. 104B
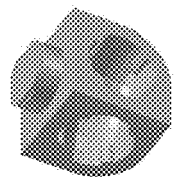 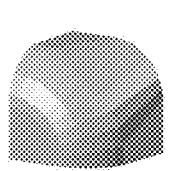 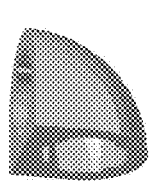 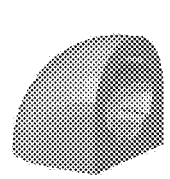
Fig. 105A	Fig. 105B	Fig. 106A	Fig. 106B

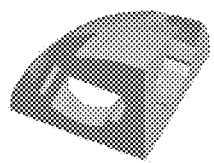 
Fig. 107A   Fig. 107B
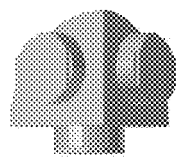 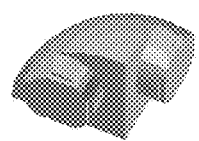 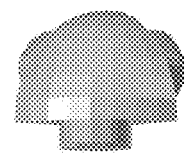
Fig. 108A   Fig. 108B   Fig. 108C
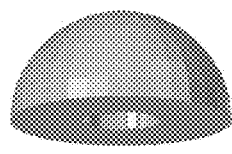 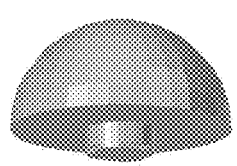 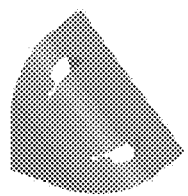 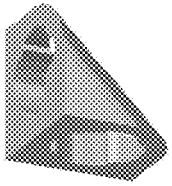
Fig. 109A   Fig. 109B   Fig. 110A   Fig. 110B
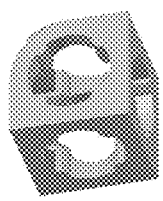 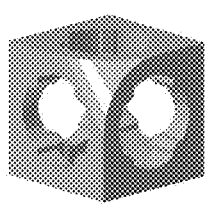 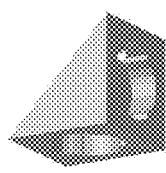 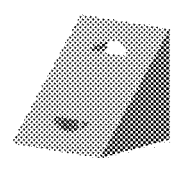
Fig. 111A   Fig. 111B   Fig. 112A   Fig. 112B
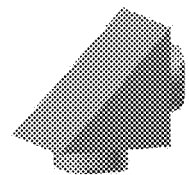 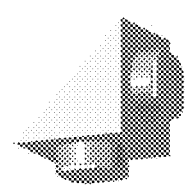
Fig. 113A   Fig. 113B

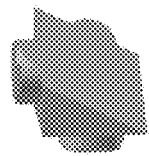 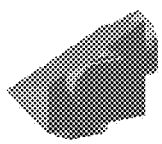 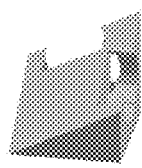 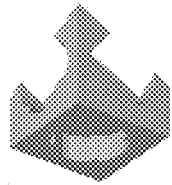
Fig. 114A    Fig. 114B    Fig. 115A    Fig. 115B
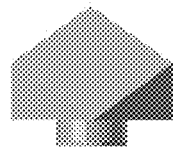 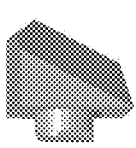  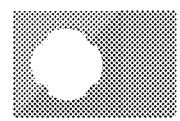
Fig. 116A    Fig. 116B    Fig. 117A    Fig. 117B
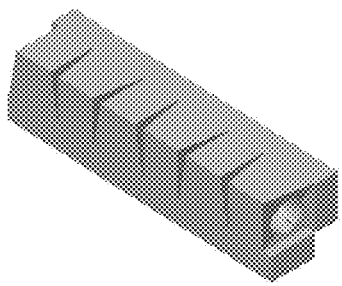
Fig. 118A
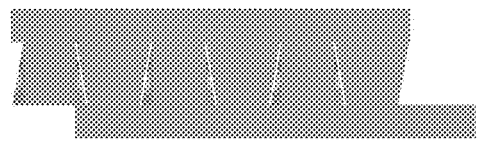
Fig. 118B
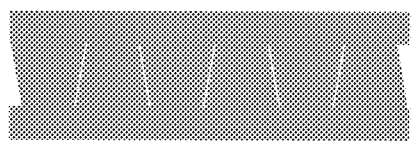
Fig. 118C

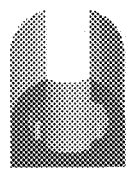 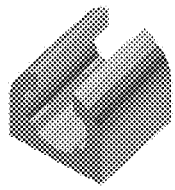 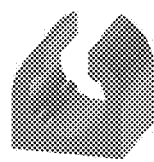 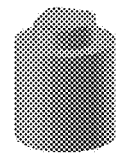
Fig. 126A  Fig. 126B  Fig. 126C  Fig. 127A
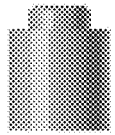  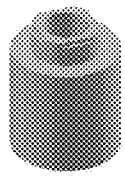 
Fig. 127B  Fig. 127C  Fig. 127D  Fig. 127E
 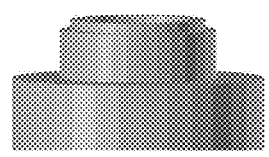 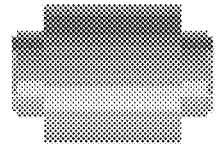 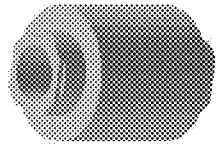
Fig. 128A  Fig. 128B  Fig. 129A  Fig. 129B
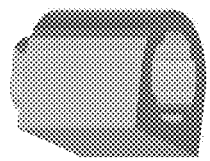 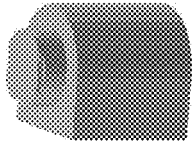 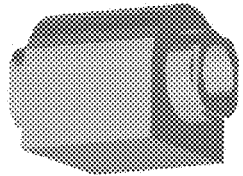 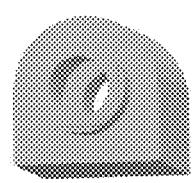
Fig. 130A  Fig. 130B  Fig. 131A  Fig. 131B
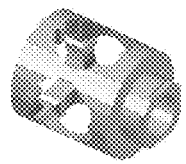 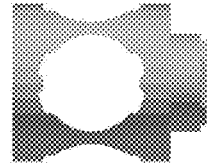
Fig. 132A  Fig. 132B

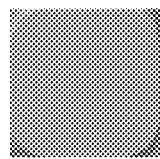 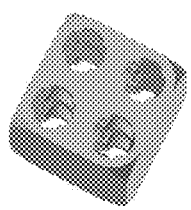 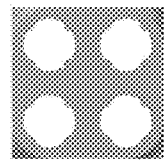 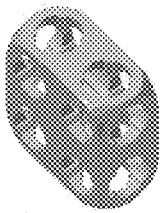
Fig. 139A  Fig. 139B  Fig. 140A  Fig. 140B
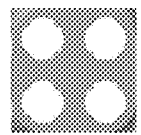 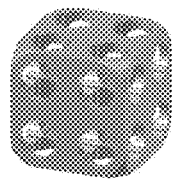 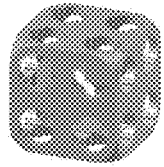 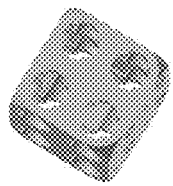
Fig. 141A  Fig. 141B  Fig. 142A  Fig. 142B
  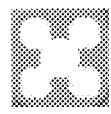 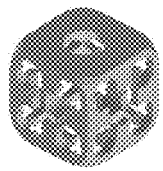
Fig. 143A  Fig. 143B  Fig. 143C  Fig. 144A
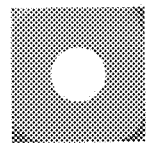  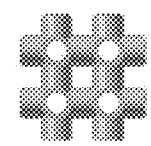 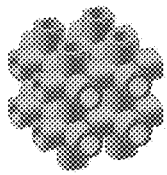
Fig. 144B  Fig. 145A  Fig. 145B  Fig. 146A
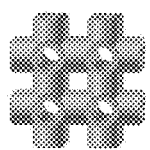
Fig. 146B

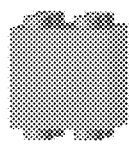 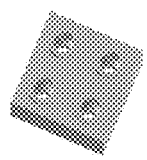 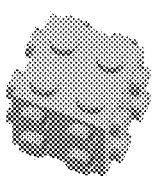 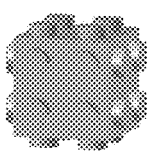
Fig. 147A    Fig. 147B    Fig. 148A    Fig. 148B
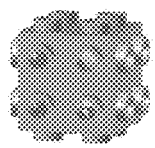  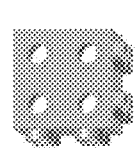 
Fig. 149A    Fig. 149B    Fig. 150A    Fig. 150B
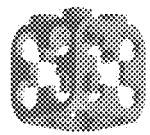 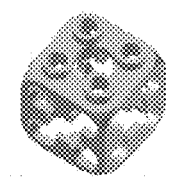 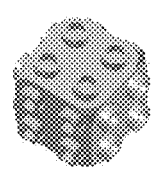 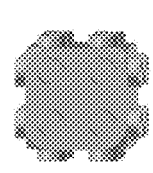
Fig. 151A    Fig. 151B    Fig. 152A    Fig. 152B
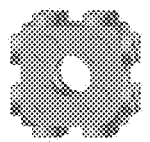 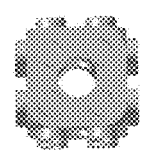 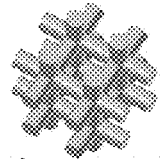 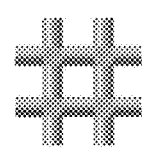
Fig. 153A    Fig. 153B    Fig. 154A    Fig. 154B

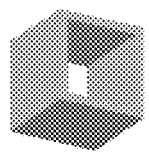 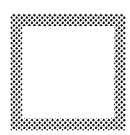  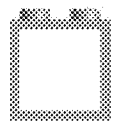
Fig. 155A          Fig. 155B          Fig. 156A          Fig. 156B
 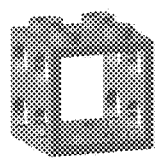 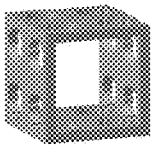 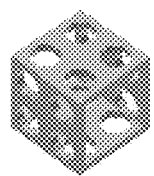
Fig. 157A          Fig. 157B          Fig. 158A          Fig. 158B
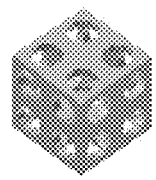 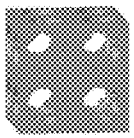 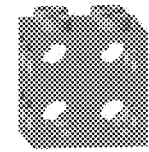 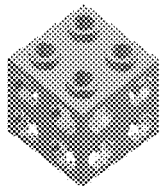
Fig. 159A          Fig. 159B          Fig. 160A          Fig. 160B
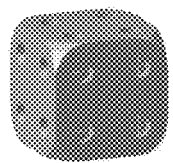 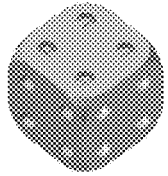 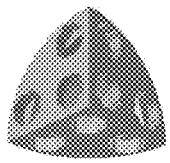 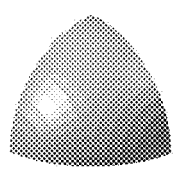
Fig. 161A          Fig. 161B          Fig. 162A          Fig. 162B
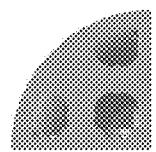
Fig. 162C

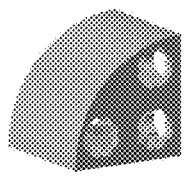 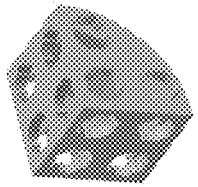 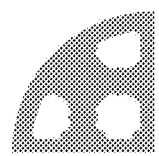 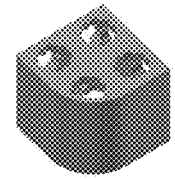 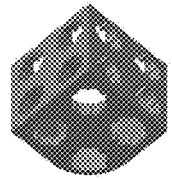
Fig. 163A    Fig. 163B    Fig. 163C    Fig. 164A    Fig. 164B
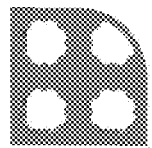 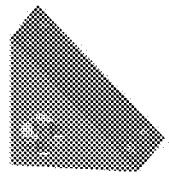 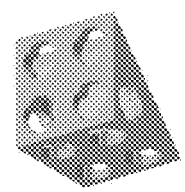 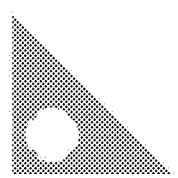
Fig. 164C    Fig. 165A    Fig. 165B    Fig. 165C
  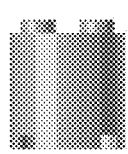 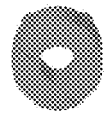
Fig. 166A    Fig. 166B    Fig. 166C    Fig. 167A
   
Fig. 167B    Fig. 167C    Fig. 167D    Fig. 168A
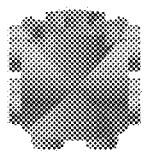 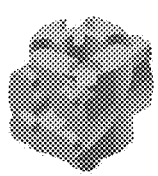 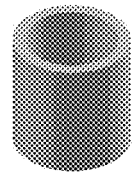 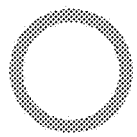
Fig. 168B    Fig. 168C    Fig. 169A    Fig. 169B

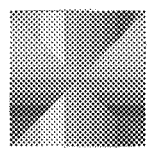 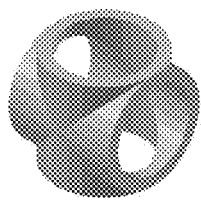 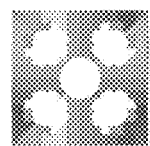 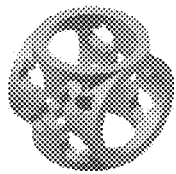
Fig. 185A    Fig. 185B    Fig. 186A    Fig. 186B
 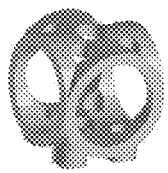 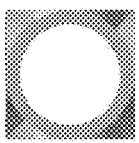 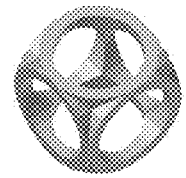
Fig. 187A    Fig. 187B    Fig. 188A    Fig. 188B
 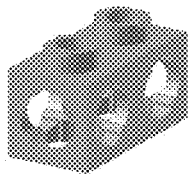  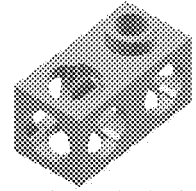
Fig. 189A    Fig. 189B    Fig. 190A    Fig. 190B
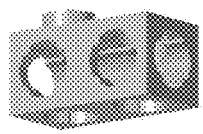 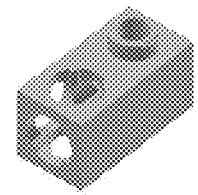 
Fig. 191A    Fig. 191B    Fig. 192A
Fig. 192B

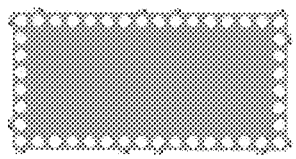
Fig. 199A
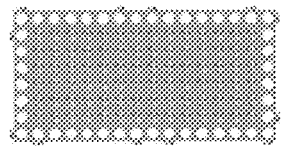
Fig. 199B
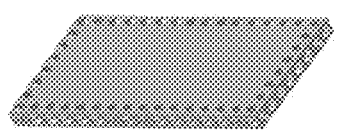
Fig. 200
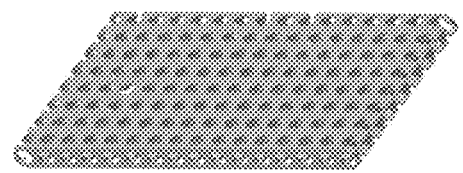
Fig. 201A
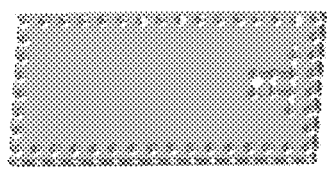
Fig. 201B
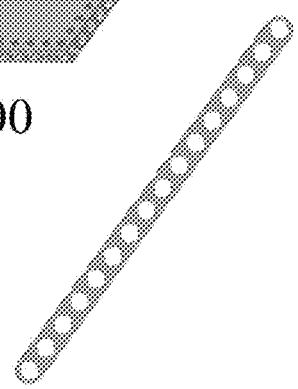
Fig. 201C
Fig. 202A
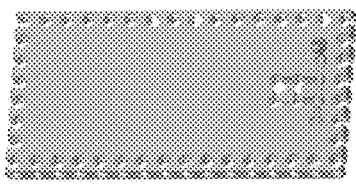
Fig. 204A
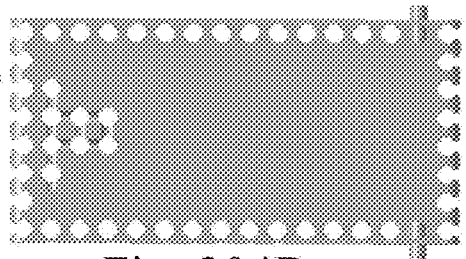
Fig. 204B
Fig. 202B
Fig. 203
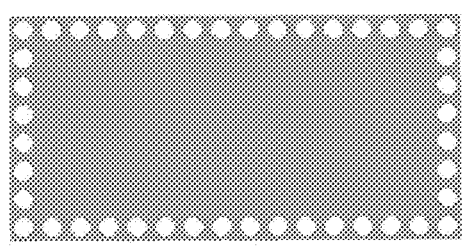
Fig. 205A
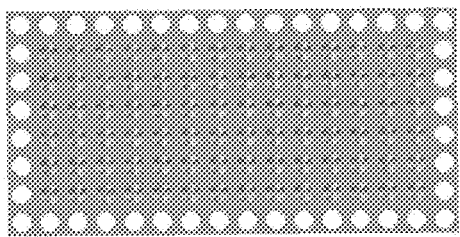
Fig. 205B

LETTER CUBES

BACKGROUND OF THE INVENTION

Field of the Invention

Letter Cubes are a versatile building block system comprised of a series of three-dimensional fonts made with metal, plastic, ceramic, glass and other materials that magnetically, with knobs, hooks, snaps and tubes (and combinations of these and other interfaces) assemble into walls, buildings and other structures that communicate messages (Letter Cubes are referred to herein as the "Invention").

Description of Related Art

Rudimentary three-dimensional fonts have served as toys that children play with.

Ceramic tiles have been used on buildings to communicate messages while not being a building block system of their own.

BRIEF SUMMARY OF THE INVENTION

The Invention is a building block system that empowers builders to make architectural statements with their buildings while making verbal statements with their buildings at the same time.

With a system of tubes within the font building blocks builders can lay wires, pipes, air ducts and transport building materials while also inserting additional reinforcement beams or beams that lock blocks together.

The font building blocks are stable when stacked on, or next to, each other to form words and sentences that also build objects, toys and buildings.

The Invention can be hollow, allowing the pieces to float.

The Invention comes in a box that is itself a building block that can be assembled and disassembled, thereby eliminating packaging waste.

BRIEF DESCRIPTION OF THE SEVERAL VIEWS OF THE DRAWINGS

FIG. 27 is upper case "A," "J" and "R" that also form equilateral cubes that are stable building blocks with male and female knob interfaces, recesses for magnets and smooth surfaces.

FIG. 28 is upper case "A," "M," "S," and the number "2" that also form equilateral cubes that are stable building blocks with male and female knob interfaces, recesses for magnets and smooth surfaces.

FIG. 29 is upper case "B," "C" and "D" that also form equilateral cubes that are stable building blocks with male and female knob interfaces, recesses for magnets and smooth surfaces.

FIG. 30 is upper case "B," "P" and "E" that also form equilateral cubes that are stable building blocks with male and female knob interfaces, recesses for magnets and smooth surfaces.

FIG. 31 is upper case "K" and "E" that also form equilateral cubes that are stable building blocks with male and female knob interfaces, recesses for magnets and smooth surfaces.

FIG. 32 is upper case "L," "M," "N," and "Z" that also form equilateral cubes that are stable building blocks with male and female knob interfaces, recesses for magnets and smooth surfaces.

FIG. 33 is upper case "C," "O" and "Q" that also form equilateral cubes that are stable building blocks with male and female knob interfaces, recesses for magnets and smooth surfaces.

FIG. 34 is upper case "H," "T" and "Y" that also form equilateral cubes that are stable building blocks with male and female knob interfaces, recesses for magnets and smooth surfaces.

FIG. 35 is upper case "Z," "N" and a blank surface (that serves as a space between letters of different words) that also form equilateral cubes that are stable building blocks with male and female knob interfaces, recesses for magnets and smooth surfaces.

FIG. 36 is upper case "C," "O" and the number "2" that also form equilateral cubes that are stable building blocks with male and female knob interfaces, recesses for magnets and smooth surfaces.

FIG. 37 is upper case "U," "V" and "X" that also form equilateral cubes that are stable building blocks with male and female knob interfaces, recesses for magnets and smooth surfaces.

FIG. 38 is the number "O" in equilateral cubes that are stable building blocks with male and female knob interfaces, recesses for magnets and smooth surfaces.

FIGS. 39 through 47 follow the same logic as FIG. 38 except for numbers 2 through 9.

FIG. 48 is a six-sided equilateral cube with rounded corners whose sides also form each of the six numbers on a dice (i.e., numbers zero through six).

FIG. 49 is also a six-sided equilateral cube, but with pointed corners, whose sides also form each of the six numbers on a dice (i.e., numbers zero through six).

FIG. 50 is the punctuation symbols "!" ")" and "~" in equilateral cubes that are stable building blocks with recesses for magnets and smooth surfaces.

FIG. 51 is the punctuation symbols "!" "(" and "–" in equilateral cubes that are stable building blocks with recesses for magnets and smooth surfaces.

FIG. 52 is the punctuation symbols "$" "?" and "–" in equilateral cubes that are stable building blocks with recesses for magnets and smooth surfaces.

FIG. 53 is the punctuation symbols "!" "?" and "~" in equilateral cubes that are stable building blocks with male and female knob interfaces, recesses for magnets and smooth surfaces.

FIG. 54 is the punctuation symbols "!" "$" "~" and "–" in equilateral cubes that are stable building blocks with recesses for magnets and smooth surfaces.

FIG. 55 is the punctuation symbols "%" "&" and "<" in equilateral cubes that are stable building blocks with male and female knob interfaces, recesses for magnets and smooth surfaces.

FIG. 56 is the punctuation symbols "." "%" and ">" in equilateral cubes that are stable building blocks with male and female knob interfaces, recesses for magnets and smooth surfaces.

FIG. 57 is the punctuation symbols """ "," and "&" in equilateral cubes that are stable building blocks with male and female knob interfaces, recesses for magnets and smooth surfaces.

FIG. 58 is the punctuation symbols "%" ">" """ and "," in equilateral cubes that are stable building blocks with male and female knob interfaces, recesses for magnets and smooth surfaces.

FIG. 59 is the punctuation symbols "(" "+" and "=" in equilateral cubes that are stable building blocks with male and female knob interfaces, recesses for magnets and smooth surfaces.

FIG. 60 is the punctuation symbols "!" "?" and "~" in equilateral cubes that are stable building blocks with male and female knob interfaces, recesses for magnets and smooth surfaces.

FIGS. 61 through 69 are punctuation symbols that follow the same building-block logic as the punctuation symbols in FIGS. 50 through 33.

FIG. 84A is another view of FIG. 84B. FIGS. 84A through 116A are additional basic building blocks with male and female knobs that assemble into structures of basic shapes like spheres, slanted or curved sides, etc.

FIG. 84B is a basic building block with one or more male knobs.

FIG. 85A is a basic building block with a male and female knob.

FIG. 85B is another view of FIG. 85A.

FIG. 86A is a basic building block with female knobs.

FIG. 86B is another view of FIG. 86A.

FIG. 87A is a basic building block with female knobs.

FIG. 87B is another view of FIG. 87A.

FIG. 88A is a basic building block with female knobs.

FIG. 88B is another view of FIG. 88A.

FIG. 89A is a basic building block with female knobs.

FIG. 89B is another view of FIG. 89A.

FIG. 90A is a basic building block with female knobs.

FIG. 90B is another view of FIG. 90A.

FIG. 91A is a basic building block with male and female knobs. FIGS. 91A-116B are basic building blocks with male and female knobs.

FIG. 91B is another view of FIG. 91A.

FIG. 92A is a basic building block with male knobs.

FIG. 92B is a profile view from the side of FIG. 91A.

FIG. 93A is a basic building block with male and female knobs.

FIG. 93B is another view of FIG. 93A.

FIG. 94A is a basic building block with male and female knobs.

FIG. 94B is a side profile view of FIG. 94A.

FIG. 95A is a basic building block with female knobs.

FIG. 95B is a side profile view of FIG. 95A.

FIG. 96A is a basic building block with a male knob.

FIG. 96B is another view of FIG. 96A.

FIG. 96C is another view of FIG. 96B.

FIG. 97A is a basic building block with male and female knobs.

FIG. 97B is another view of FIG. 97A.

FIG. 98 is a basic building block with female knobs.

FIG. 99A is a basic building block with male and female knobs.

FIG. 99B is a side profile view of FIG. 99A.

FIG. 100 is a basic building block with male knobs.

FIG. 101A is a basic building block with hollow male knobs.

FIG. 101B is a side profile view of FIG. 101A.

FIG. 102A is a basic building block with female knobs.

FIG. 102B is another view of FIG. 102A.

FIG. 103A is a basic building block with female knobs.

FIG. 103B is another view of FIG. 103A.

FIG. 104A is a basic building block with female knobs.

FIG. 104B is another view of FIG. 104A.

FIG. 105A is a basic building block with one or more male female knobs.

FIG. 105B is another view of FIG. 105A.

FIG. 106A is a basic building block with female knobs.

FIG. 106B is another view of FIG. 106A.

FIG. 107A is a basic building block with female knobs.

FIG. 107B is another view of FIG. 107A.

FIG. 108A is a basic building block with male knobs.

FIG. 108B is another view of FIG. 108A.

FIG. 108C is a view of the back side of FIG. 108A.

FIG. 109A is a basic building block with a female knob.

FIG. 109B is a basic building block with a male knob.

FIG. 110A is a basic building block with female knobs.

FIG. 110B is another view of FIG. 110A.

FIG. 111A is a basic building block with female knobs.

FIG. 111B is another view of FIG. 111A.

FIG. 112A is a basic building block with female knobs.
FIG. 112B is another view of FIG. 112A.
FIG. 113A is a basic building block with male knobs.
FIG. 113B is another view of FIG. 113A.
FIG. 114A is a basic building block with male knobs.
FIG. 114B is another view of FIG. 114A.
FIG. 115A is a basic building block with female knobs.
FIG. 115B is another view of FIG. 115A.
FIG. 116A is a basic building block with a male knob.
FIG. 116B is another view of FIG. 116A.
FIG. 117A is a stick with hollow cube protrusions that also have a dovetail shape.
FIG. 117B is a profile view from aside of FIG. 117A.
FIG. 118A is demonstration of how FIG. 117A fits into itself reversibly in a perpendicular arrangement (FIG. 118A) and in horizontal arrangements in an off-set manner (FIG. 118B) and in a fully aligned manner (FIG. 118C).
FIG. 118B is a demonstration of how FIG. 117A fits into itself in a horizontal arrangement in an off-set manner.
FIG. 118C is a demonstration of how FIG. 117A fits into itself in a fully aligned manner.
FIGS. 119 through 131 are male and female knob building blocks in a mostly cylindrical shape.
FIG. 126A is a building block with female knobs.
FIG. 126B is a different view of FIG. 126A.
FIG. 126C is a different view of FIG. 126A.
FIG. 127A is a building block with a male and female knob.
FIG. 127B is a profile view from the side of FIG. 127A.
FIG. 127C is a view from the bottom of FIG. 127A.
FIG. 127D is a view from the top of FIG. 127A.
FIG. 127E is another view from the bottom of FIG. 127A.
FIG. 128A is a building block with a male and female knob.
FIG. 128B is a close-up view of the male knob on FIG. 128A.
FIG. 129A is a building block with male knobs.
FIG. 129B is another view of FIG. 129A.
FIG. 130A is a building block with a male and female knob.
FIG. 130B is another view of FIG. 130A.
FIG. 131A is a building block with male knobs.
FIG. 131B is another view of FIG. 131A.
FIGS. 132A through 138A are cylinder cubes (their height is the same as their diameter) that efficiently build three dimensional shapes by fitting into itself with knobs, hooks and screws.
FIG. 132A is a top side view of a cylinder cube.
FIG. 132B is a side profile view of FIG. 132A.
FIG. 138A is a panel with a knob on it that gives constructions made with cylinders in FIGS. 132A through 138A flatter surfaces.
FIG. 139A is a profile view of a side of FIG. 139B.
FIGS. 139A through 191A are basic building blocks with the same general features as those in FIGS. 70A through 116A except that they are mostly eight times larger by being twice the length, height and depth as the objects in FIGS. 70A through 116A.
FIG. 139B is a basic building block.
FIG. 140A is a profile view of FIG. 140B.
FIG. 140B is another basic building block.
FIG. 141A is a profile view of FIG. 141B.
FIG. 141B is another basic building block.
FIG. 142A is another basic building block.
FIG. 142B is another view of FIG. 142A.
FIG. 143A is another basic building block.
FIG. 143B is another view of FIG. 143A.
FIG. 143C is another view of FIG. 143A.
FIG. 144A is another basic building block.
FIG. 144B is a profile view from the side of FIG. 144A.
FIG. 145A is another basic building block.
FIG. 145B is a profile view of FIG. 145A.
FIG. 146A is another basic building block.
FIG. 146B is a near-profile view of FIG. 146A.
FIG. 147A is another basic building block.
FIG. 147B is another view of FIG. 147A.
FIG. 148A is a basic building block.
FIG. 148B is another view of FIG. 148A.
FIG. 149A is a basic building block.
FIG. 149B is another view of FIG. 149A.
FIG. 150A is a basic building block.
FIG. 150B is another view of FIG. 150A.
FIG. 151A is a basic building block.
FIG. 151B is another view of FIG. 151A.
FIG. 152A is a basic building block.
FIG. 152B is another view of FIG. 152A.
FIG. 153A is a basic building block.
FIG. 153B is another view of FIG. 153A.
FIG. 154A is a basic building block.
FIG. 154B is a profile view of FIG. 154A.
FIG. 155A is a basic building block.
FIG. 155B is a profile view of an open side of FIG. 155A.
FIG. 156A is a basic building block.
FIG. 156B is a profile view of an open side of FIG. 156A.
FIG. 157A is a basic building block.
FIG. 157B is another view of FIG. 157A.
FIG. 158A is a basic building block.
FIG. 158B is another view of FIG. 158A.
FIG. 159A is a basic building block.
FIG. 159B is another view of FIG. 159A.
FIG. 160A is a basic building block.
FIG. 160B is another view of FIG. 160A.

Figure 170A:
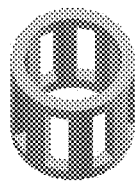
Figure 170B:
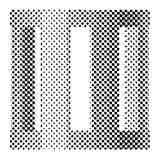
Figure 171A:
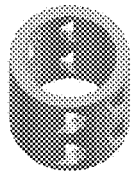
Figure 171B:
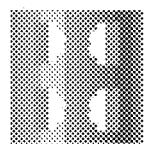
Figure 172A:
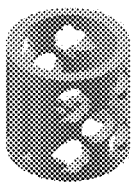
Figure 172B:
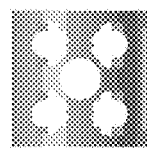
Figure 173A:
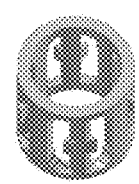
Figure 173B:
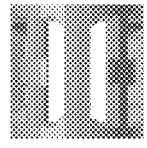
Figure 174A:
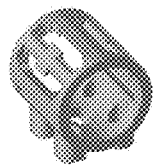
Figure 174B:
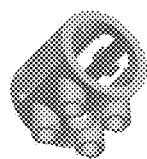
Figure 174C:
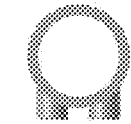
Figure 175A:
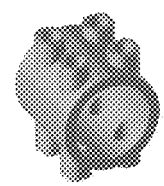
Figure 175B:
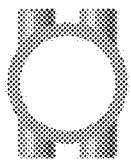
Figure 176A:
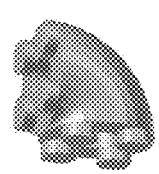
Figure 176B:
Figure 176C:
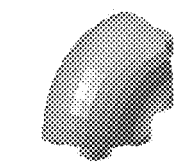
Figure 177A:
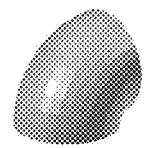
Figure 177B:
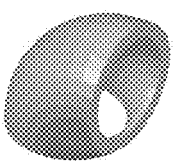
Figure 178A:
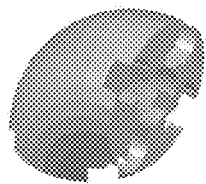
Figure 178B:
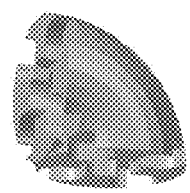
Figure 178C:
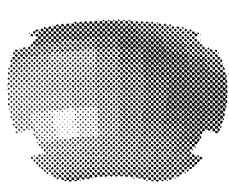
Figure 179A:
Figure 179B:
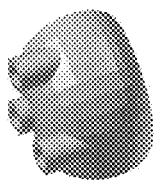
Figure 180A:
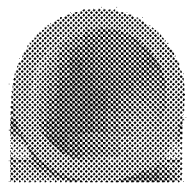
Figure 180B:
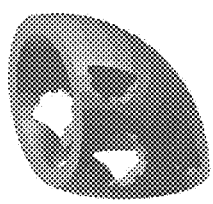
Figure 181A:
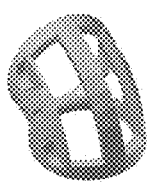
Figure 181B:
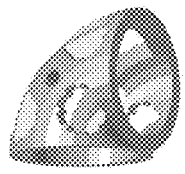
Figure 181C:
Figure 181D:
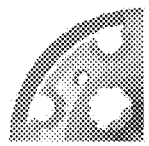
Figure 181E:
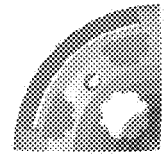
Figure 182A:
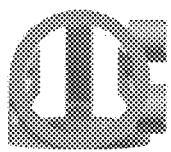
Figure 182B:
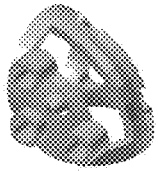
Figure 183A:
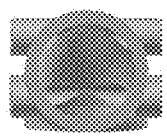
Figure 183B:
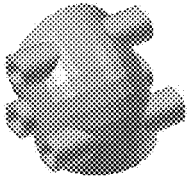
Figure 184A:
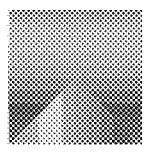
Figure 184B:
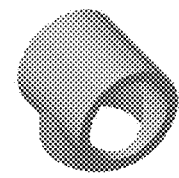
Figure 193A:
Figure 193B:
Figure 193C:
Figure 193D:
Figure 194A:
Figure 194B:
Figure 195A:
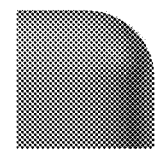
Figure 195B:
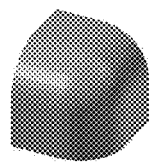
Figure 195C:
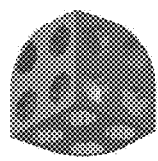
Figure 196A:
Figure 196B:
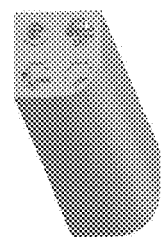
Figure 197A:
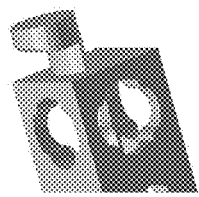
Figure 197B:
Figure 198A:
Figure 198B:
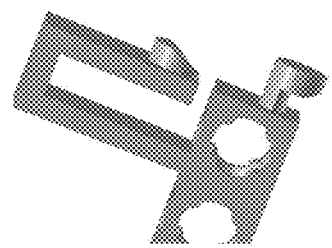
Figure 206A:
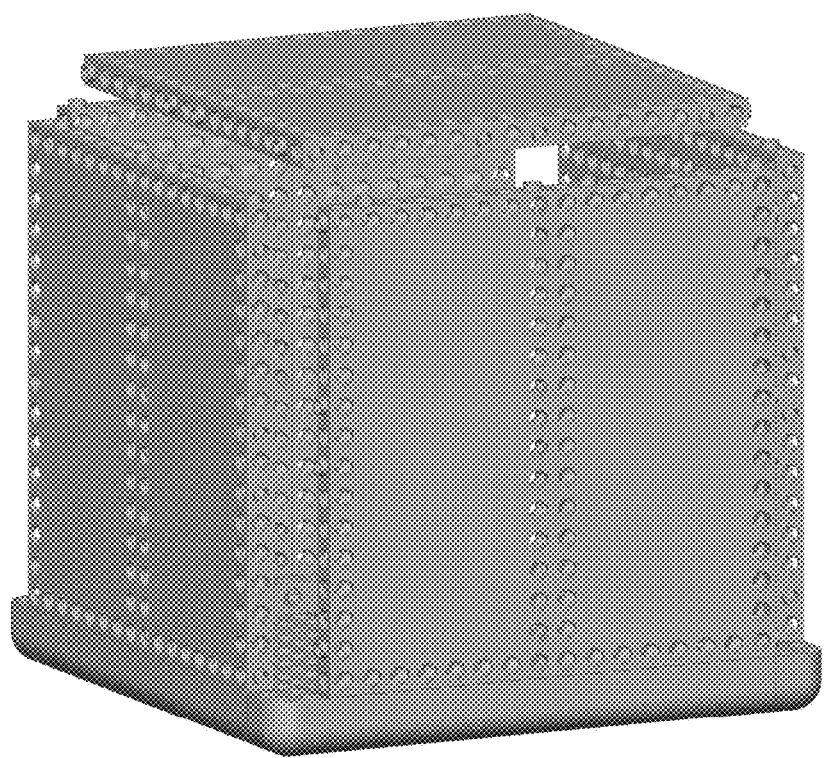
Figure 206B:
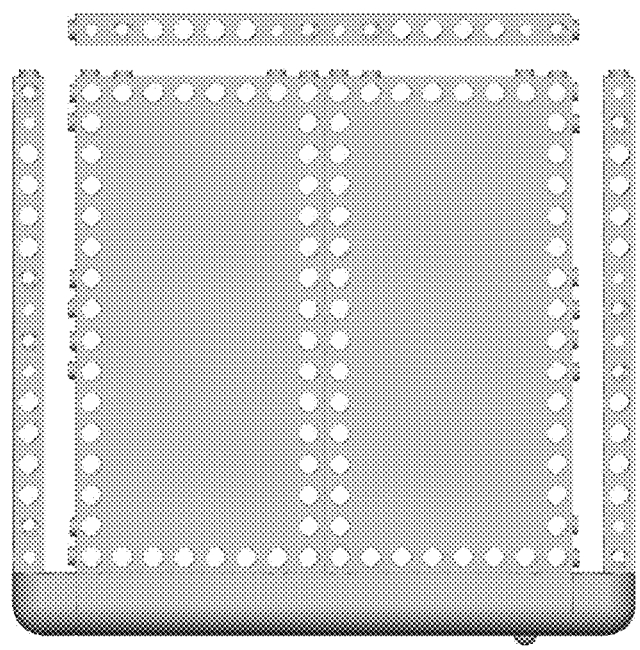
Figure 206C:
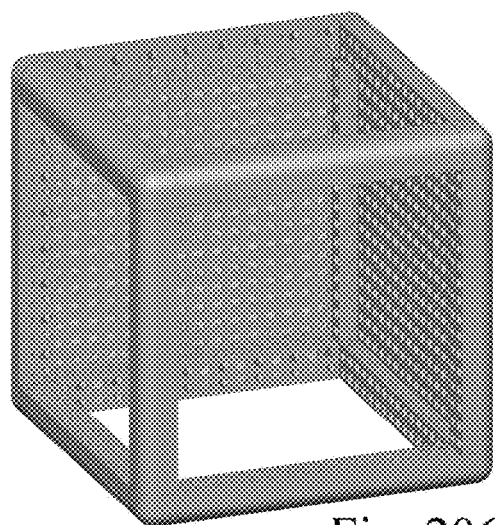
Figure 206D:
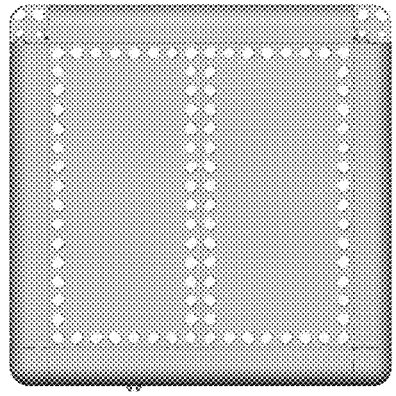
Figure 206E:
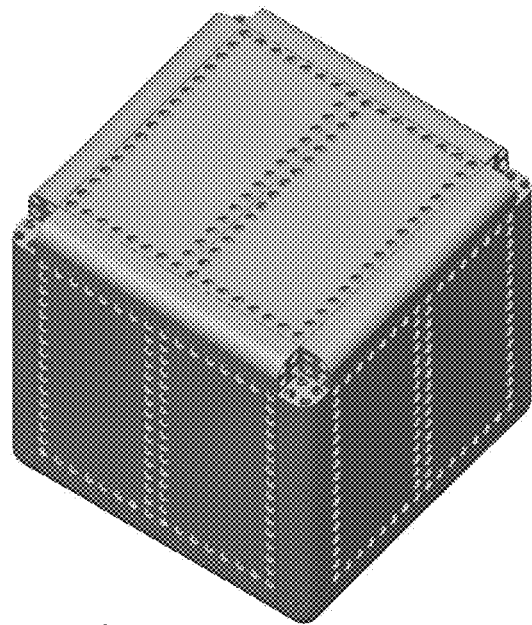

FIG. 161A is a basic building block.
FIG. 161B is another view of FIG. 161A.
FIG. 162A is a basic building block.
FIG. 162B is another view of FIG. 162A
FIG. 162C is a side profile view of FIG. 162A.
FIG. 163A is a basic building block.
FIG. 163B is another view of FIG. 163A.
FIG. 163C is a side profile view of FIG. 163A.
FIG. 164A is a basic building block.
FIG. 164B is another view of FIG. 164A.
FIG. 164C is a side profile view of FIG. 164A.
FIG. 165A is a basic building block.
FIG. 165B is another view of FIG. 165A.
FIG. 165C is another view of FIG. 165A.
FIG. 166A is a cylinder for building. FIGS. 166A through 191A are cylinders that serve as transport conduits for smaller pieces to move through the system to enable objects and structures to be built from within the object itself.
FIG. 166B is another view of FIG. 166A.
FIG. 166C is a profile view from the side of FIG. 166A.
FIG. 167A is a cylinder for building.
FIG. 167B is another view of FIG. 167A.
FIG. 167C is a side profile view of FIG. 167A.
FIG. 167D is another view of FIG. 167A.
FIG. 168A is a transport cylinder.
FIG. 168B is a side view of FIG. 168A.
FIG. 168C is another view of FIG. 168A.
FIG. 169A is a transport cylinder.
FIG. 169B is a profile view from an open end of FIG. 169A.
FIG. 170A is a transport cylinder.
FIG. 170B is a profile view from the side of FIG. 170A.
FIG. 171A is a transport cylinder.
FIG. 171B is a profile view of FIG. 171A.
FIG. 172A is a transport cylinder.
FIG. 172B is a profile view of FIG. 172A.
FIG. 173A is a transport cylinder.
FIG. 173B is a profile view of FIG. 173A.
FIG. 174A is a transport cylinder.
FIG. 174B is another view of FIG. 174A.
FIG. 174C is a profile view from an open side of FIG. 174A.
FIG. 175A is a cylinder transport.
FIG. 175B is a profile view from an open side of FIG. 175A.
FIG. 176A is a transport cylinder.
FIG. 176B is a profile view from an open end of FIG. 176A.
FIG. 176C is another view of FIG. 176A.
FIG. 177A is a cylinder transport.
FIG. 177B is another view of FIG. 177A.
FIG. 178A is a cylinder transport.
FIG. 178B is another view of FIG. 178A.
FIG. 178C is another view of FIG. 178A.
FIG. 179A is a profile view of an open side of FIG. 179B.
FIG. 179B is a cylinder transport.
FIG. 180A is a profile view of an open side of FIG. 180B.
FIG. 180B is another transport cylinder.
FIG. 181A is a transport cylinder.
FIG. 181B is another view of FIG. 181A.
FIG. 181C is another view of FIG. 181A.
FIG. 181D is a profile view from a side of FIG. 181A.
FIG. 181E is a profile view from the side of a modified FIG. 181A.
FIG. 182A is a profile view from an open side of FIG. 182B.
FIG. 182B is another cylinder transport.
FIG. 183A is a profile view of the side of FIG. 183B.
FIG. 183B is a cylinder transport.
FIG. 184A is a profile view from a side of FIG. 184B.
FIG. 184B is a transport cylinder.
FIG. 185A is a profile view from a side of FIG. 185B.
FIG. 185B is a transport cylinder interface.
FIG. 186A is a profile view of FIG. 186B.
FIG. 186B is a transport cylinder interface.
FIG. 187A is a transport cylinder interface.
FIG. 187B is another view of FIG. 187A.
FIG. 188A is a profile view of FIG. 188B.
FIG. 188B is a cylinder interface.
FIG. 189A is a basic building block.
FIG. 189B is another view of FIG. 189A.
FIG. 190A is a basic building block.
FIG. 190B is another view of FIG. 190A.
FIG. 191A is a basic building block.
FIG. 191B is another view of FIG. 191A.
FIGS. 192A and 193A are longer versions of the prior pieces that form a beam to assemble structures with more stability.
FIG. 192A is a basic beam building block.
FIG. 192B is a profile view of FIG. 192A.
FIG. 193A is a basic beam building block.
FIG. 193B is another view of FIG. 193A.
FIG. 193C is a profile view of FIG. 193A.
FIG. 193D is another view of FIG. 193A.
FIG. 194A is a profile view of FIG. 194B.
FIG. 194B is like FIGS. 192A and 193A except it has a hook on the end that hooks on to female knob openings to have more grip when building structures.
FIGS. 195A through 205A are beams, panels, rounded corners and related pieces that assemble into a box that carries the rest of the pieces of the Invention.
FIG. 195A is a profile view of FIG. 195B.
FIG. 195B is a rounded corner.
FIG. 195C is another view of FIG. 195B.
FIG. 196A is a beam that assembles into a box.
FIG. 196B is a view from an end of FIG. 196A.
FIG. 197A is a close-up view of an end of FIG. 197B.
FIG. 197B is a profile view of a beam.
FIG. 198A is a profile view of a beam.
FIG. 198B is a close-up view of an end of FIG. 198A.
FIG. 199A is a profile view of a panel.
FIG. 199B is another profile view of a panel.
FIG. 200 is a view of a panel.
FIG. 201A is a panel.
FIG. 201B is another view of FIG. 201A.
FIG. 201C is a profile view from a side of FIG. 201A.
FIG. 202A is a piece that assembles into a box.
FIG. 202B is another view of FIG. 202A.
FIG. 203 is a pole that assembles into a box.
FIG. 204A is a panel that assembles into a box.
FIG. 204B is a profile view of FIG. 204A with a pole inserted to partially assemble into a box.
FIG. 205A is a profile view of a panel.
FIG. 205B is another profile view of FIG. 205.
FIGS. 206A-206X are different views of the box made from pieces in FIGS. 195A through 205A in various stages of assembly and use (the box can be secured shut, or its door can be opened).
FIG. 206A is a view of a partially assembled box.
FIG. 206B is a profile view of FIG. 206A.
FIG. 206C is a view of a partially assembled box.
FIG. 206D is a profile view of FIG. 206E
FIG. 206E is a view of a partially assembled box.

Figure 206F:
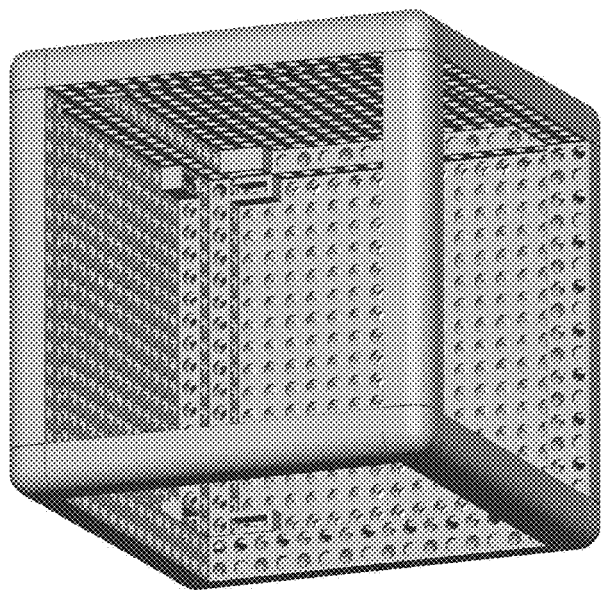

FIG. 206F is a view of the inside of a partially assembled box.

Figure 206G:
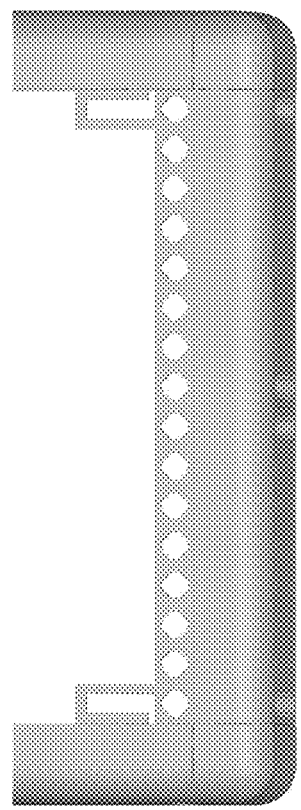

FIG. 206G is a close-up near profile view of a side of a partially assembled box.

Figure 206H:
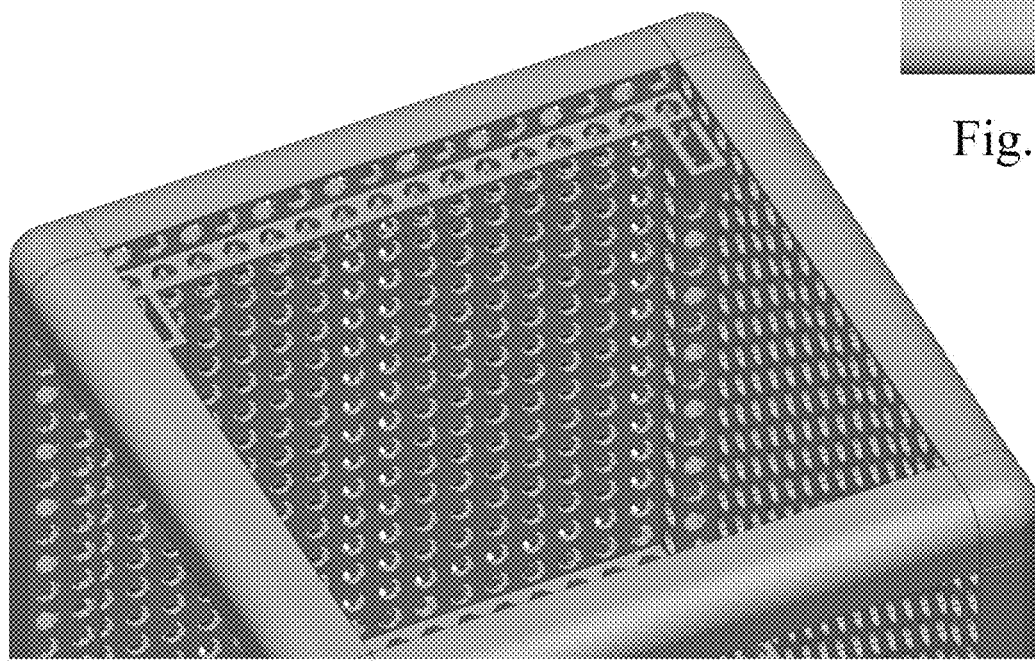

FIG. 206H is a close-up view of a partially assembled box.

Figure 206I:
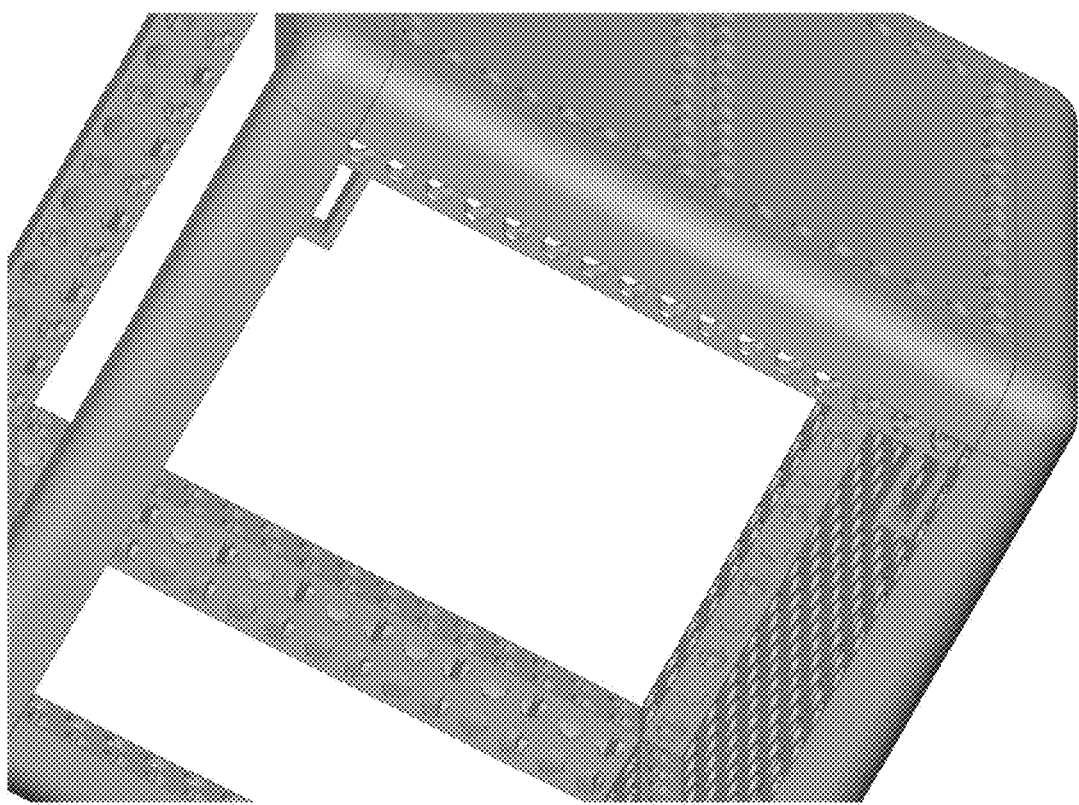

FIG. 206I is a close-up view of the inside and outside of a partially assembled box.

Figure 206J:
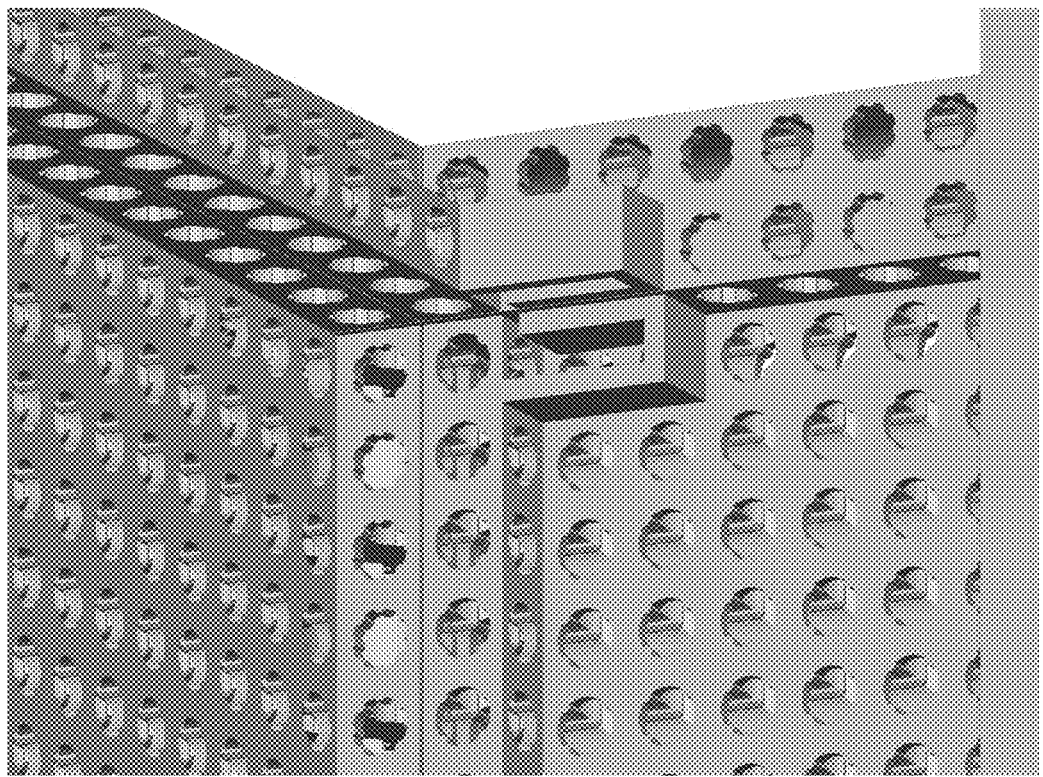

FIG. 206J is a close-up view of an inside corner of a partially assembled box.

Figure 206K:
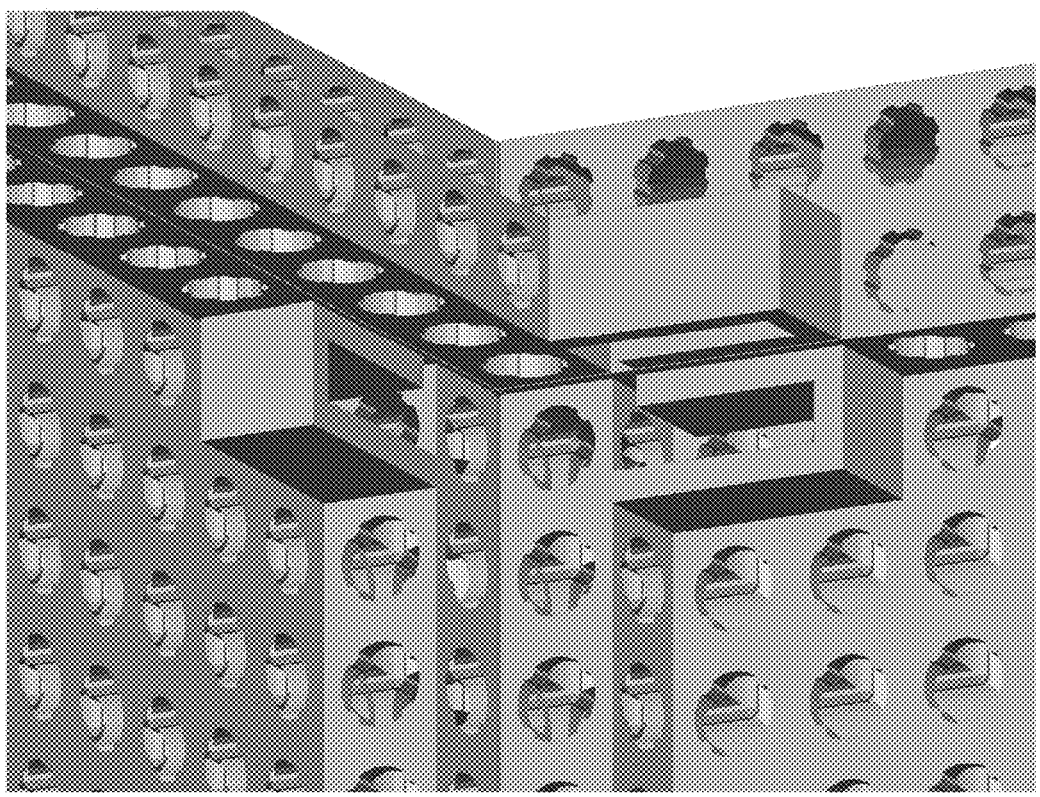

FIG. 206K is another close-up view of an inside corner of a partially assembled box.

Figure 206L:
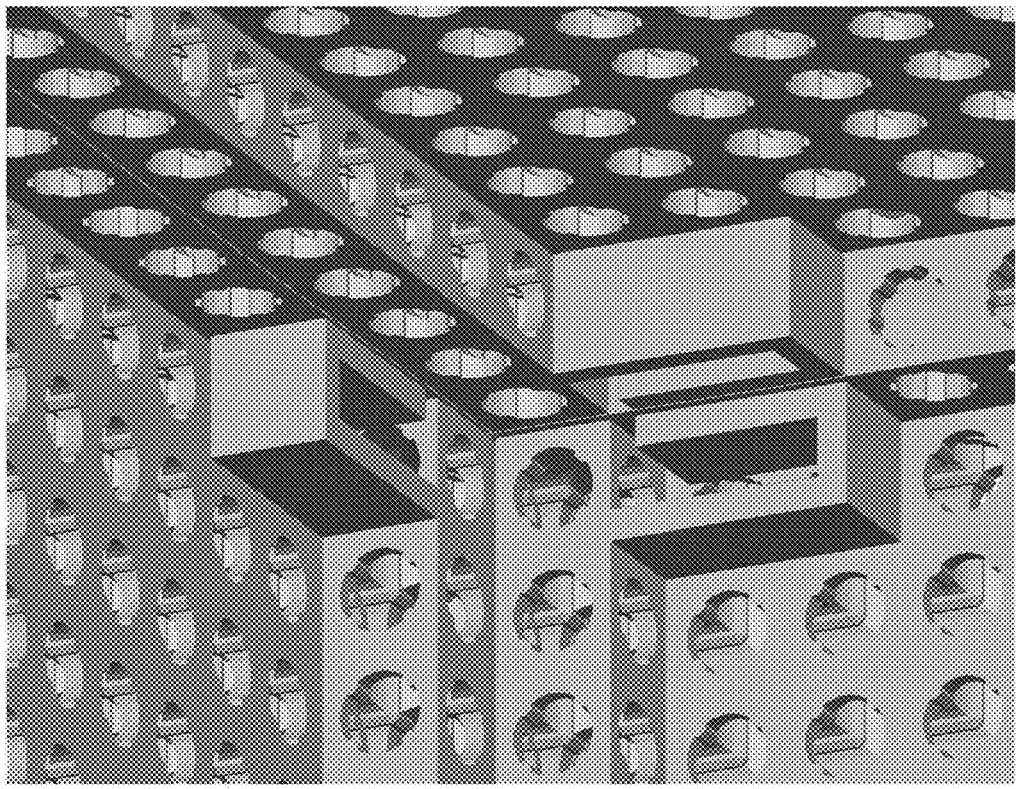

FIG. 206L is a view of FIG. 206K except with a panel closing a part of the box.

Figure 206M:
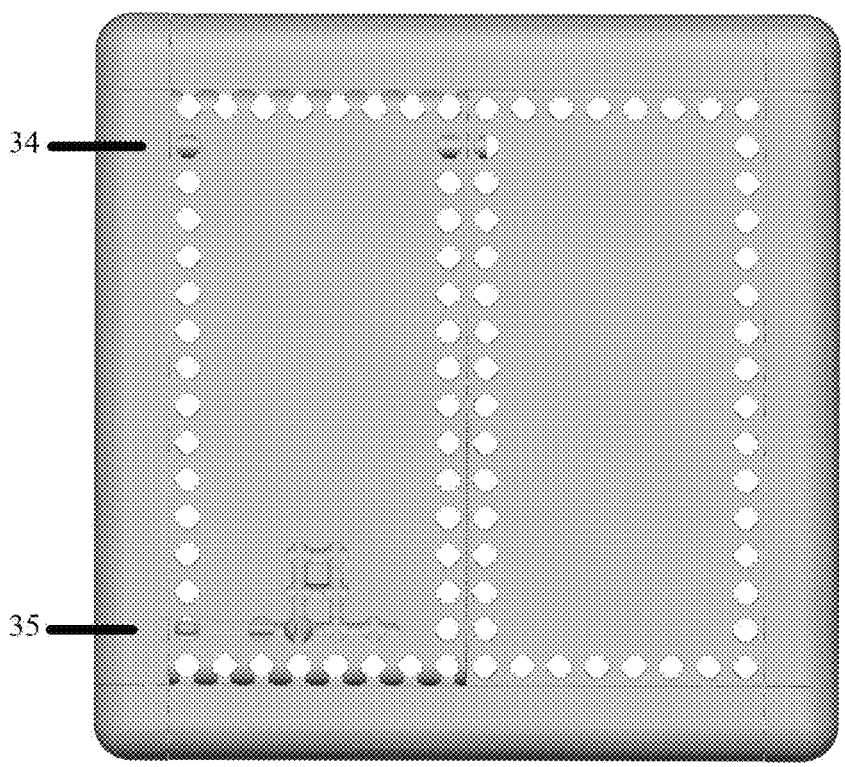

FIG. 206M is a profile view of the assembled box.

Figure 206N:
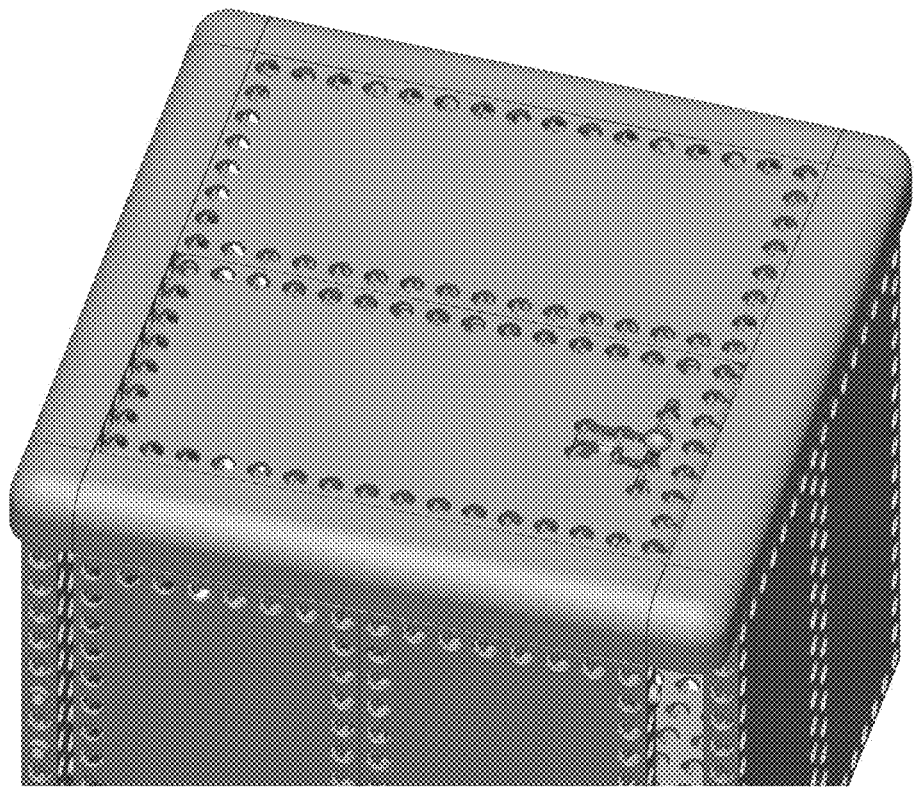

FIG. 206N is a view of a partially assembled box.

Figure 206O:
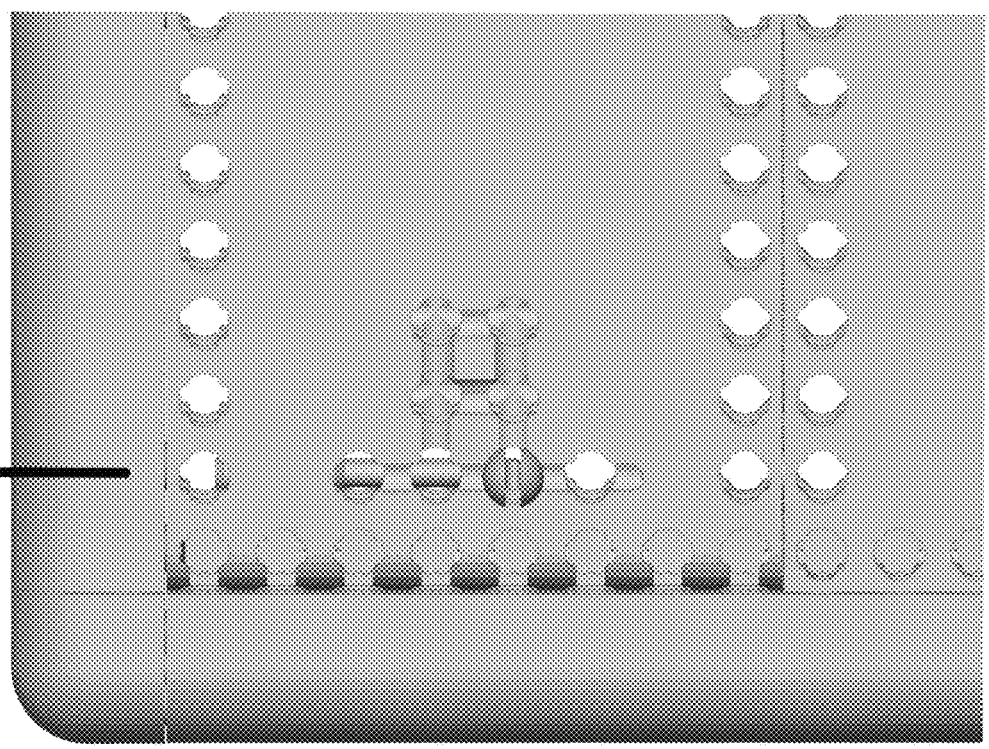

FIG. 206O is a close-up view of an outside part of the assembled box.

Figure 206P:
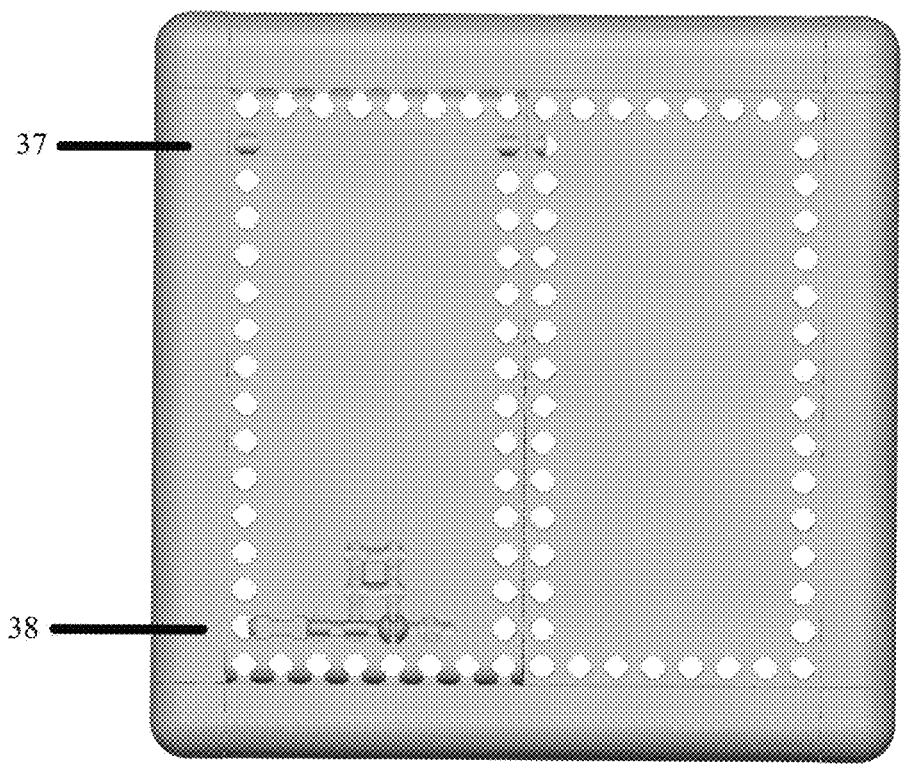

FIG. 206P is a profile view of the assembled box.

Figure 206Q:
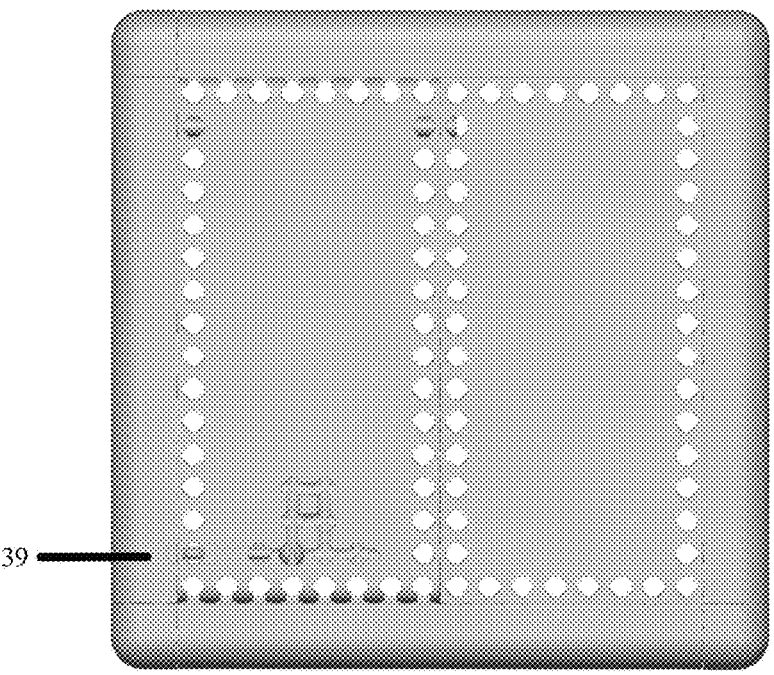

FIG. 206Q is a profile view of the assembled box.

Figure 206R:
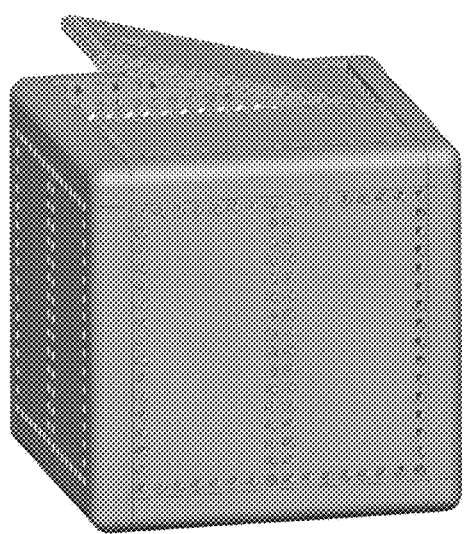

FIG. 206R is a view of an assembled box with one panel partially open.

Figure 206S:
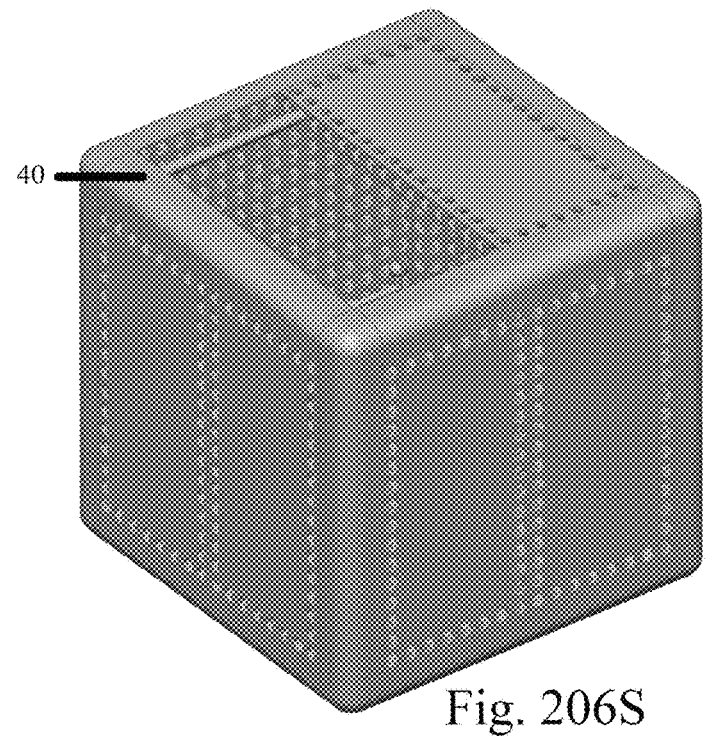

FIG. 206S is a view of a partially assembled box with a panel removed.

Figure 206T:
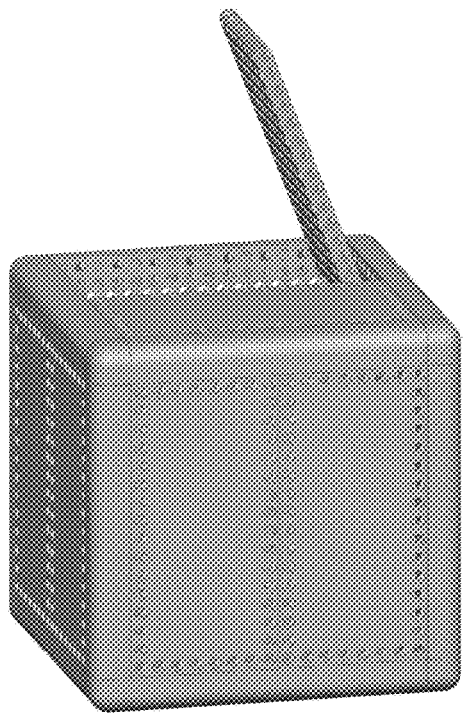

FIG. 206T is a view of an assembled box with a panel open.

Figure 206U:
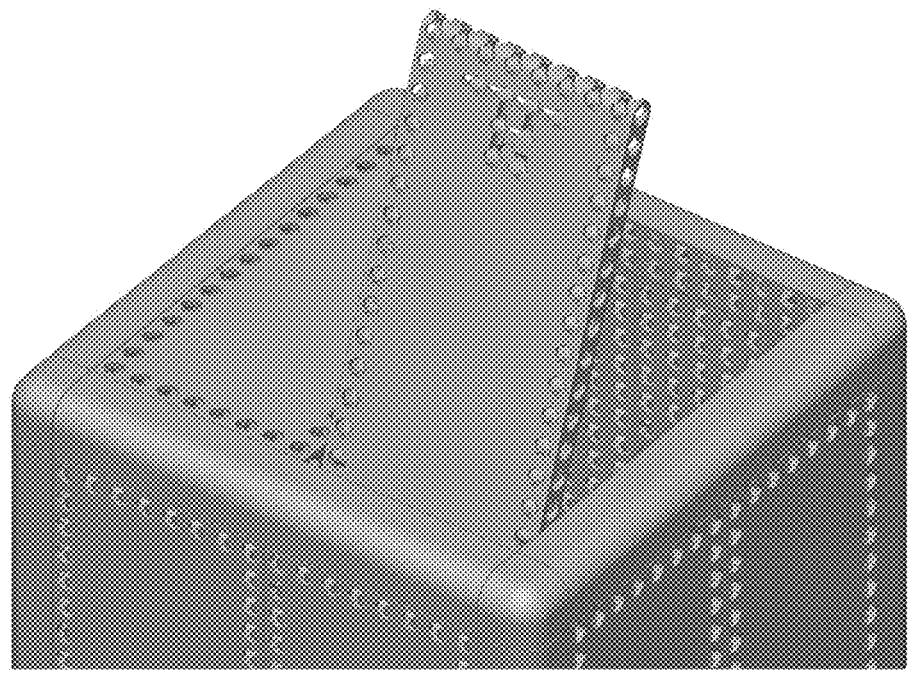

FIG. 206U is a close-up view of FIG. 206T from a different angle.

Figure 206V:
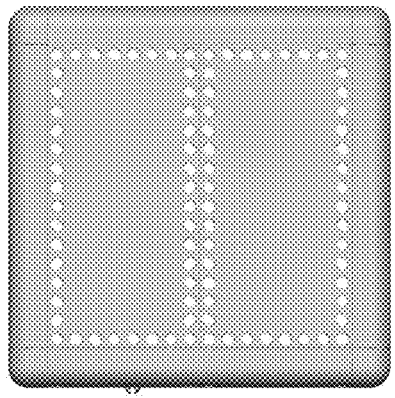

FIG. 206V is a profile view of an assembled box.

Figure 206W:
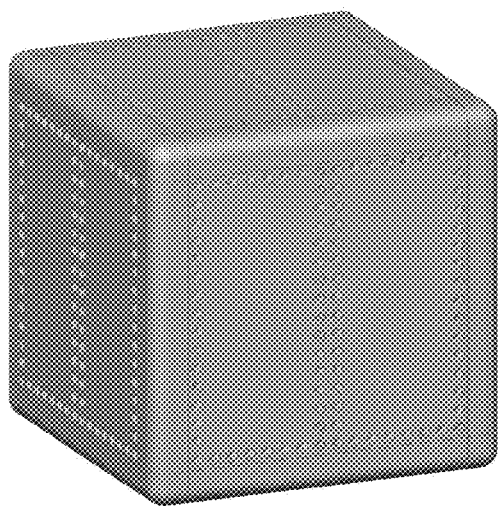
Figure 206X:
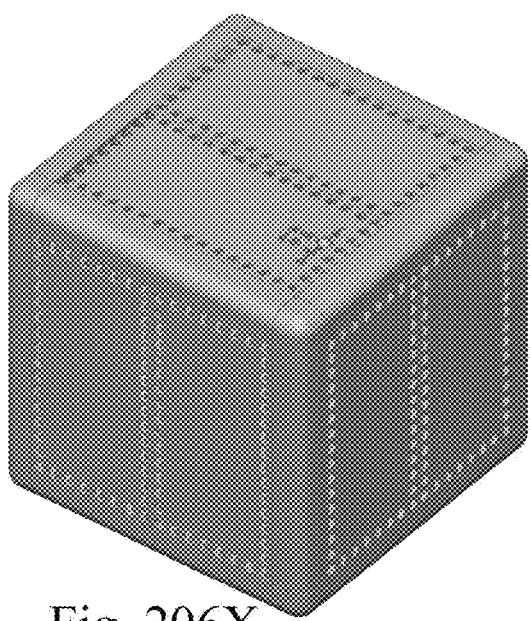

FIG. 206W is a view of an assembled box.

FIG. 206X is another view of an assembled box.

Figure 207A:
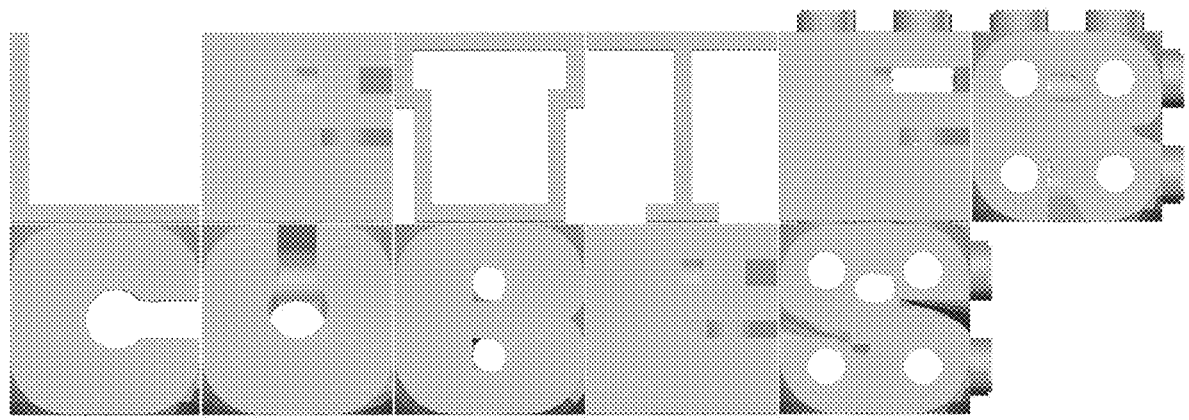
Figure 207B:
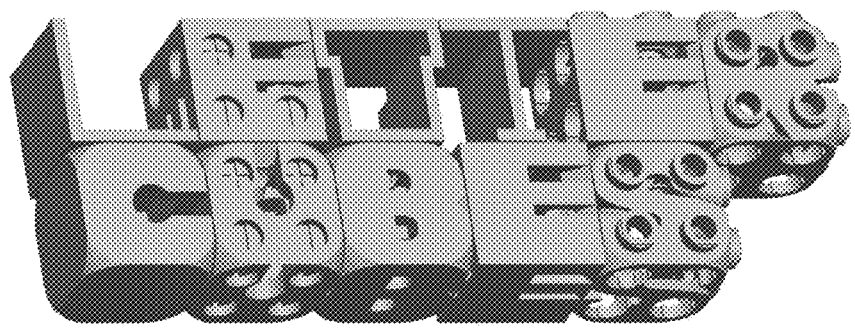
Figure 207C:
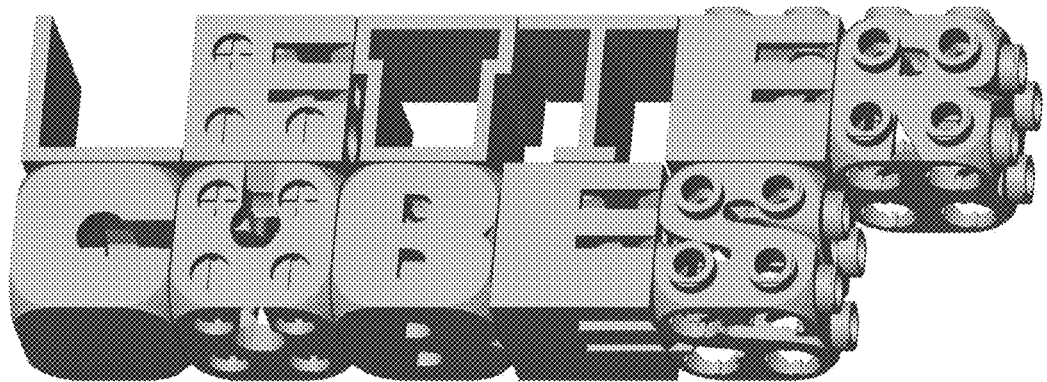
Figure 207D:
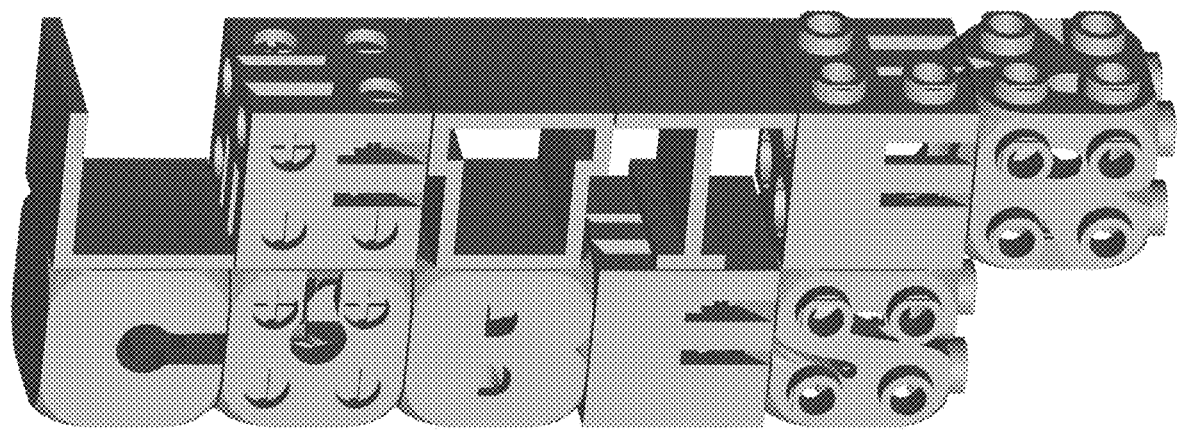
Figure 207E:
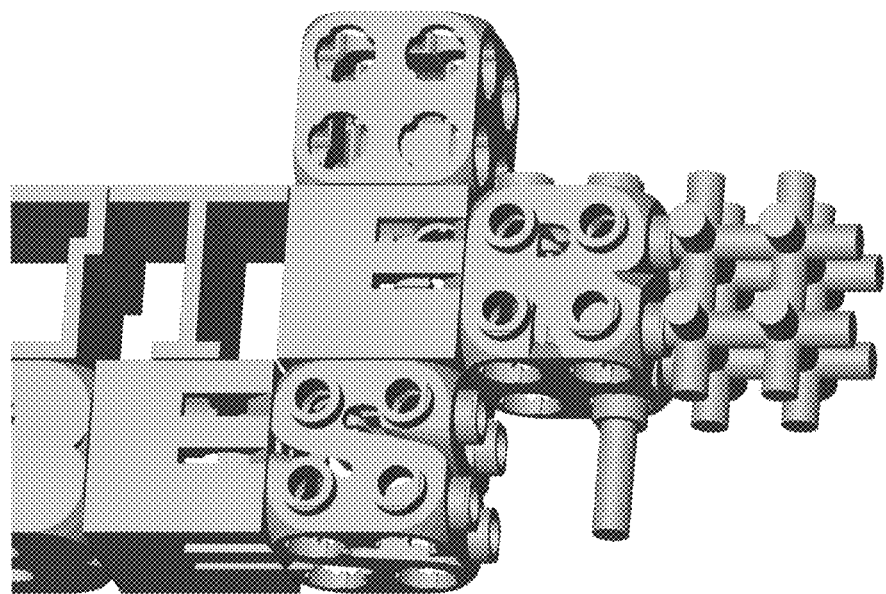

FIGS. 207A-207G contain examples of how the cubes with letters can be assembled to form the phrase "LETTER CUBES" and how additional pieces can be used to extend and reinforce words (see, for example, FIG. 207E).

FIG. 207A is a profile view letters assembled to spell "LETTER CUBES."

FIG. 207B is another view of FIG. 207A.

FIG. 207C is another view of FIG. 207A.

FIG. 207D is another view of FIG. 207A.

FIG. 207E is a close-up view of FIG. 207A with additional pieces.

Figure 207F:
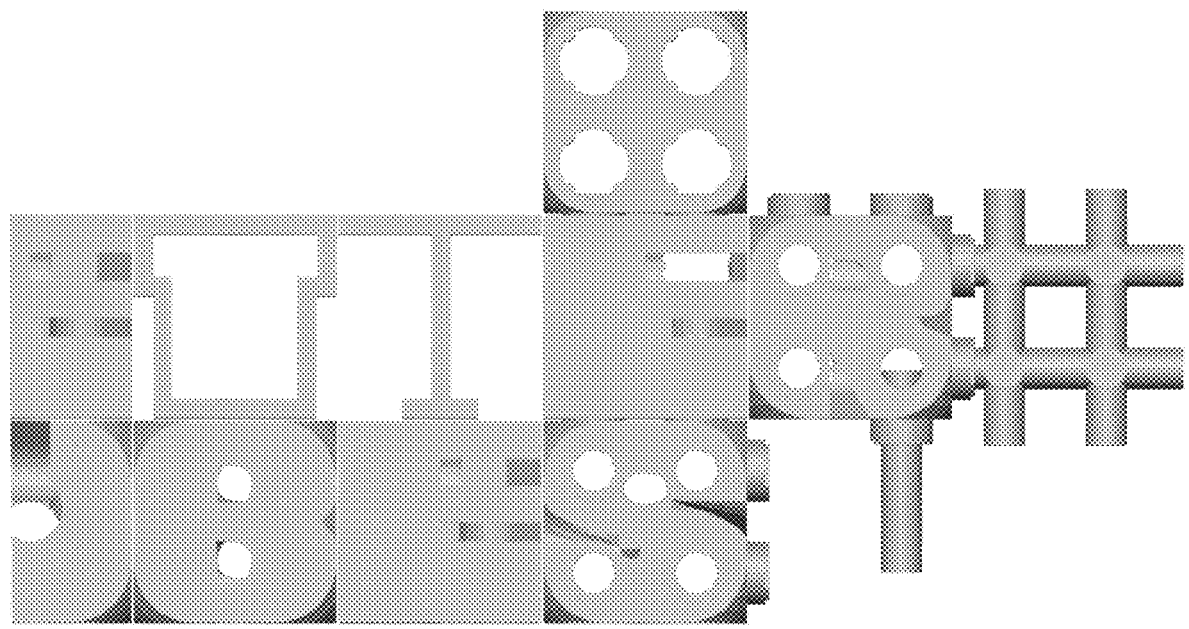

FIG. 207F is a close-up profile view of FIG. 207A with the additional pieces shown in FIG. 207E.

Figure 207G:
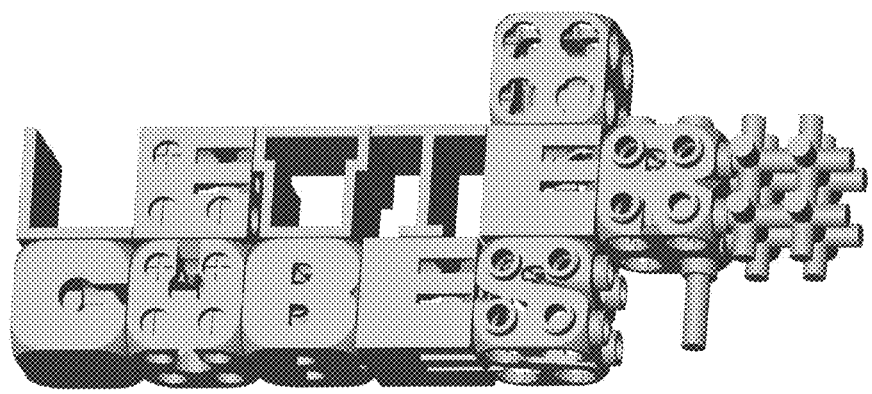

FIG. 207G is a full view of the piece shown in FIG. 207F.

DETAILED DESCRIPTION OF THE INVENTION

The Invention is a building system using rigid materials (like ceramics, glass and cast iron) and flexible materials (like rubber and plastic) to build structures that also have phrases in the building blocks.

The Invention is also a toy set that helps children learn the alphabet and learn how to spell and build things at the same time.

The Invention is a game set whose pieces can be arranged in three dimensions, which is a development beyond existing game sets that use only two dimensions. The Invention requires players to take into account balance and structural integrity as they build words vertically and horizontally.

Figure 1:
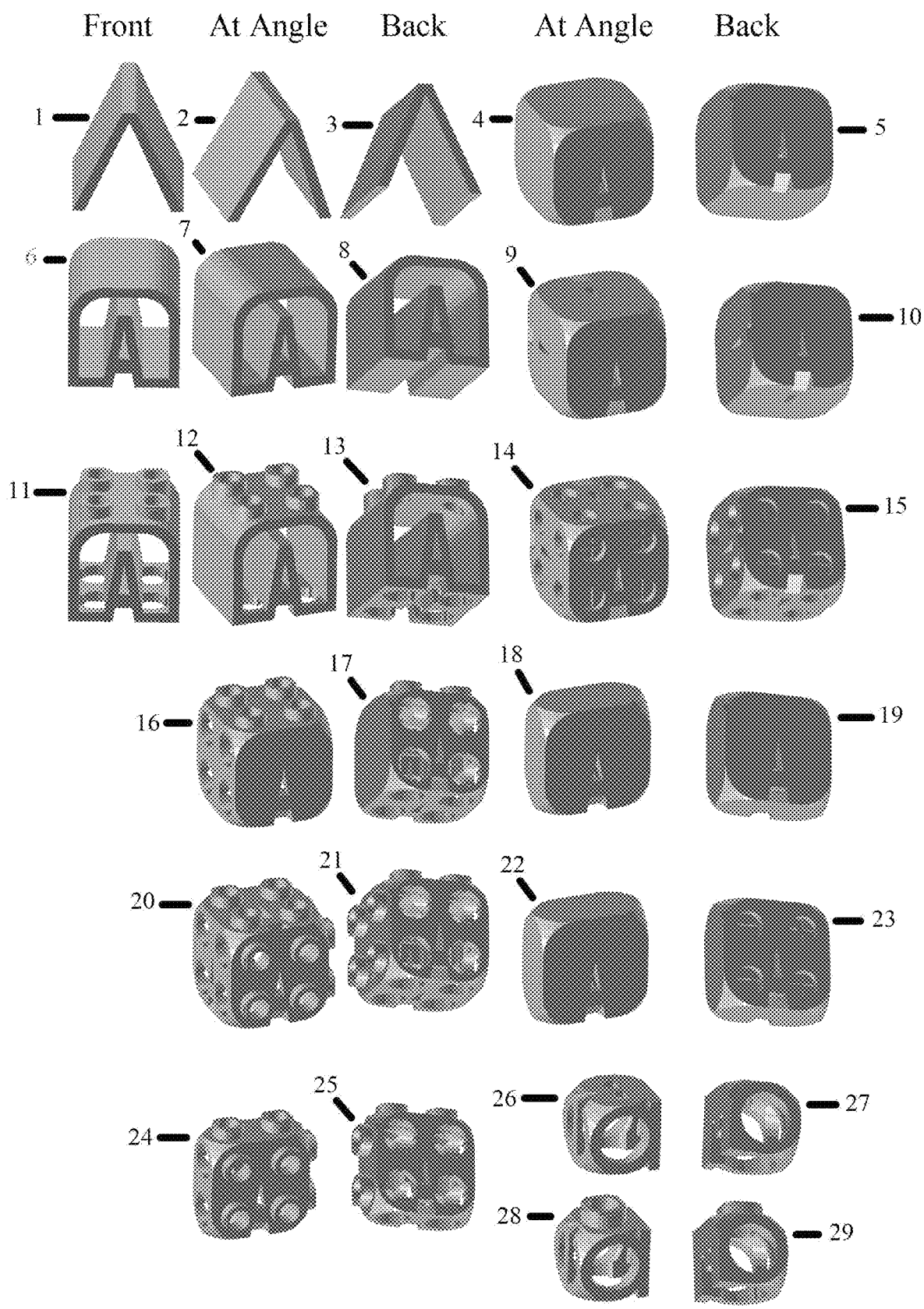
FIG. 1 is upper case and lower-case letters "a" that also form equilateral cubes that are stable building blocks with male and female knob interfaces, recesses for magnets and smooth surfaces.
Figure 2:
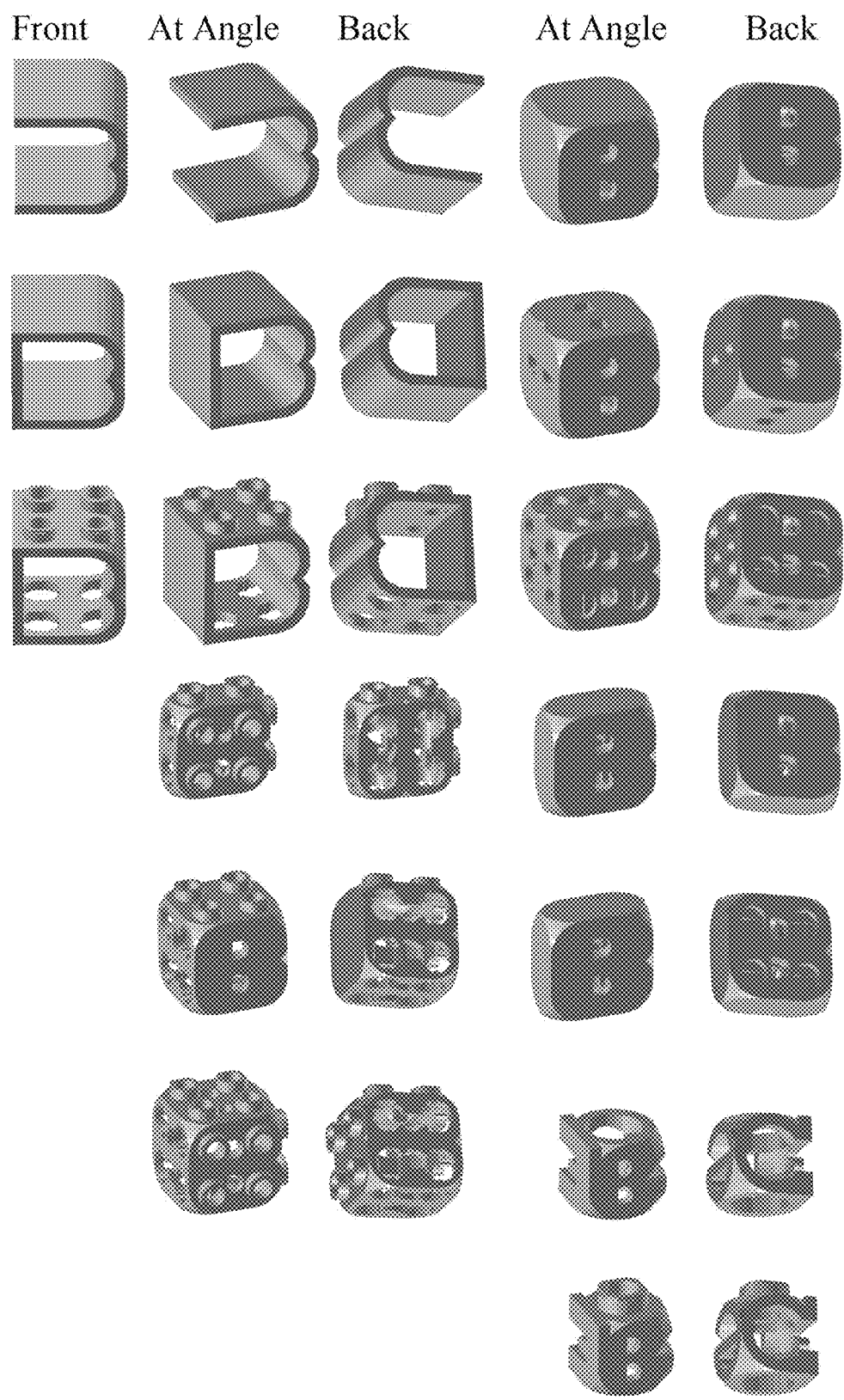
FIGS. 2 through 26 are the remaining letters in the alphabet (letters "b" through "z" that have the same features as the letter "a" in FIG. 1.
Figure 3:
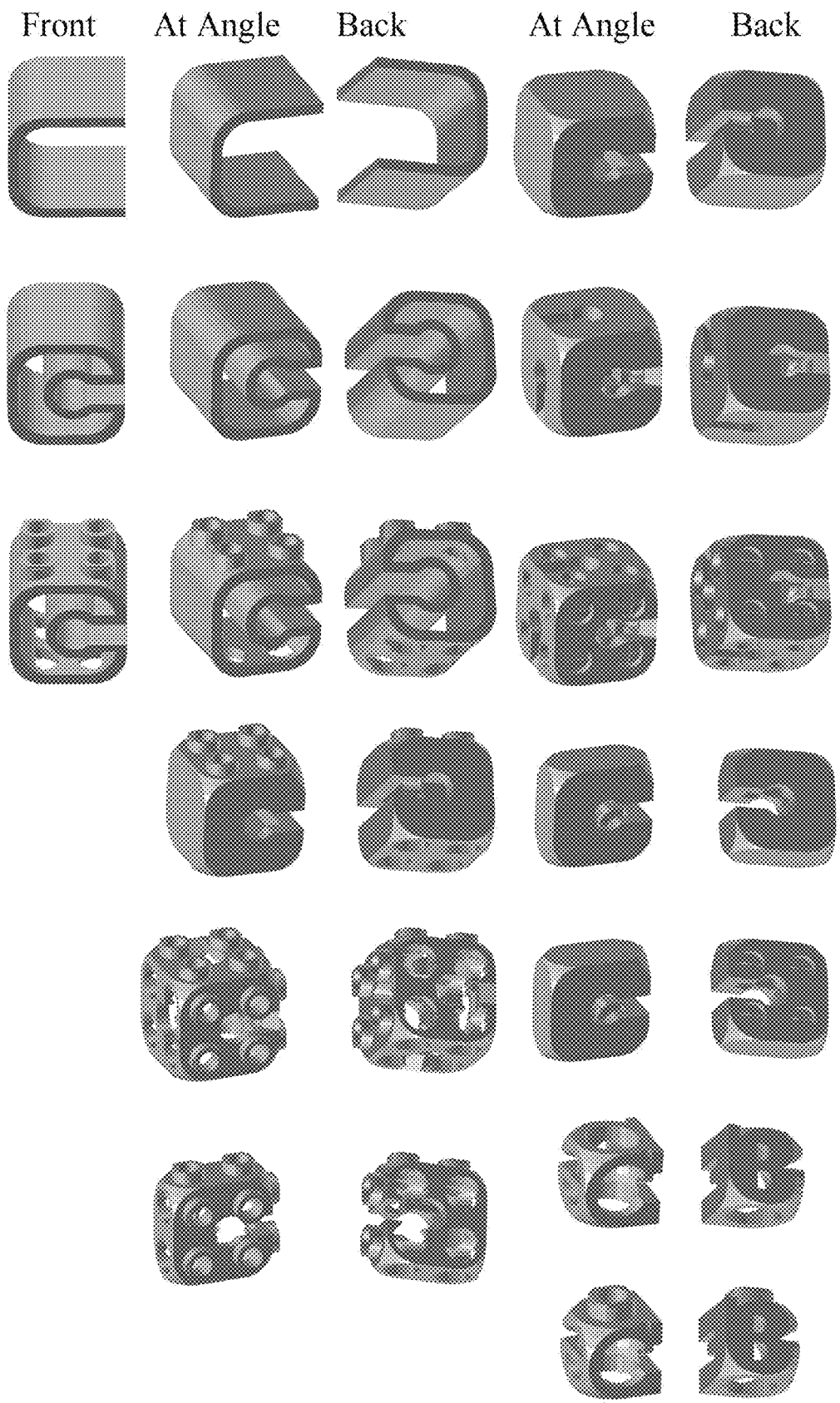
Figure 4:
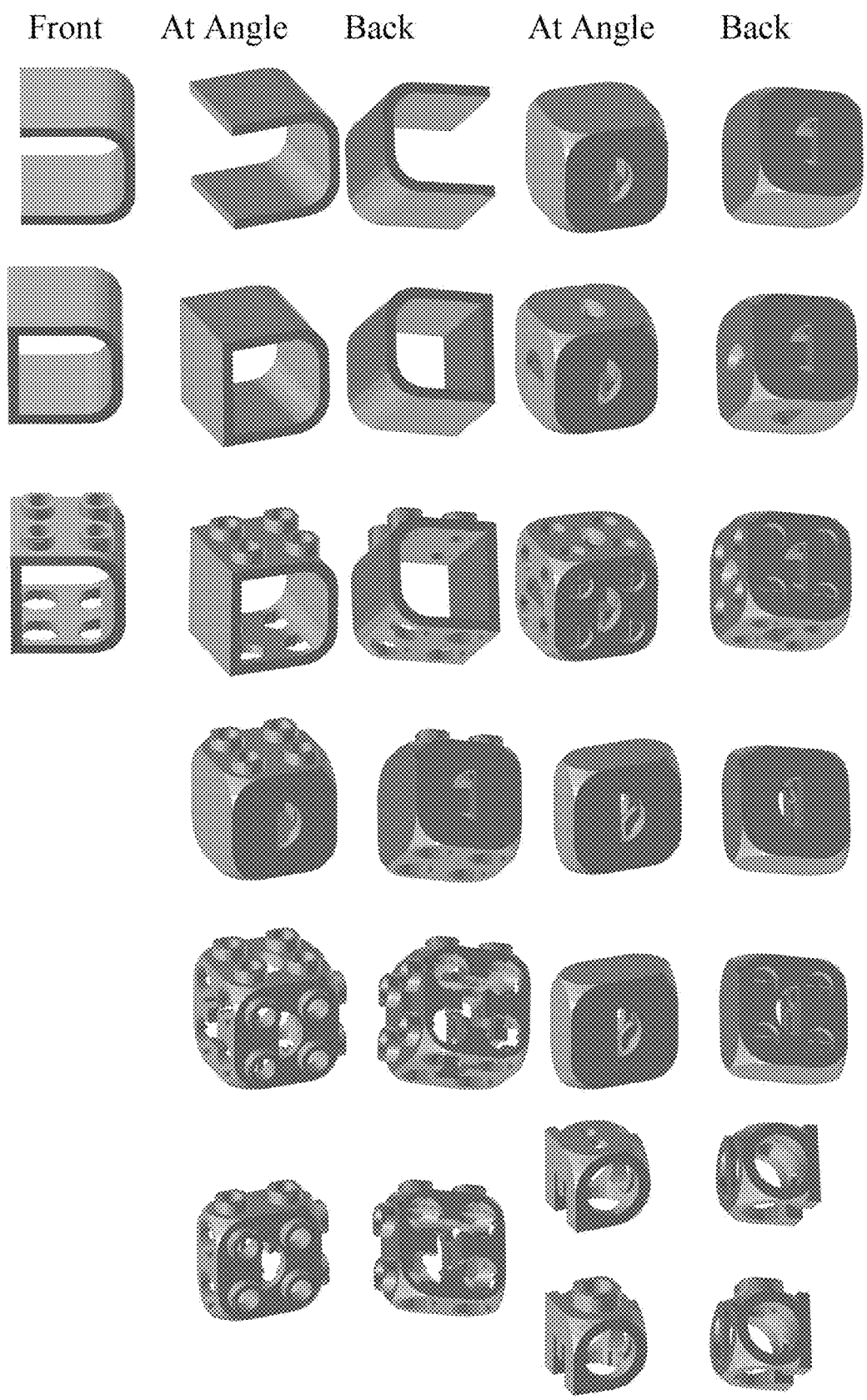
Figure 5:
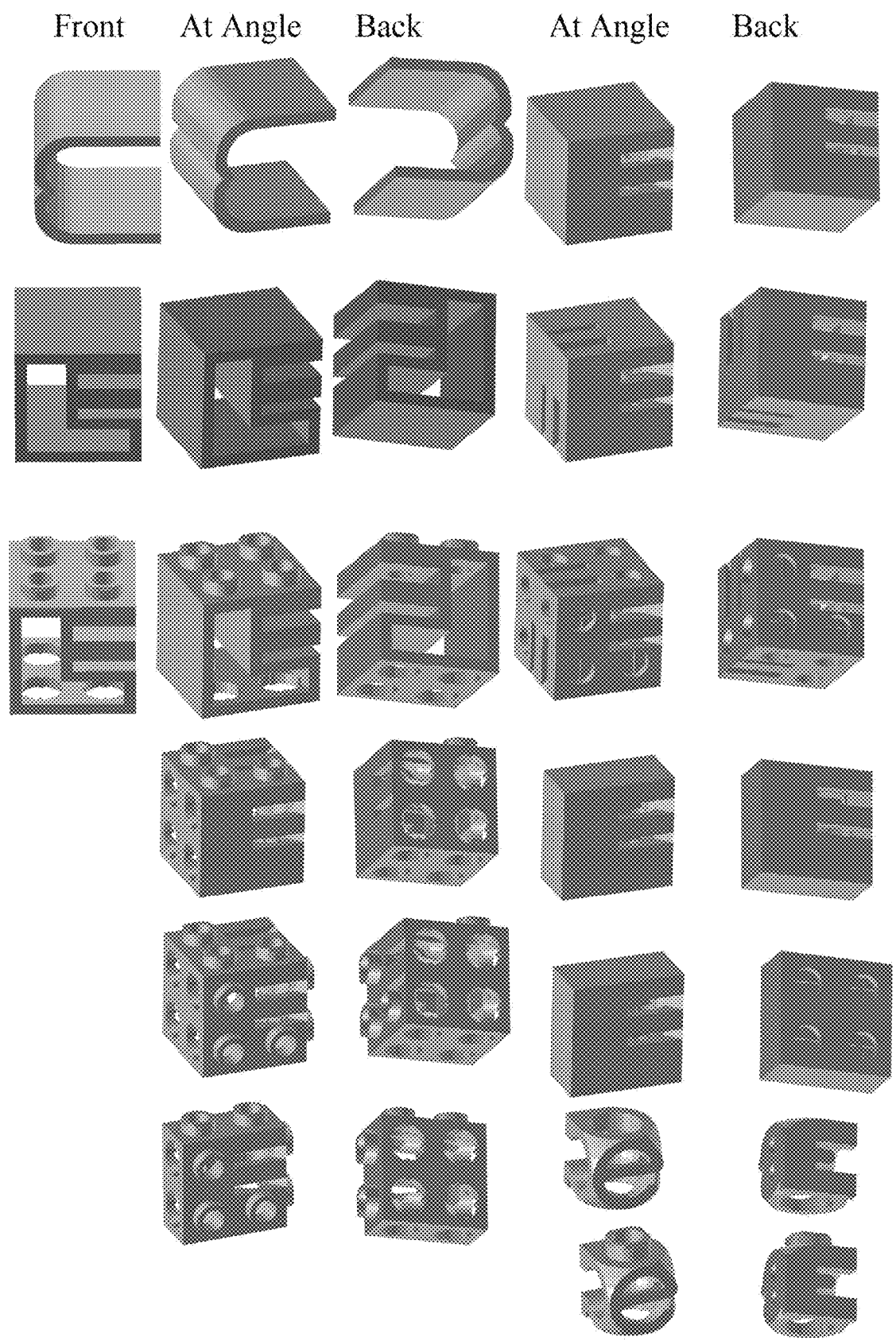
Figure 6:
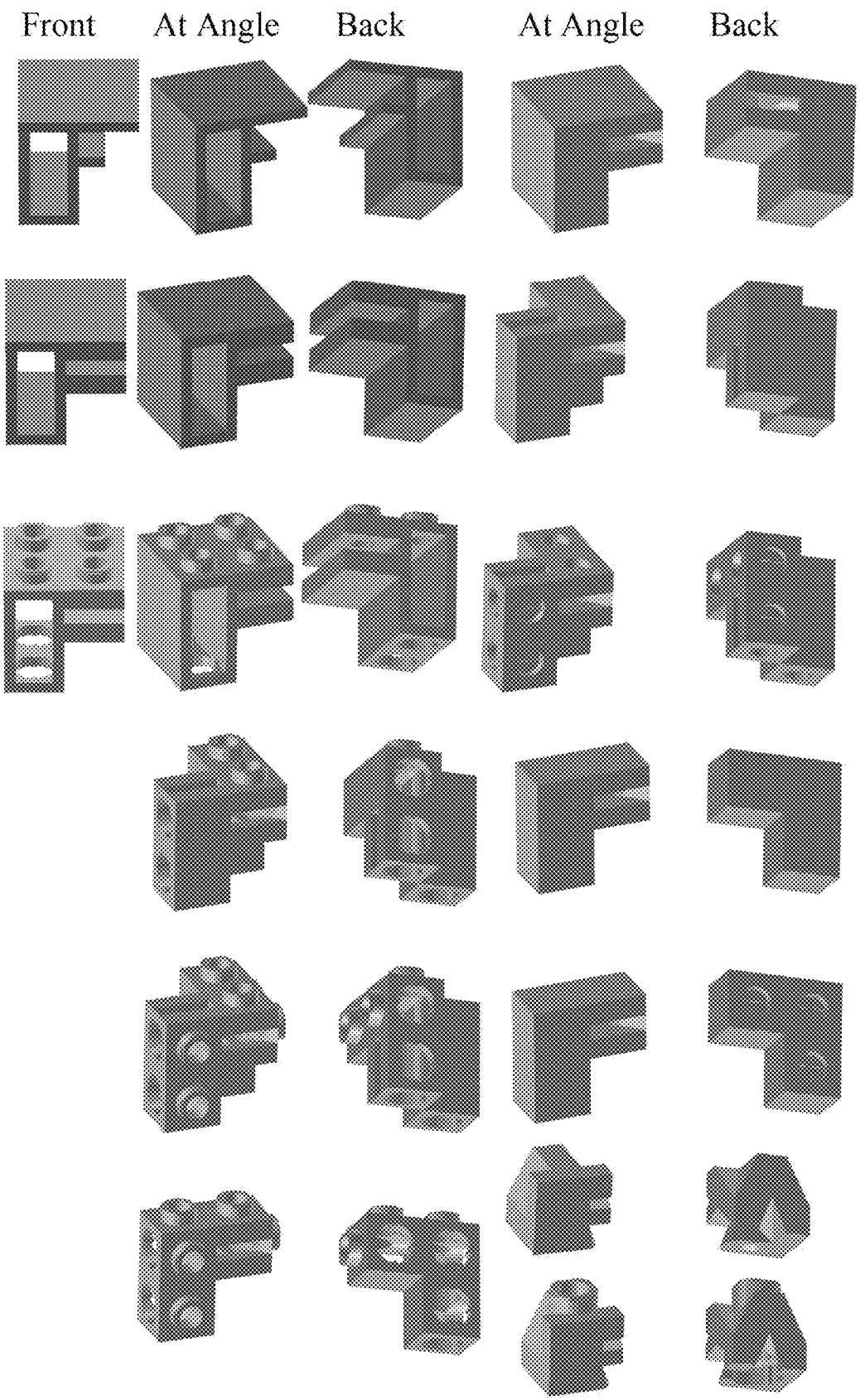
Figure 7:
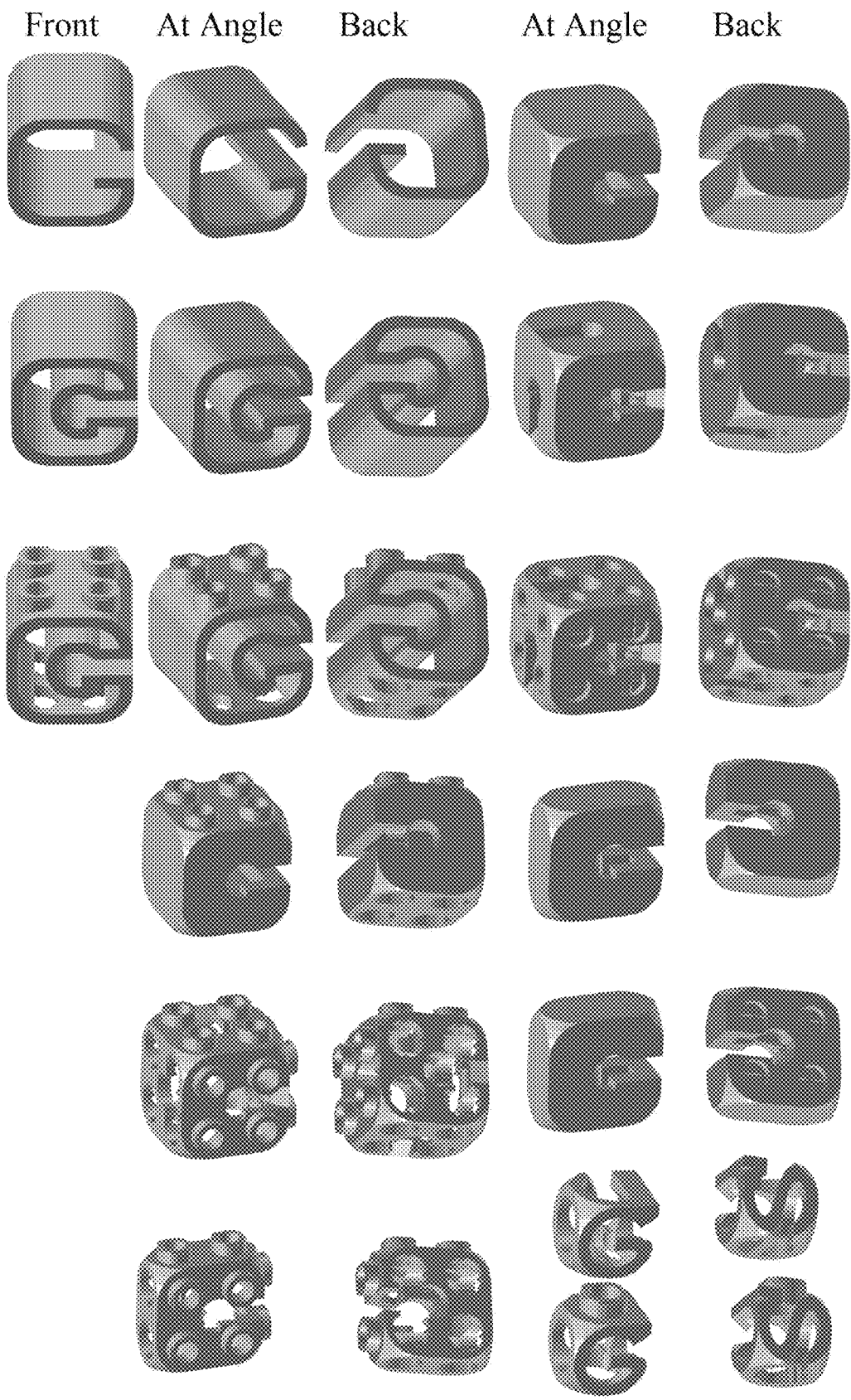
Figure 8:
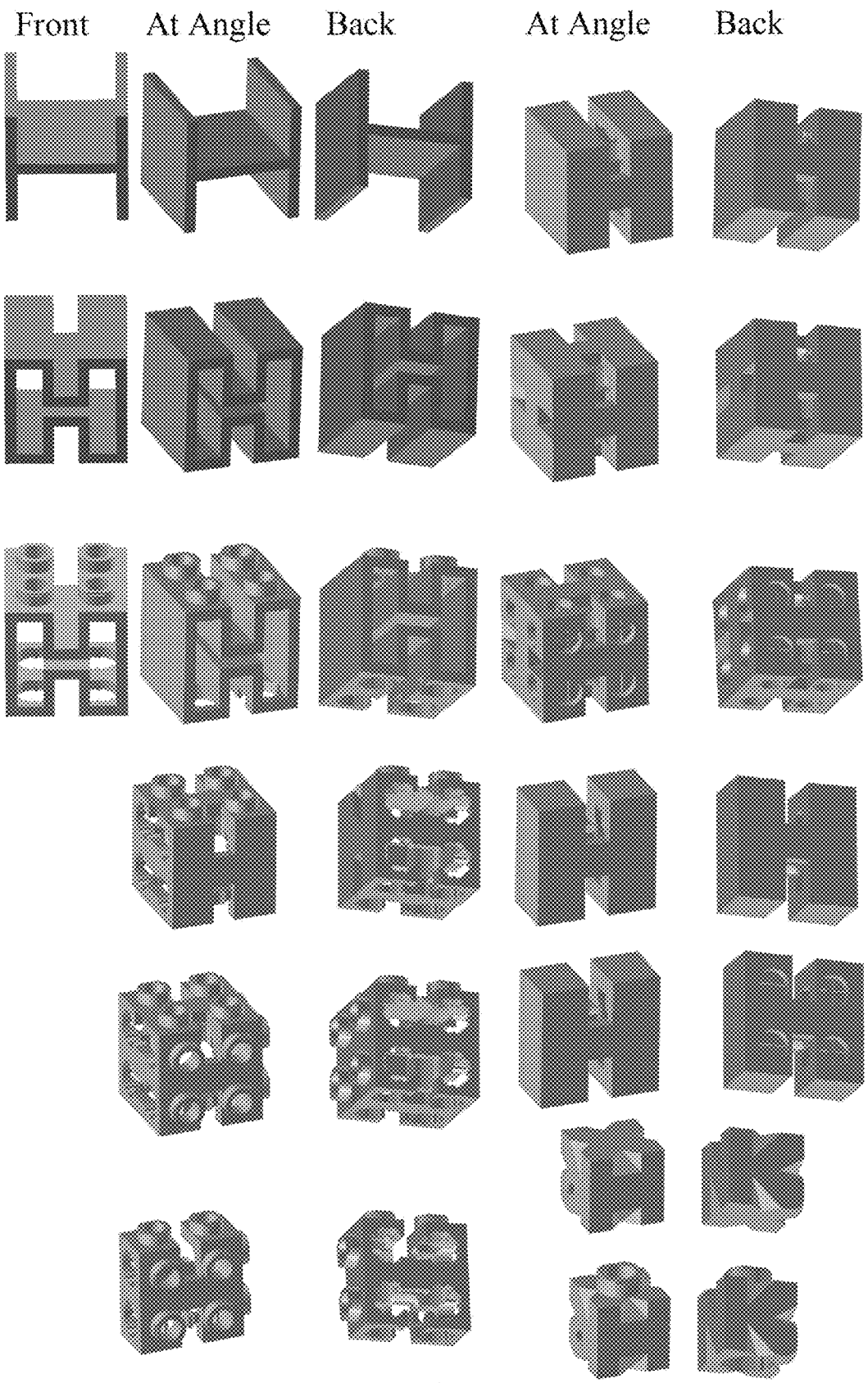
Figure 9:
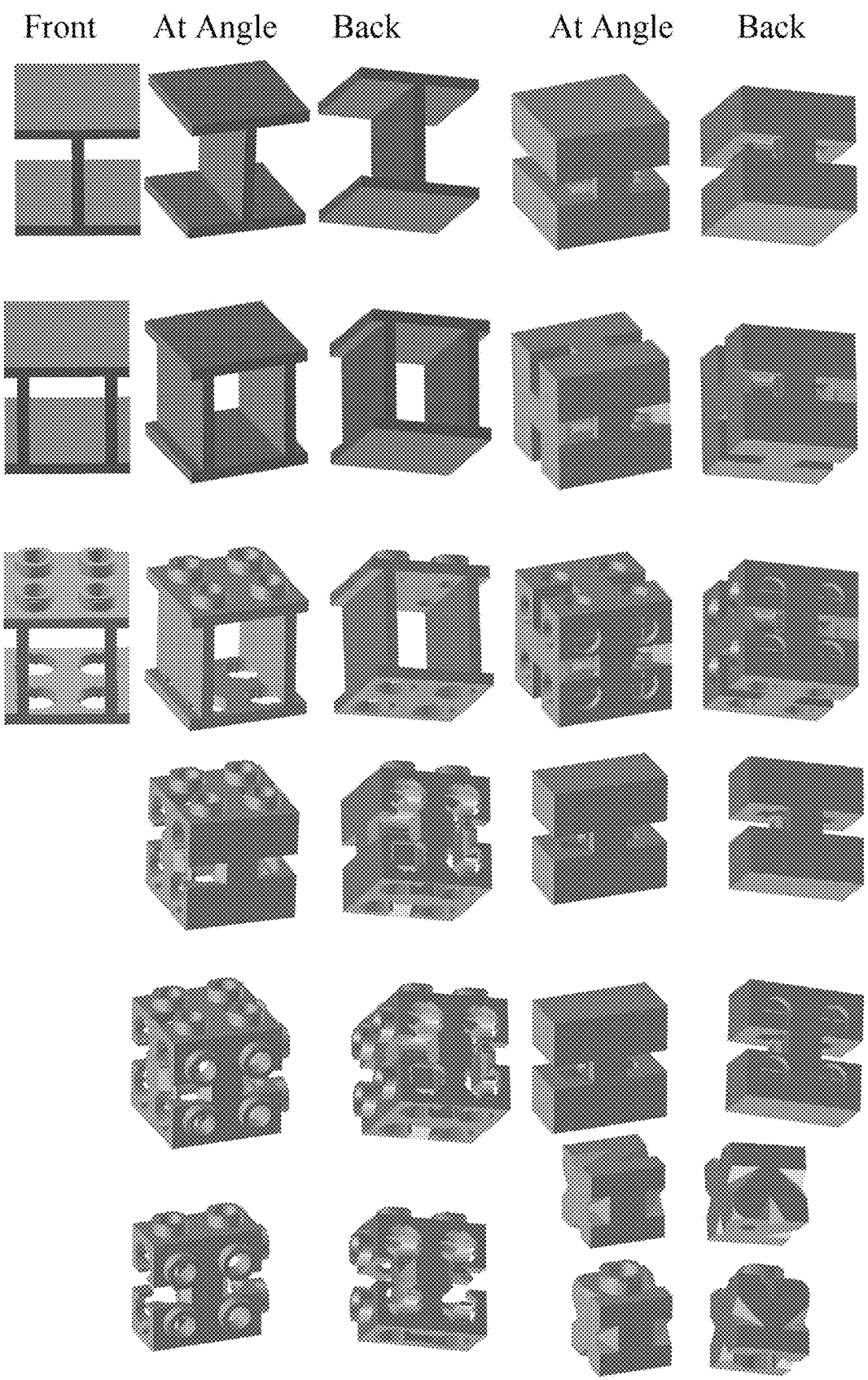
Figure 10:
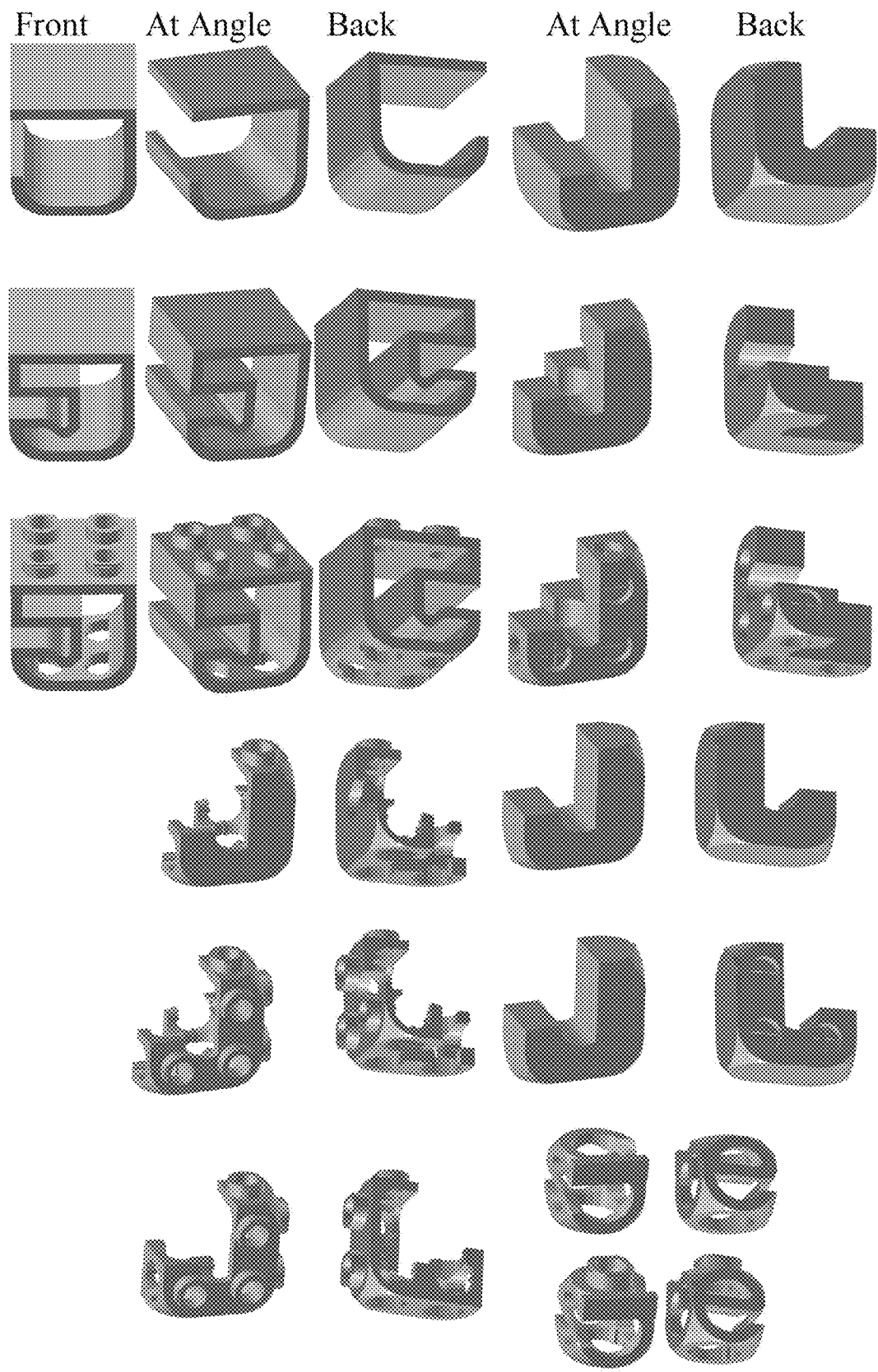
Figure 11:
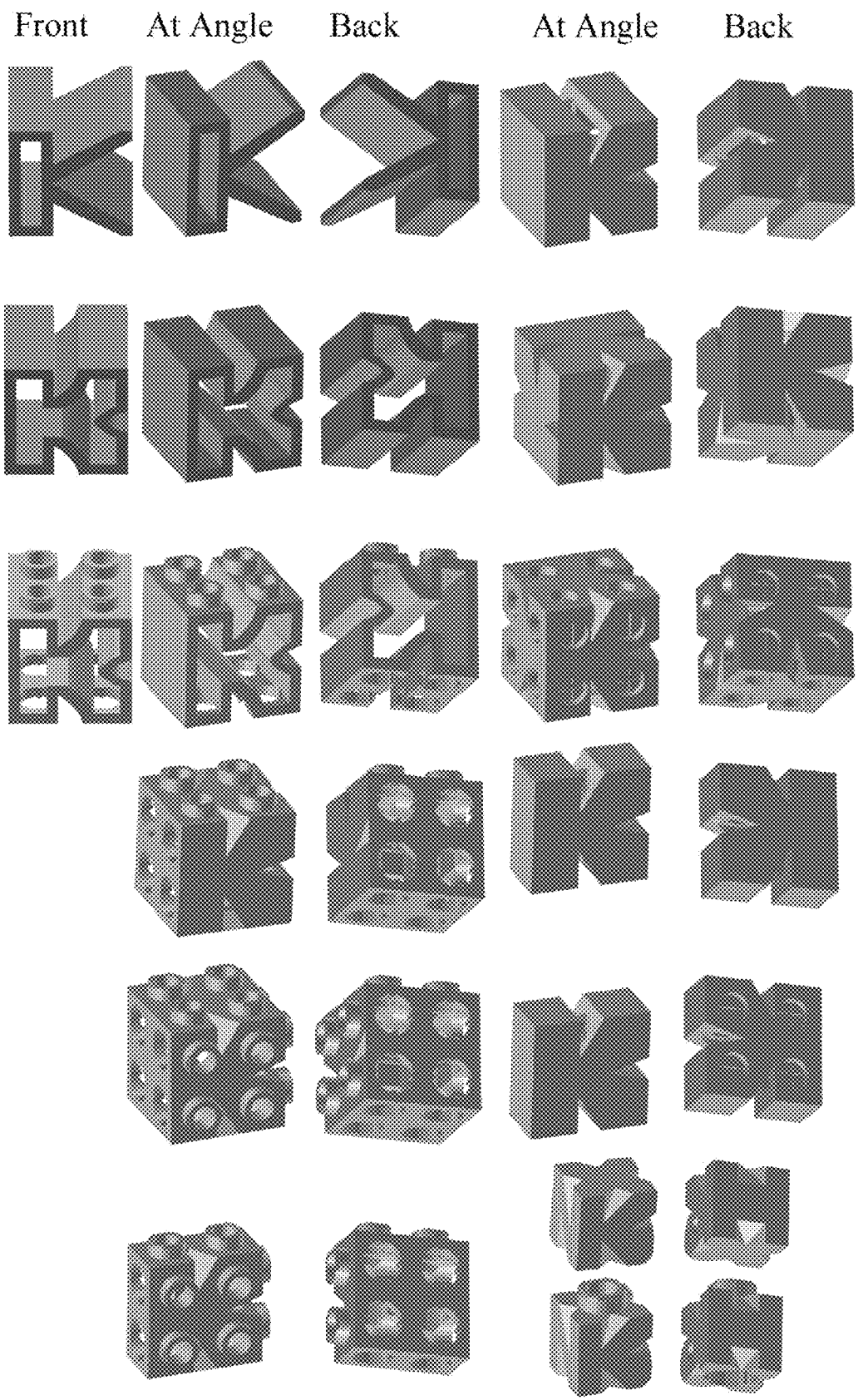
Figure 12:
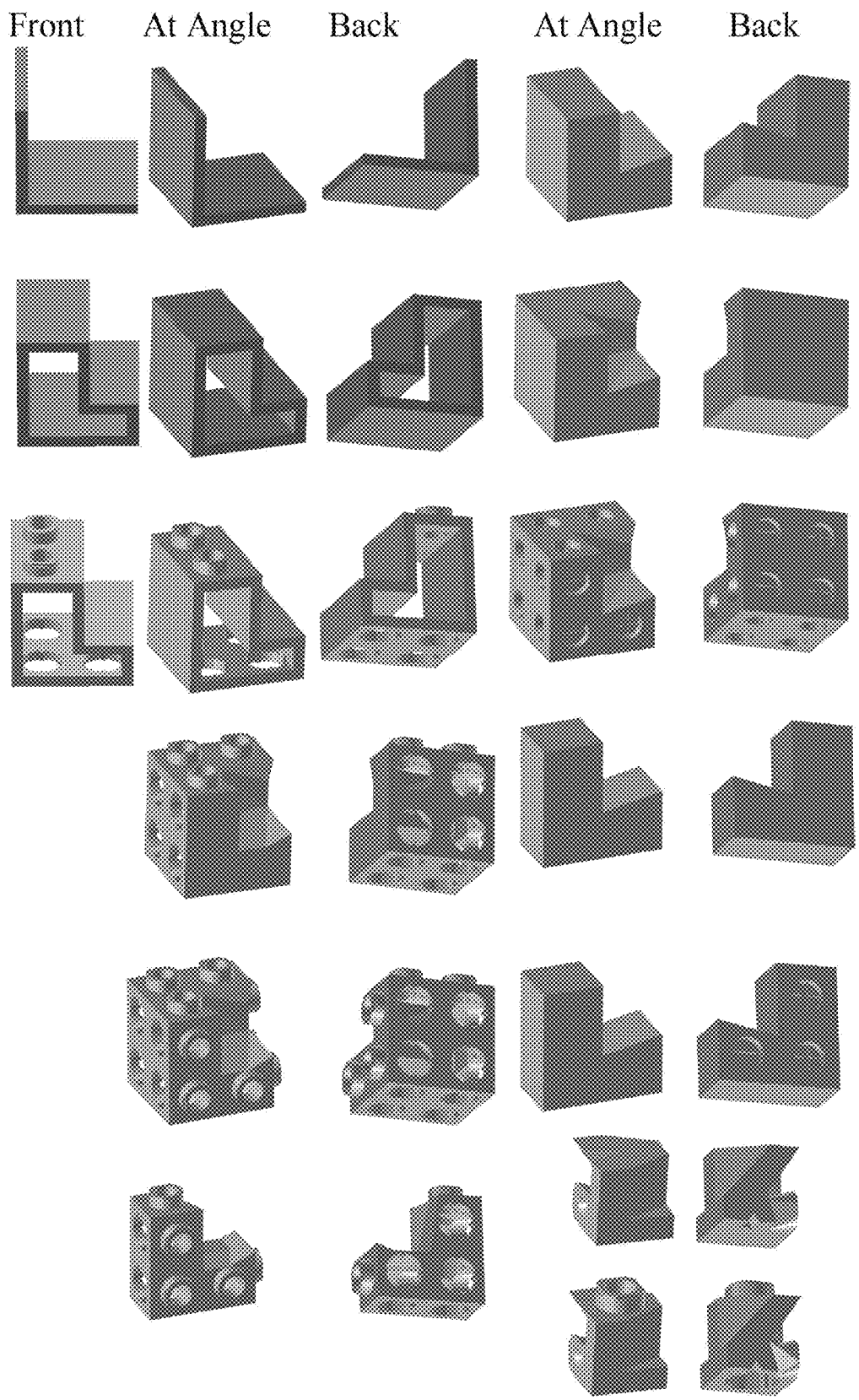
Figure 13:
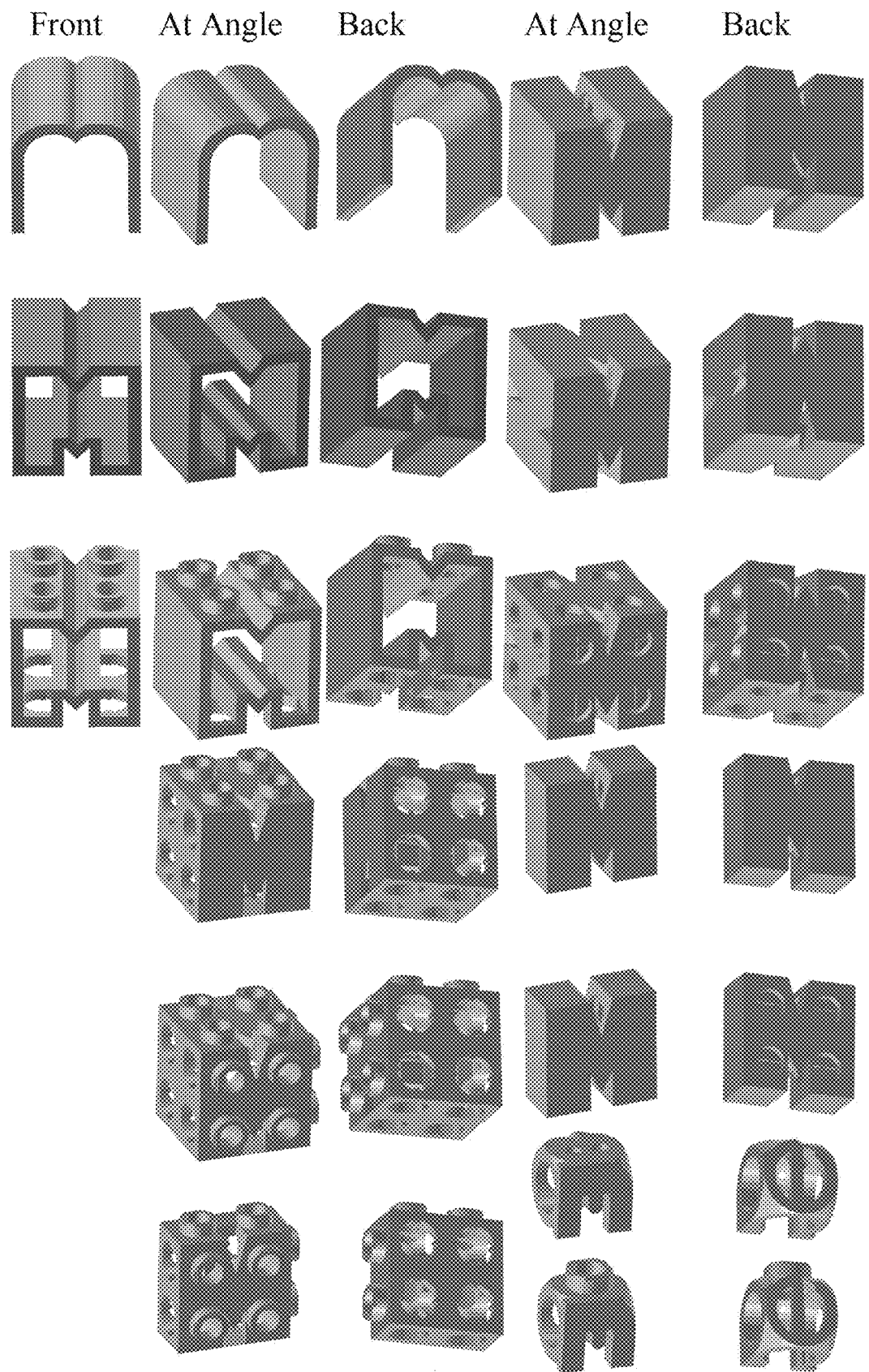
Figure 14:
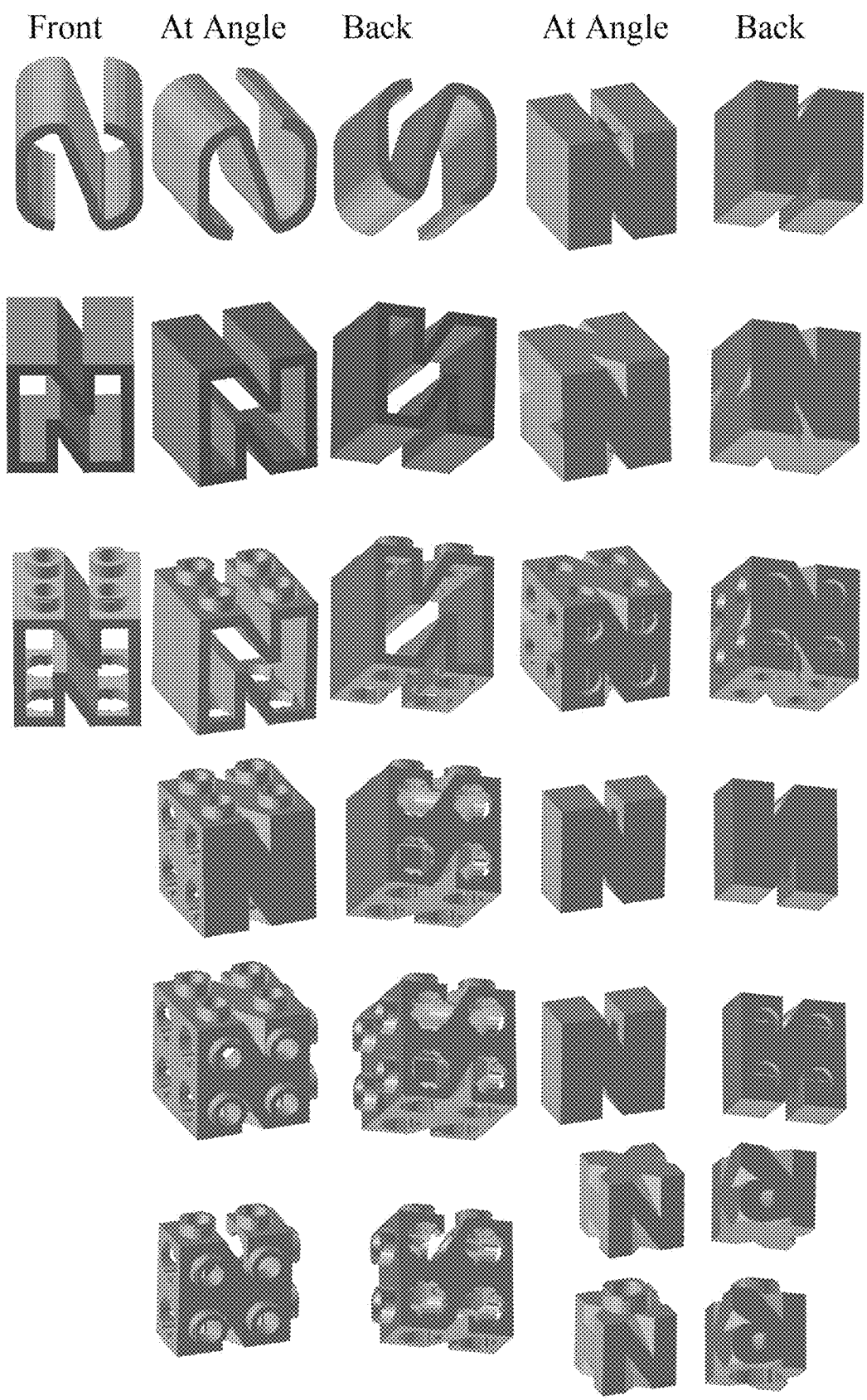
Figure 15:
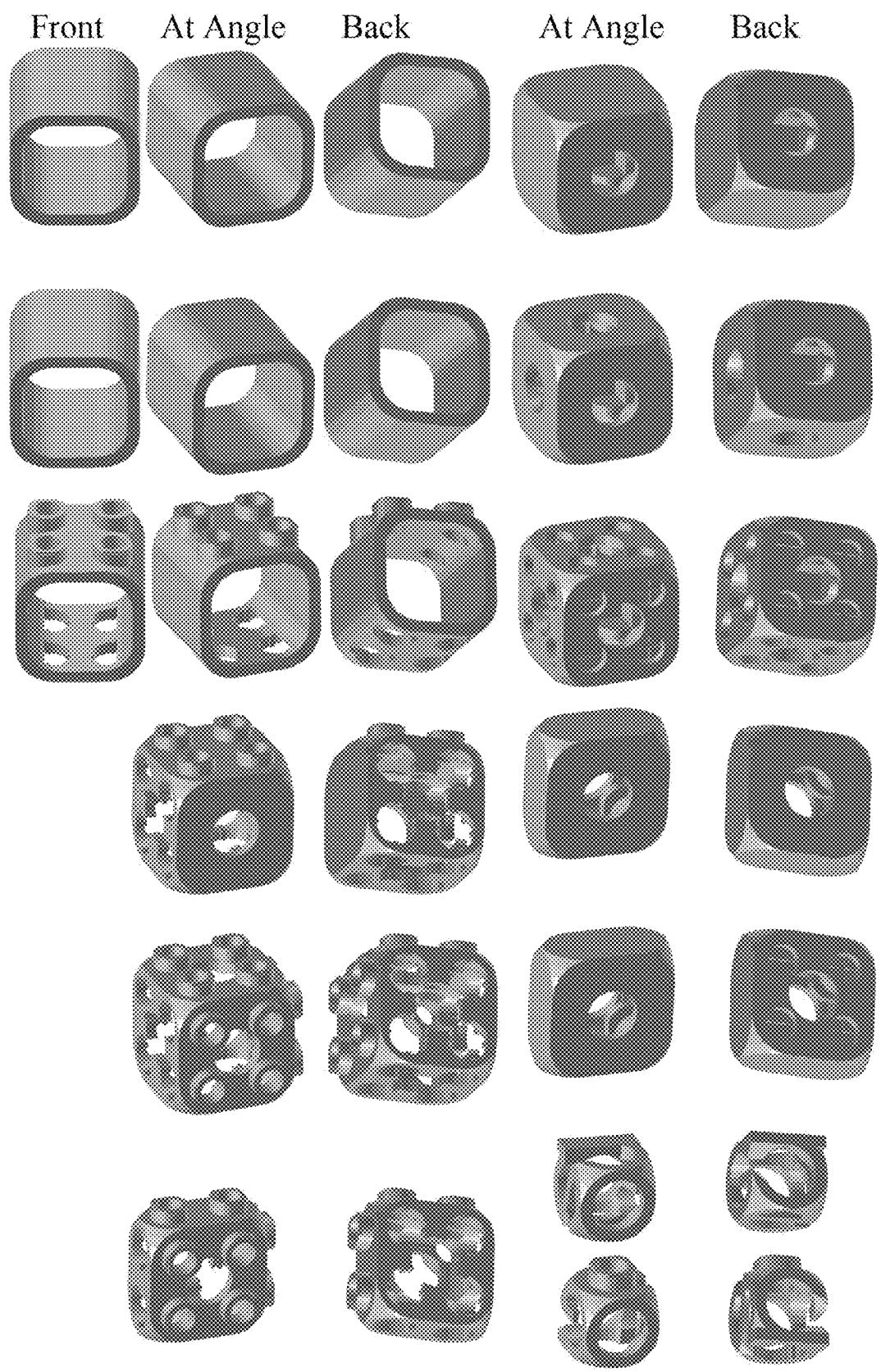
Figure 16:
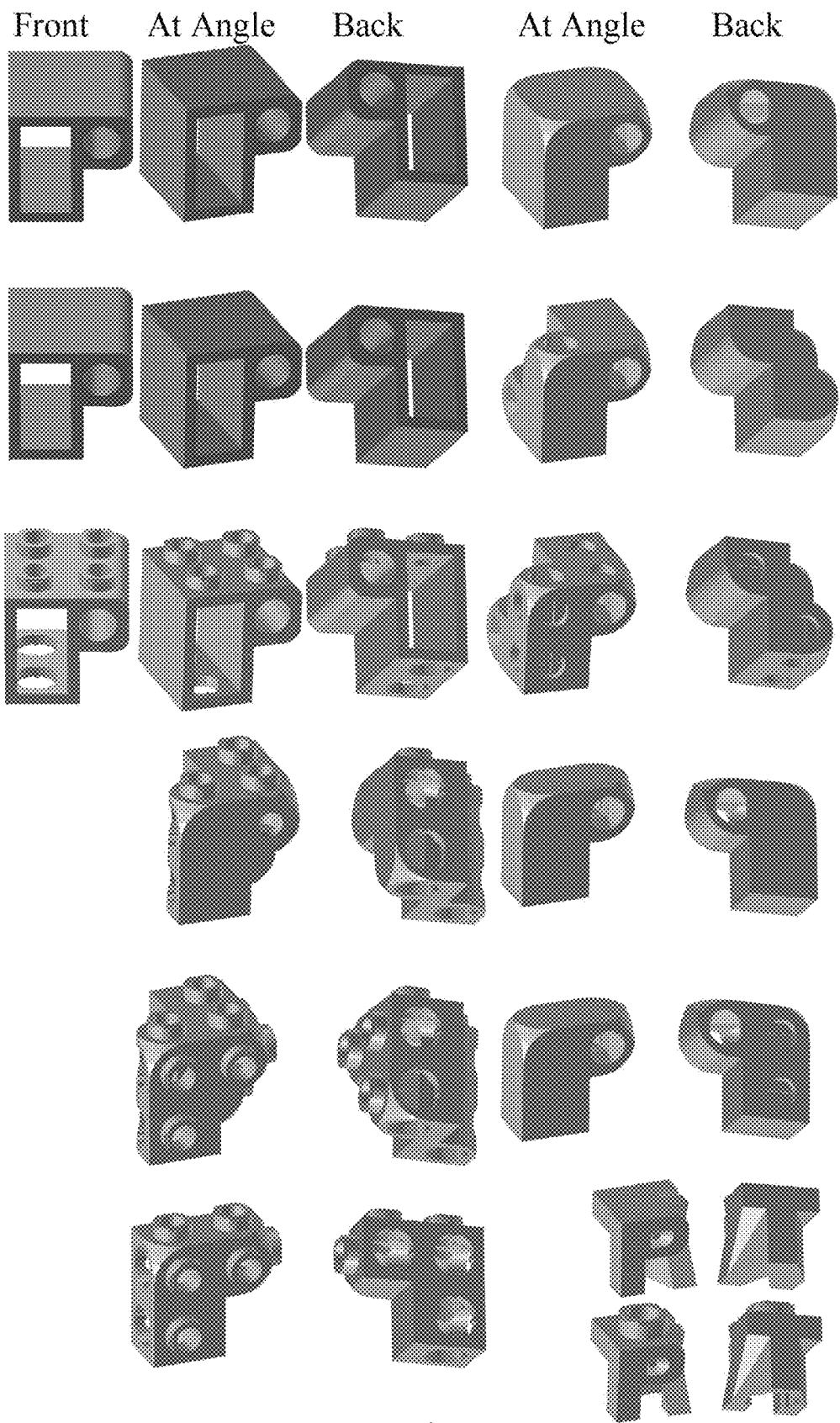
Figure 17:
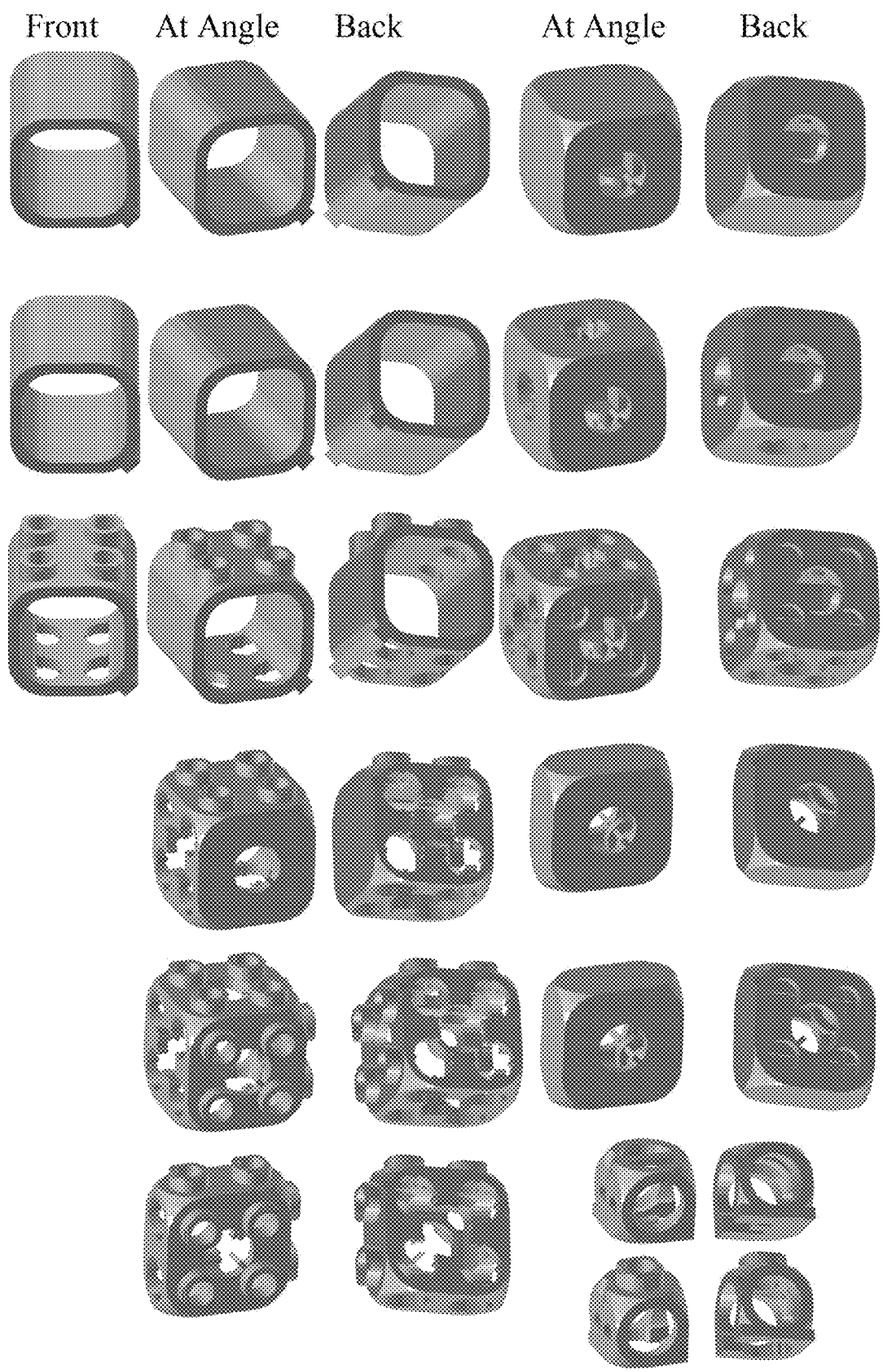
Figure 18:
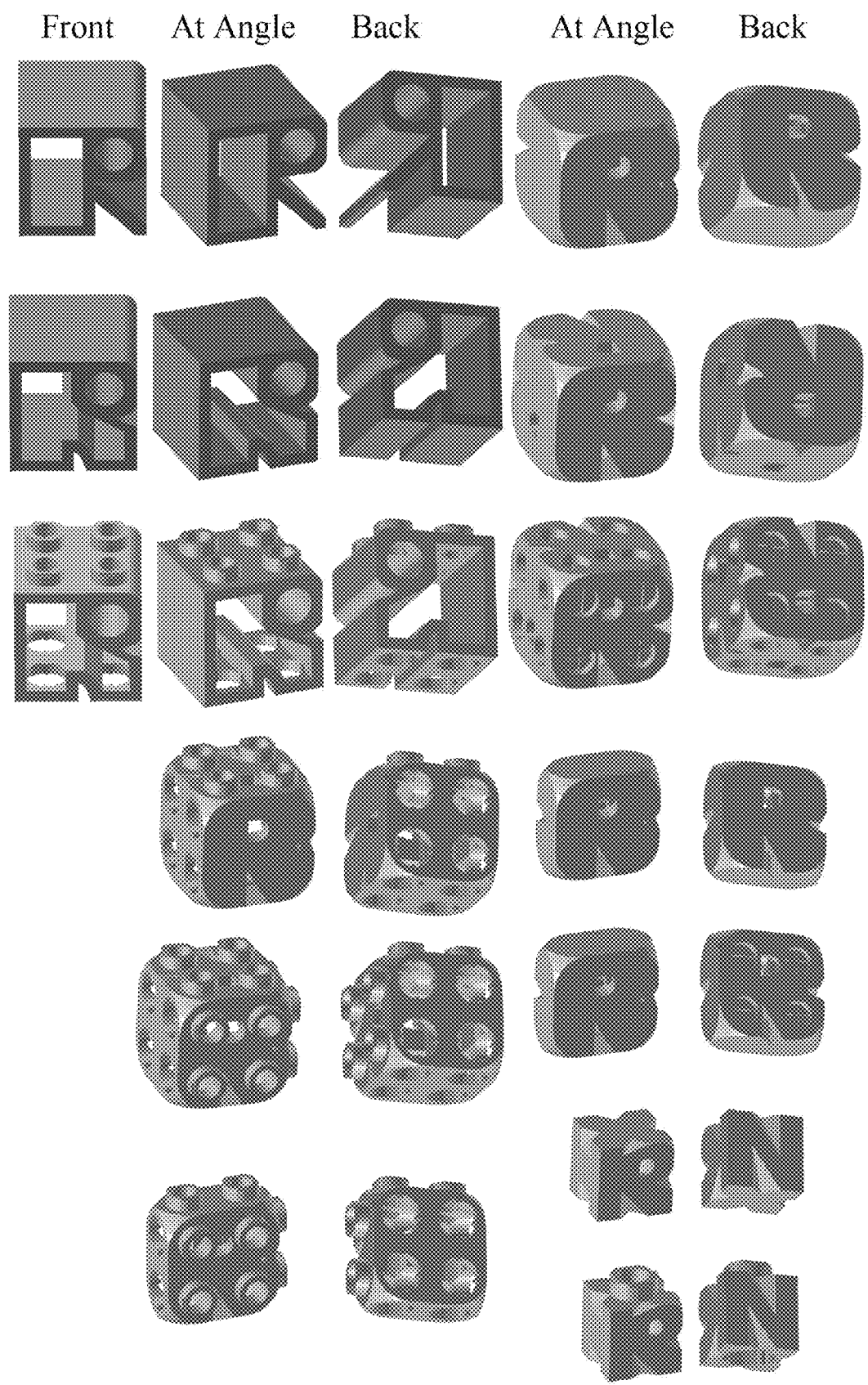
Figure 19:
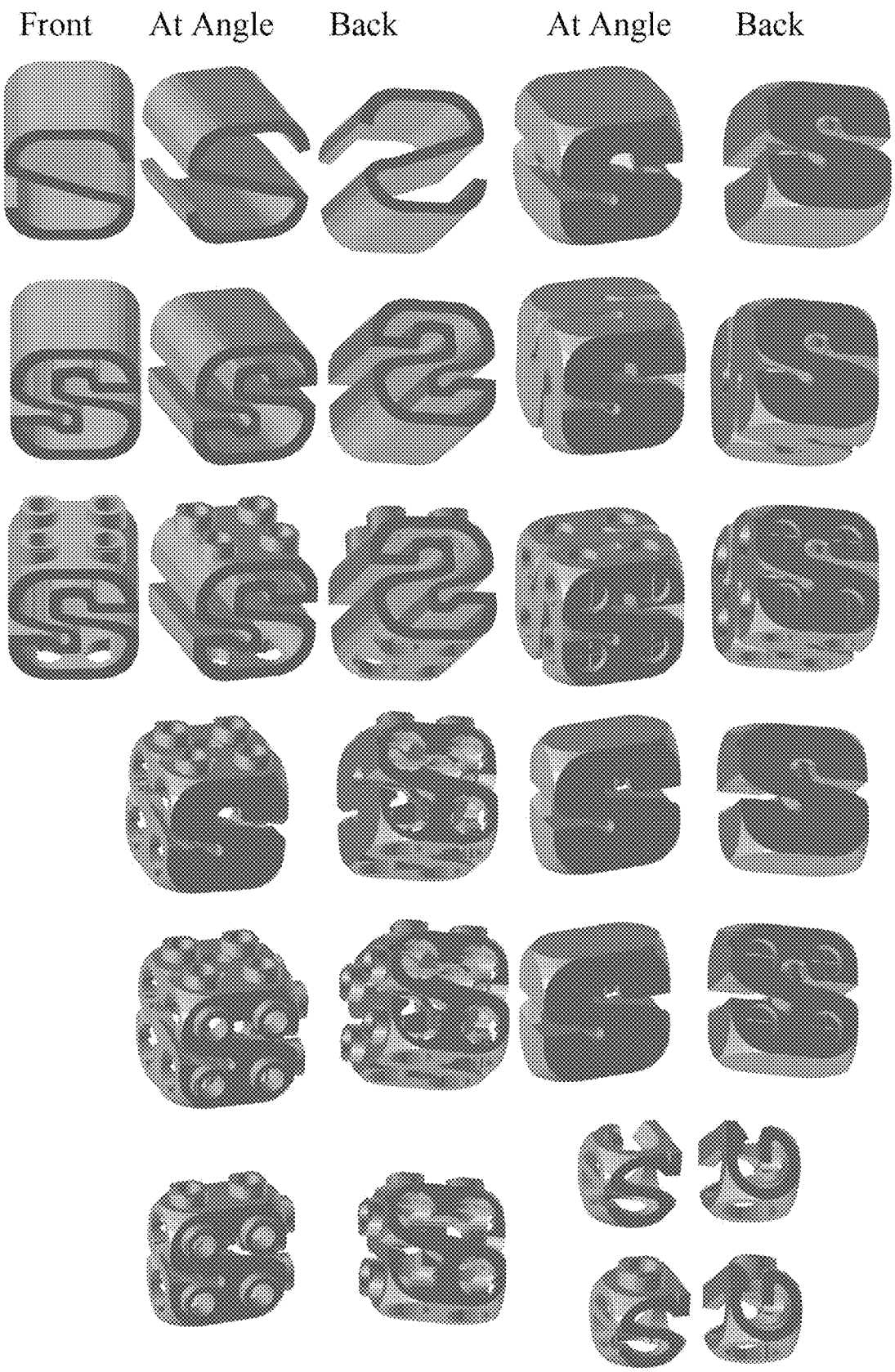
Figure 20:
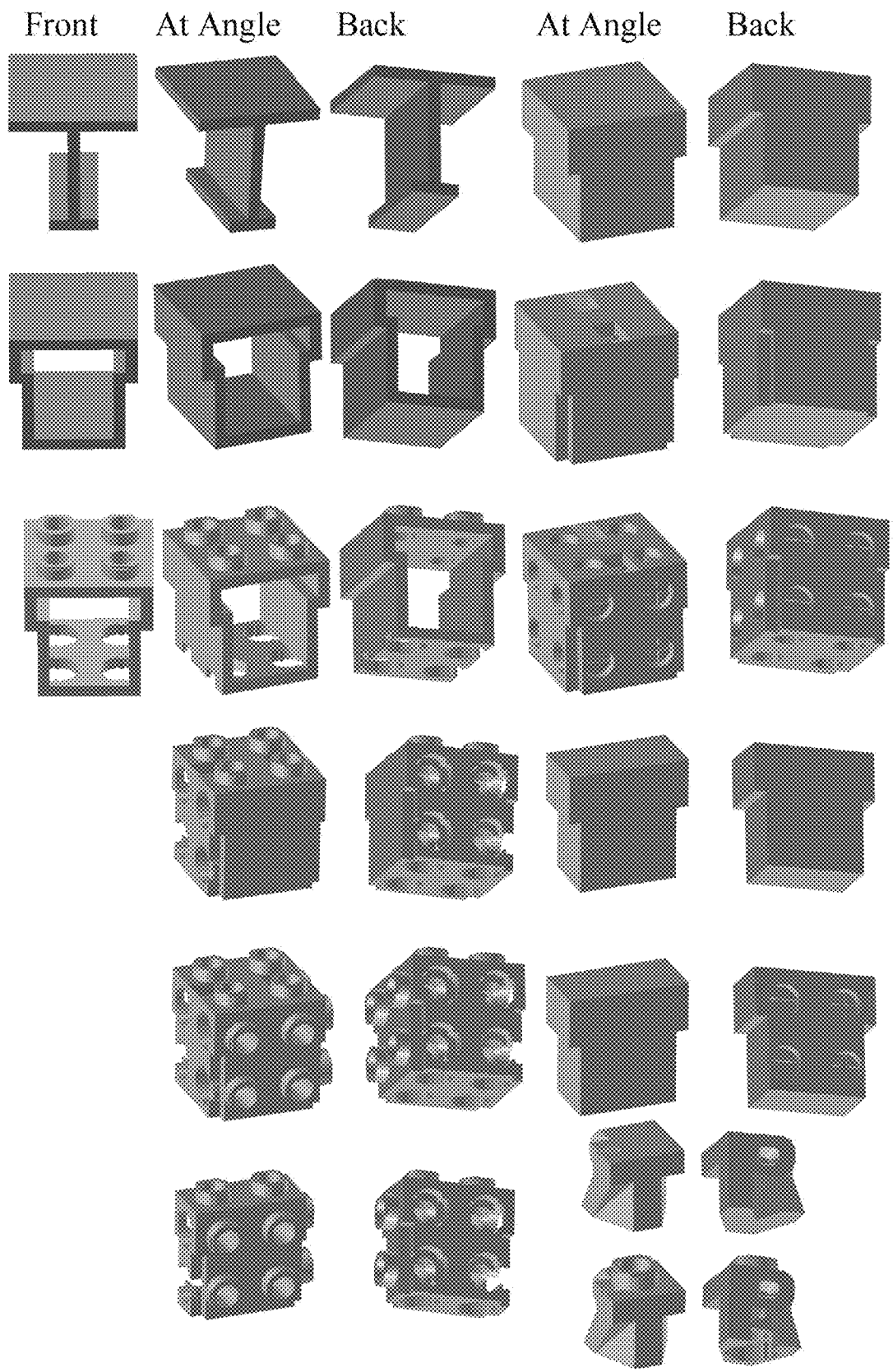
Figure 21:
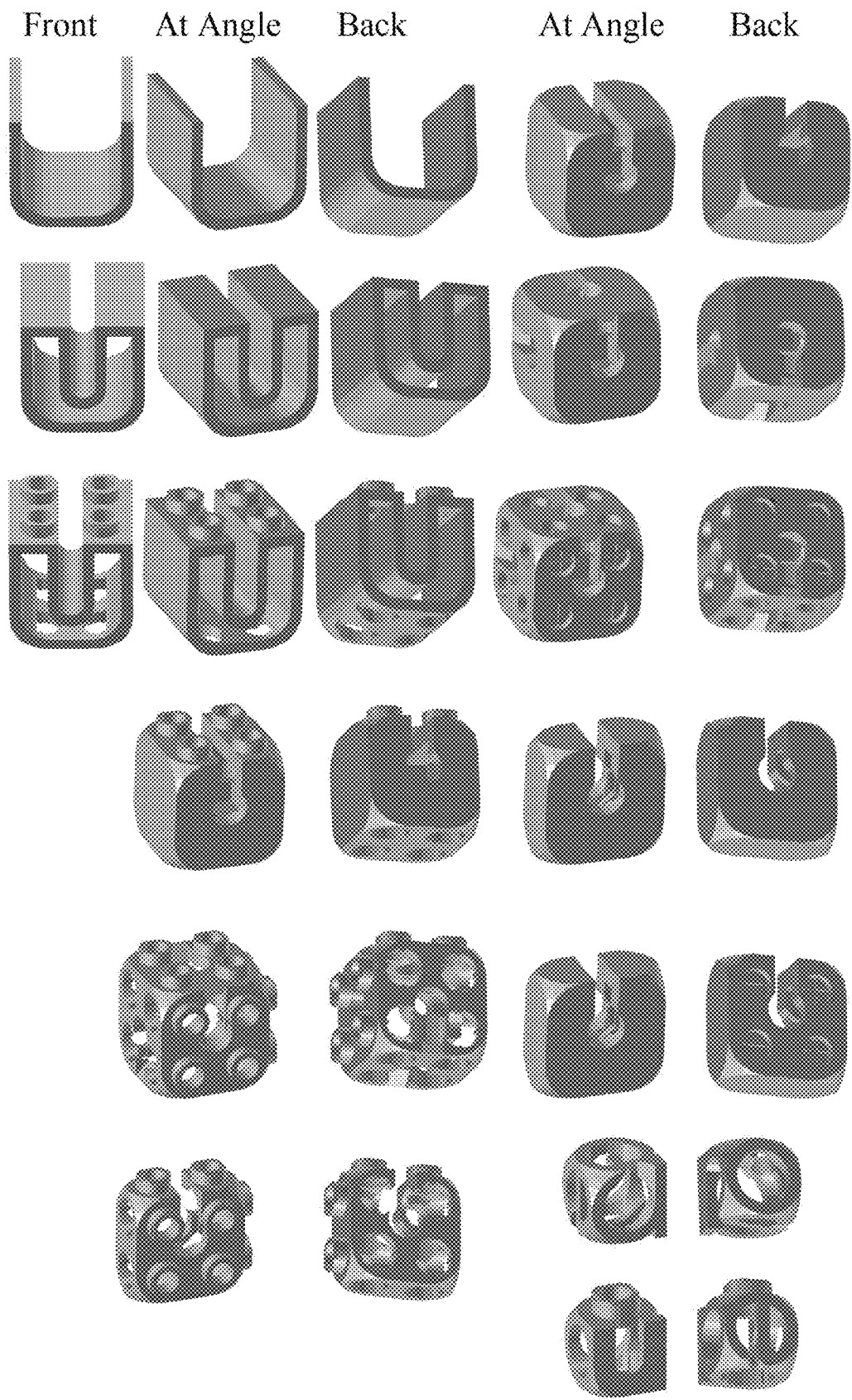
Figure 22:
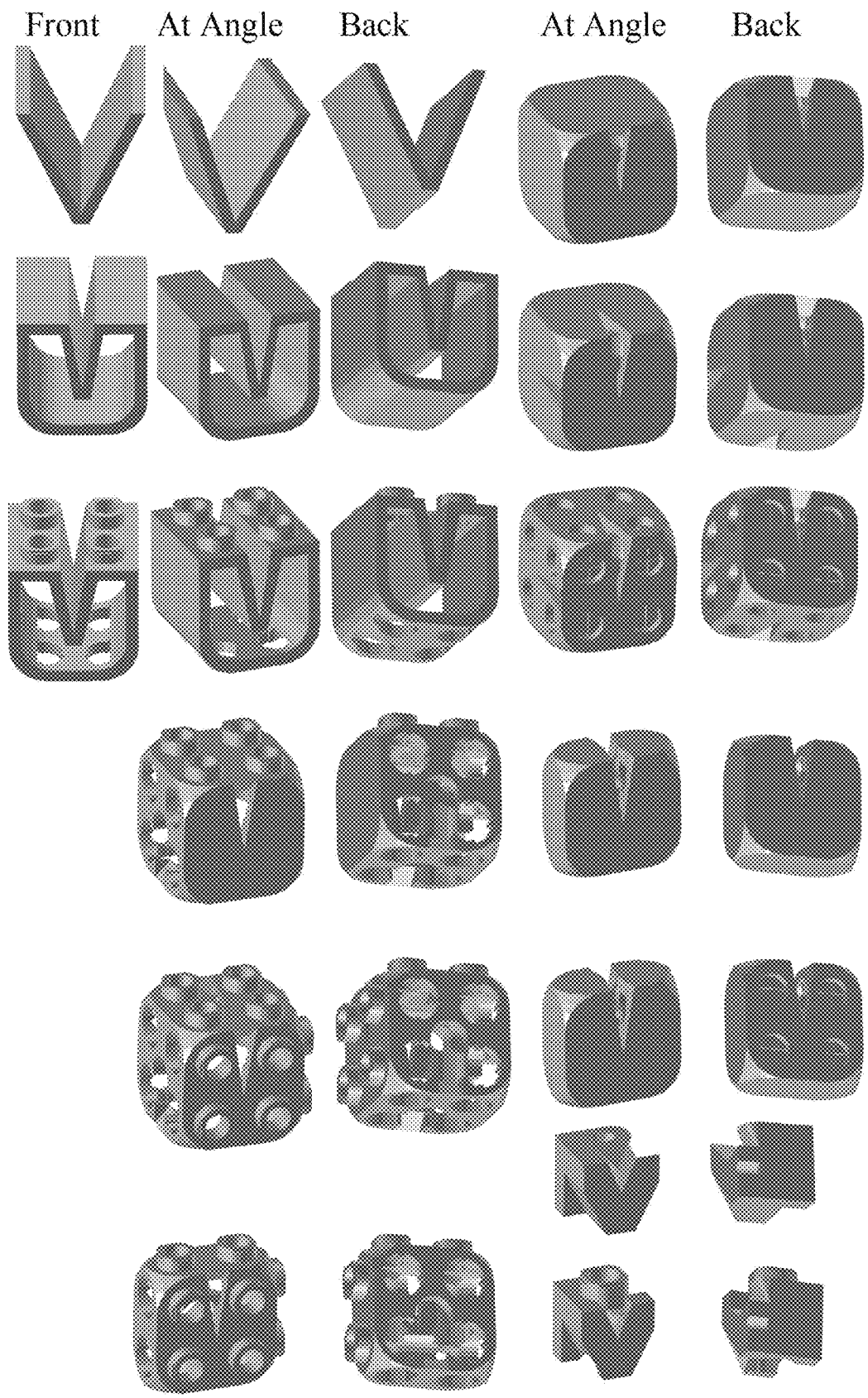
Figure 23:
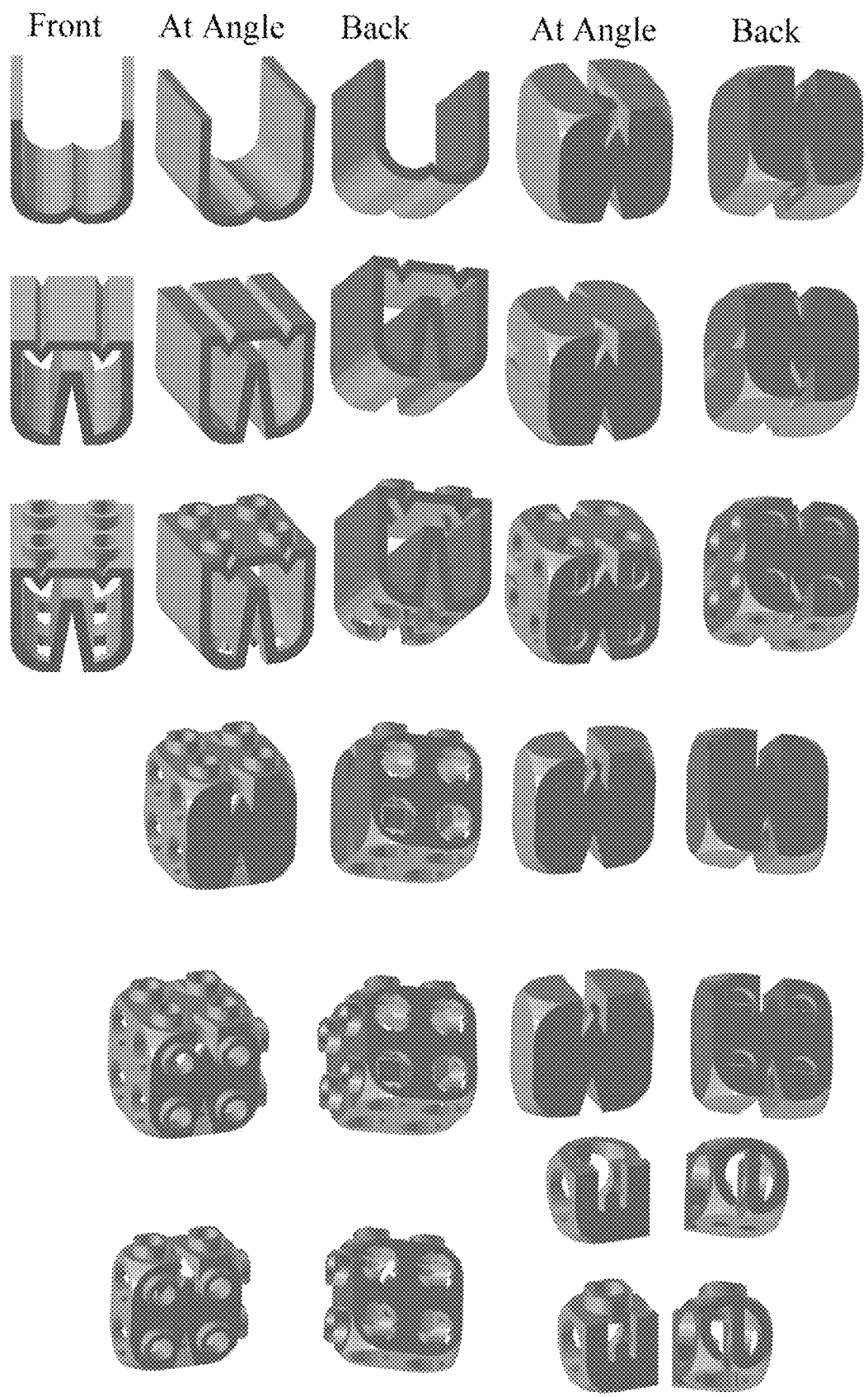
Figure 24:
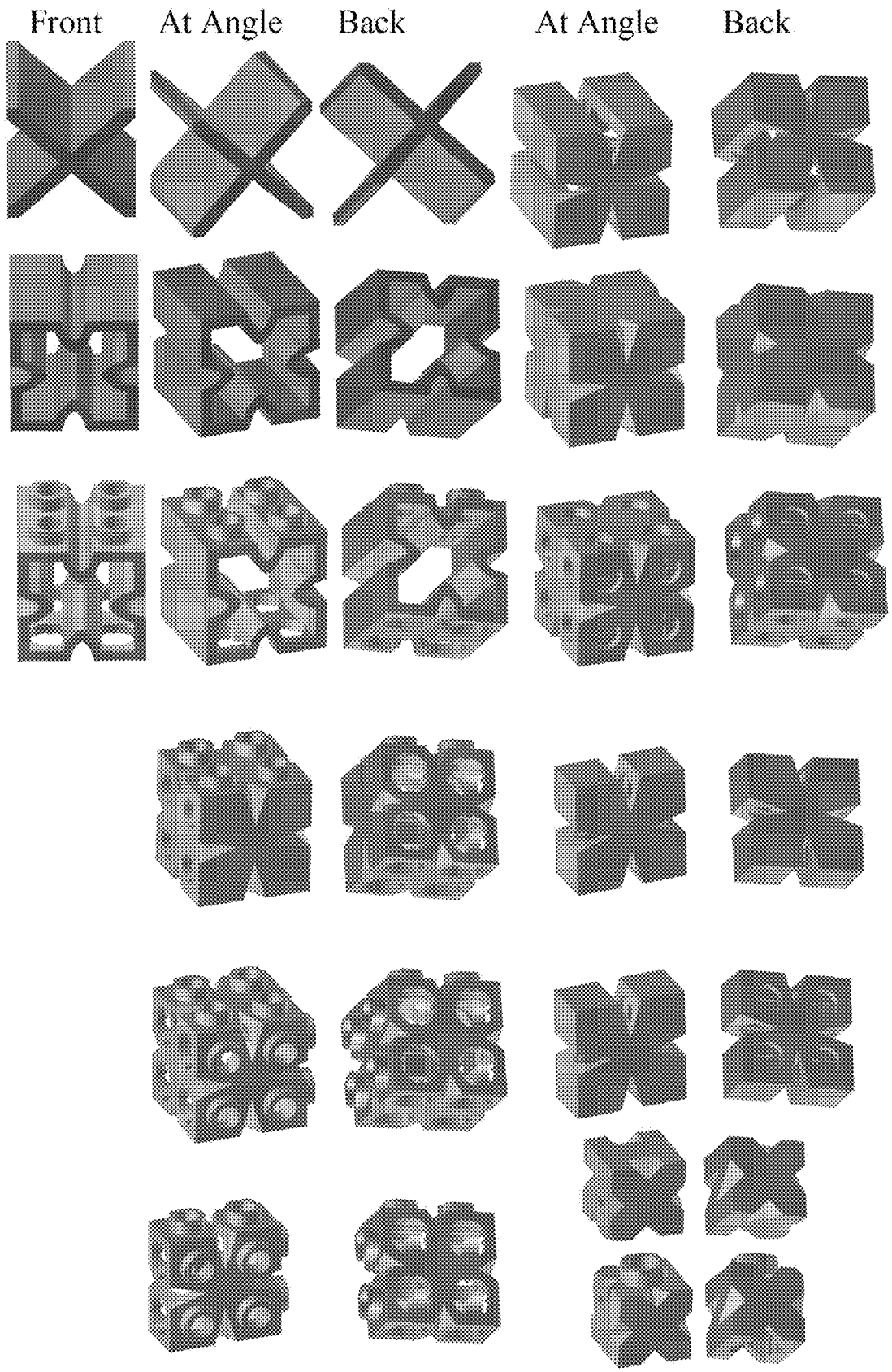
Figure 25:
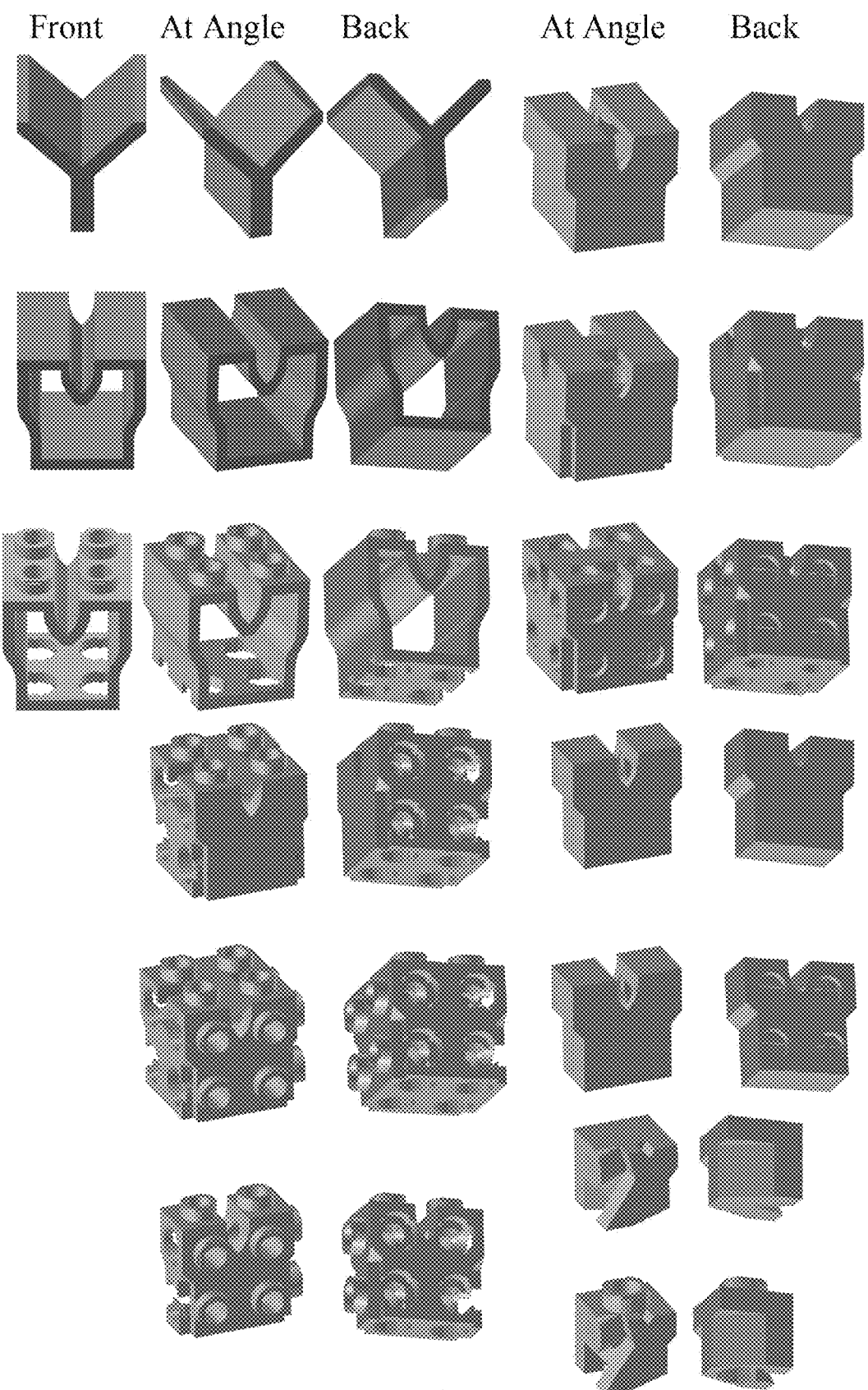
Figure 26:
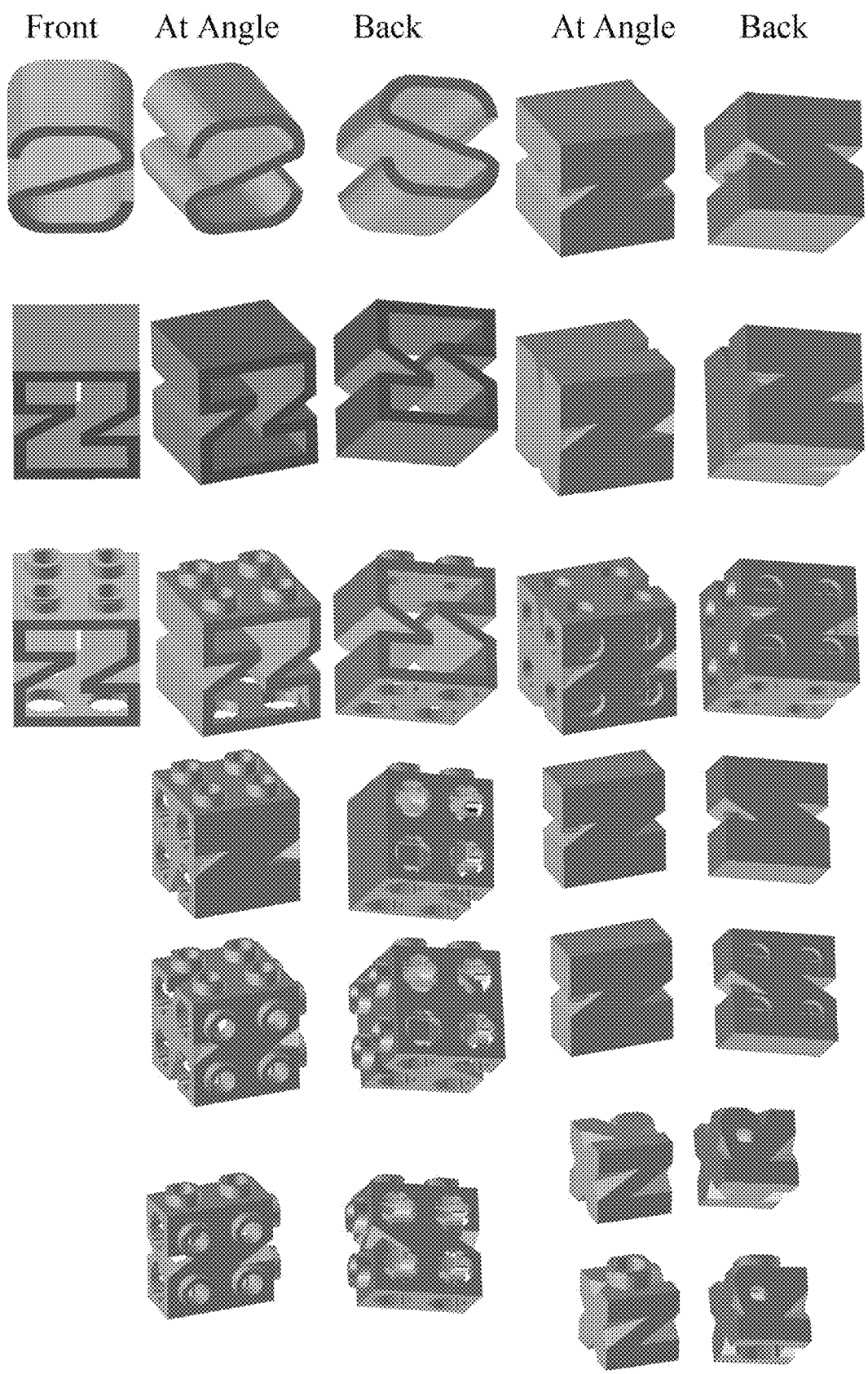
Figure 68:
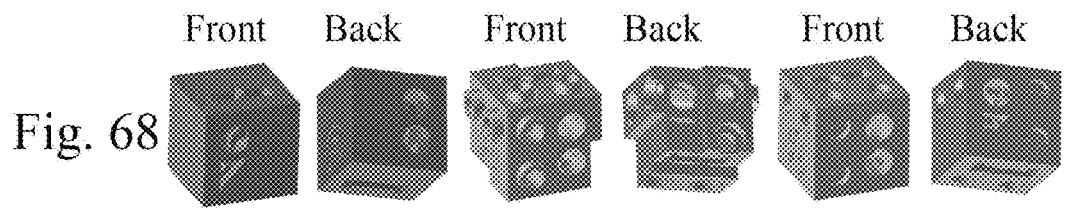
Figure 69:
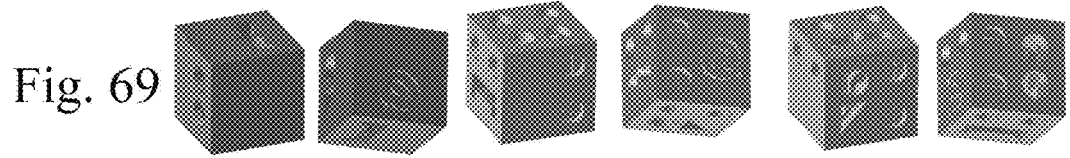

Elements 1 through 29 on FIG. 1 are labels for each specific part of the alphabets that make up the invention. These pieces occupy equilateral cubes where the height, width and depth of each piece is the same. A key part of the Invention is that it is built on ratios and not specific sizes. In other words, the overall dimension of each cube is 1:1:1, where the height, width and depth are all the same. Each additional feature of each block is defined by its relationship to the rest of the piece. For example, the knobs on the pieces in FIG. 1 are roughly one fourth (or 1:4) the length of each side of each cube. The diameter of the inner holes of the hollow knobs is roughly one half the size of the diameter of the knobs. The rest of the alphabet features are subservient to the male and female knob dimensions. The middle of the letter "A" at element 20 for example, shows the letter "A" while also leaving enough room for the four male knobs on the face of the piece. The alphabets are arranged so that they are as readable as possible while also giving the required space to the knob holes.

Those knob holes, which when connected throughout the Invention comprise a lattice, are also conduits for reinforcement beams, wires, pipes, pieces that lock or latch pieces together, and for vehicles or tubes that carry additional pieces, goods, or people throughout structures.

At the top of the page of FIG. 1 are labels for the vertical rows of cubes below the labels. All cubes below the first label "Front" are front views of certain of the Invention's iterations of the letter "A." The first three columns below the labels (labels "Front" "At Angle" and "Back") are one kind of cube font and the last two columns (labeled "At Angle" and "Back") are additional cube fonts.

At element 1 is a simplified version of the letter "A" that follows the Invention's parameters. This simplified letter "A" can have the lattice mentioned above carved into it so that beams, nobs and other interfaces can be used in connection with it. For simplicity sake, not every permutation of every piece is shown but an observer can readily appreciate how the pieces shown can be adapted to work with the Invention's lattice going through the inside of every piece.

Every piece also can be magnetized so that all surfaces (whether knobs or flat surfaces) can have positive charges on or near locations with positive protrusions on the pieces and negative charges on and near the places with indentations. With this combination of positive and negative charges, the system can be assembled magnetically, even if there are fully flat surfaces involved.

Elements 2 and 3 are slightly different views of the same simplified letter "A" for the viewer to get a better idea of exactly what dimensional space it occupies.

Element 4 contains the letter "A" in the front part of the cube and that shape is repeated on the back side of the cube as shown in element 5.

Element 6 is an outline of the letter "A" in a view from the front that efficiently uses building material while being strong at the same time by using the tensile strength of materials.

For example, when made of metal it can be placed face up on the floor to convey a message and to be a grate that provides traction, allows water to settle, and that can be a metal rug that people can clean their shoes on. Element 6 is a more bulky and more stable version of the simple font in element 1.

Elements 7 and 8 are different views of the letter "A" in element 6. At the top of the page. Because the letter "A" fully fills up the equilateral cube space, it is stable no matter what side it rests on. For example, the "A" can rest upright, on its front and back sides, on its lateral sides, and on its top.

Element 9 is a cube with the letter "A" on all six of its sides as can be seen on the front three sides shown in element 9 and in the back three sides in element 10.

Element 11 is a continuation of the font concept in element 6 because it has male knobs at the top and female knobs on the bottom. The core font design has the flexibility to allow these knobs to be reversed (so that the male knob is on the bottom and the female one is on the top) and also to have these knobs on the sides of the font. Furthermore, the front and back of the font serve as female knob interfaces in their current configuration.

Elements 12 and 13 are different views of the letter "A" in element 11.

Elements 14 and 15 are different views of a cube that is similar to the cube in elements 9 and 10 except the cube of elements 14 and 15 has recessed cylinders in each of its sides so that magnets can be inserted. For simplicity, the positive side of the magnets can track the male sides of the cubes at elements 20 and 24 while the negative sides of the magnets can track the indented sides of the cubes at elements 20 and 24. By using magnets the cubes can be made of recycled matter or of a low-grade building material because their construction is more simple and does not have to be as sturdy, precise or durable as other designs. All cubes can be magnetized and held together magnetically without necessarily having recessed places for the magnets.

Element 16 describes a cube with "A" on the front, male knobs on the top and recessed knob interfaces on the bottom that allow for the cubes to be stacked. Element 17 is a back view of the same cube.

Element 18 is similar to the cube at element 4 except its depth is half the distance of its height and width. This makes it more compact and more pieces can stack vertically when it is placed in a horizontal orientation. Element 19 is a view of the back side of the same cube.

Element 20 is similar to the cube at element 9 except the cube at element 20 has three sides with male knobs and three sides with recessed places that hold the male knobs. This allows constructions in every direction of the three dimensions: up and down, sideways, and front and back. Element 21 is the back of the same cube as element 20.

Elements 22 and 23 are similar to the cube at elements 18 and 19 except the cube at elements 22 and 23 have recessed areas for magnets on the back side of the font. This allows them to be placed on metal or magnetic surfaces, like magnets on a refrigerator for example.

Elements 24 and 25 are the front and back side of a cube that is similar to the cube in elements 20 and 21 except the cube at elements 24 and 25 has half the depth as the other cube.

Elements 26 and 27 are mostly lower-case letters arranged in a cube format (with the height, width and depth all the same length). The lower-case letter "a" appears at the front of the cube in element 26 but does not appear on the back side of the cube in element 27 because the remainder of the cube is made up of different letters in different positions. The positions of the letters relative to each other to form the cube are to maximize the compatibility of their interconnections. For example, rounded parts of the letter "a" join up with rounded parts of the letter "e" and a pointed part of the letter "a" aligns with a pointed part of the letter "B" on the top surface of the cube at element 26.

Elements 28 and 29 are a cube with lower-case "a" that also has a knob at the top and a recessed area on the bottom into which a male knob can be placed. The letter can therefore be stacked with knobs securing the stacked cubes.

FIGS. 2 through 26 follow the same logic and pattern for the rest of the alphabet (letters "B" through "Z") as the letter "A" in FIG. 1.

FIGS. 27 through 34 follow the same general logic for pieces with multiple letters in one cube and FIGS. 35 through 69 follow the same general logic with regard to numbers and punctuation.

Figure 70A:
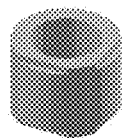
FIG. 70A is a hollow knob that can unite two pieces that have female knob interfaces.
Figure 70B:
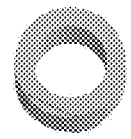
FIG. 70B is a top view of FIG. 70A.
Figure 70C:
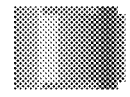
FIG. 70C is a side profile view of FIG. 70A.
Figure 71A:
FIG. 71A is a curved hollow knob that can unite two pieces that have female knob interfaces.
Figure 71B:
FIG. 71B is a side view of FIG. 71A.
Figure 72A:
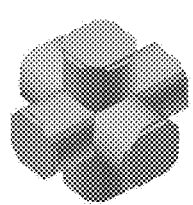
FIG. 72A is a piece with six knobs sticking out, each at perpendicular angles to the other knobs.
Figure 72B:
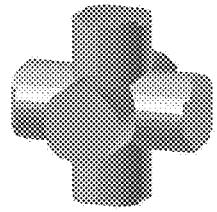
FIG. 72B is another view of FIG. 72A.
Figure 72C:
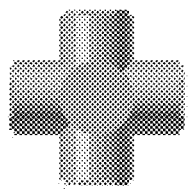
FIG. 72C is a side profile view of FIG. 72A.
Figure 71C:
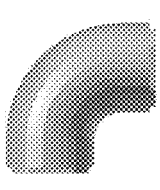
FIG. 71C is another side view of FIG. 71A.
Figure 71D:
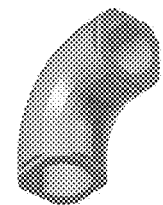
FIG. 71D is a bottom view of FIG. 71A.
Figure 73A:
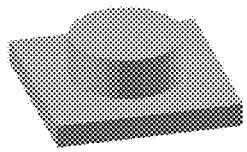
FIG. 73A is a knob on a surface that can make a female knob interface look smoother.
Figure 73B:
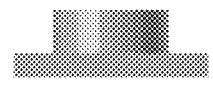
FIG. 73B is a side profile view of FIG. 73A.
Figure 73C:
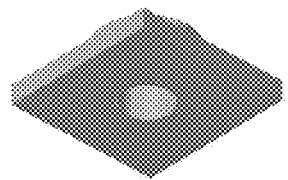
FIG. 73C is a view of the bottom of FIG. 73A.
Figure 74:
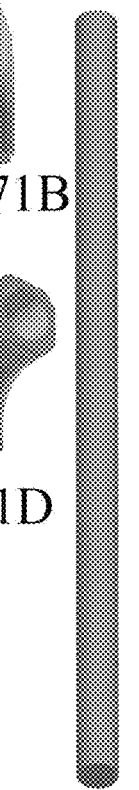
FIG. 74 is a pole that goes through the hollow male and female knobs on the other pieces to reinforce or to hold them together.
Figure 75A:
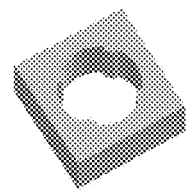
FIG. 75A is a square with a female knob interface that can go on top of male knobs to make them look smoother.
Figure 75B:
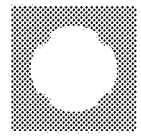
FIG. 75B is a profile view from the top of FIG. 75A.
Figure 76A:
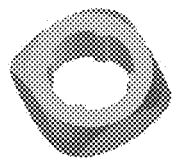
FIG. 76A is similar to FIG. 75A except it is built with less material because the edges are rounded.
Figure 76B:
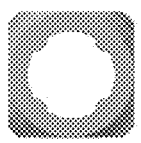
FIG. 76B is a top profile view of FIG. 76A.
Figure 77A:
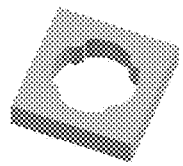
FIG. 77A is similar to FIG. 75A except it has lower height.
Figure 77B:
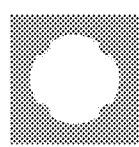
FIG. 77B is a top profile view of FIG. 77A.
Figure 78A:
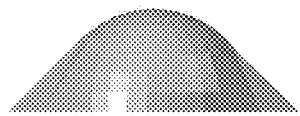
FIG. 78A is a side profile view of FIG. 78B.
Figure 78B:
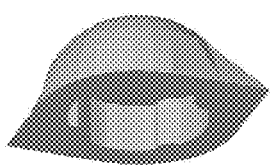
FIG. 78B is a female knob interface with a spherical and pointed surface on two ends of the piece.
Figure 79A:
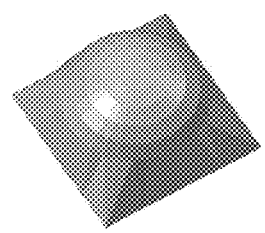
FIG. 79A is a female knob interface with a spherical top that extends down to a square base.
Figure 79B:
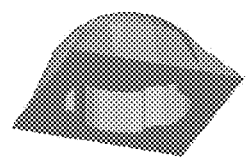
FIG. 79B is a bottom view of FIG. 79A.
Figure 80A:
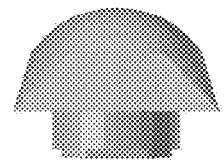
FIG. 80A is a side profile view of FIG. 80B.
Figure 80B:
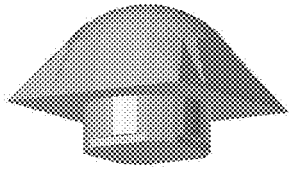
FIG. 80B is similar to FIG. 79A except it is a male knob.
Figure 79C:
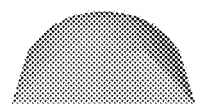
FIG. 79C is a profile view from a side of FIG. 79A.
Figure 81A:
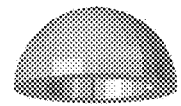
FIG. 81A is similar to FIG. 78A except the surface is fully spherical and is not pointed.
Figure 81B:
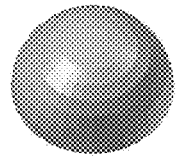
FIG. 81B is a top view of FIG. 81A.
Figure 82A:
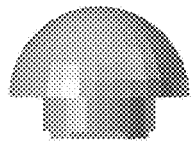
FIG. 82A is a side profile view of FIG. 82B.
Figure 82B:
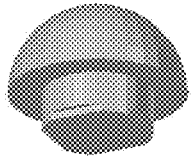
FIG. 82B is similar to FIG. 81A except it is a male knob.
Figure 83A:
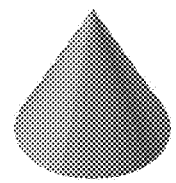
FIG. 83A is a female knob piece with a conical pointed top.
Figure 83B:
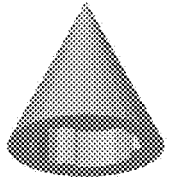
FIG. 83B is a bottom view of FIG. 83A.
Figure 119A:
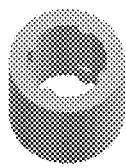
FIG. 119A is a building block with female knobs.
Figure 119B:
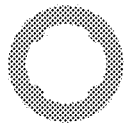
FIG. 119B is another view of FIG. 119A.
Figure 120A:
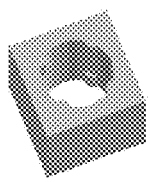
FIG. 120A is a building block with female knobs.
Figure 120B:
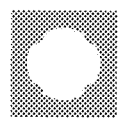
FIG. 120B is a profile view from an end of FIG. 120A.
Figure 121A:
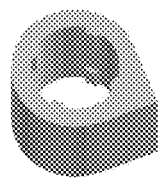
FIG. 121A is a building block with female knobs.
Figure 121B:
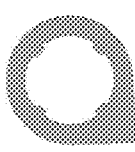
FIG. 121B is a profile view from an end of FIG. 121A.
Figure 122A:
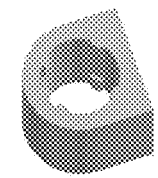
FIG. 122A is a building block with female knobs.
Figure 122B:
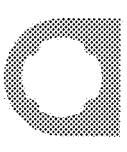
FIG. 122B is a profile view from an end of FIG. 122A.
Figure 123A:
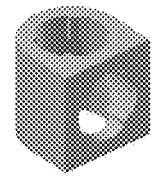
FIG. 123A is a building block with female knobs.
Figure 123B:
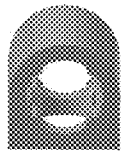
FIG. 123B is a different view of FIG. 123A.
Figure 124A:
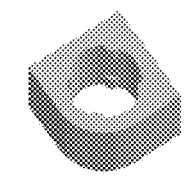
FIG. 124A is a building block with female knobs.
Figure 124B:
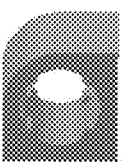
FIG. 124B is a different view of FIG. 124A.
Figure 125A:
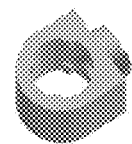
FIG. 125A is a is a building block with a male knob and female knobs.
Figure 125B:
FIG. 125B is a different view of FIG. 125A.
Figure 133A:
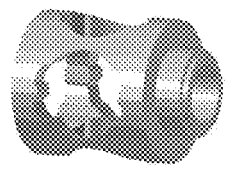
FIG. 133A is another cylinder cube.
Figure 133B:
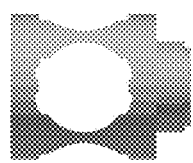
FIG. 133B is another view of FIG. 133A.
Figure 134A:
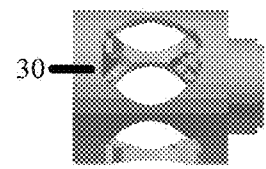
FIG. 134A is a cylinder cube.
Figure 134B:
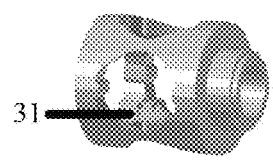
FIG. 134B is another view of FIG. 134A.
Figure 135A:
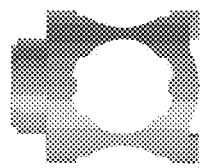
FIG. 135A is a profile view of FIG. 135B.
Figure 135B:
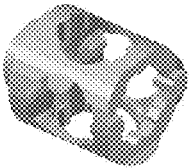
FIG. 135B is another cylinder cube.
Figure 136A:
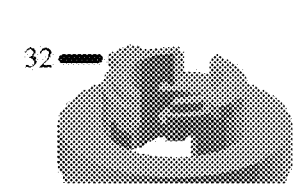
FIG. 136A is a close-up view of the hook on FIG. 136B.
Figure 136B:
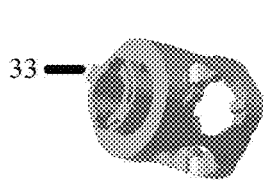
FIG. 136B is a cylinder cube with a hook at the front.
Figure 137A:
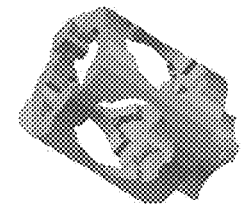
FIG. 137A is another cylinder cube.
Figure 137B:
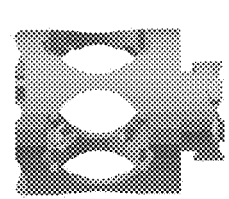
FIG. 137B is another view of FIG. 137A.
Figure 137C:
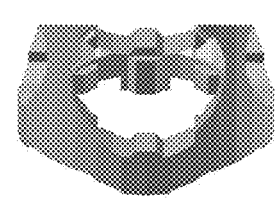
FIG. 137C is a close-up view of the left side of FIG. 137A.
Figure 137D:
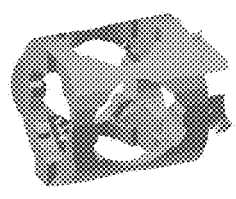
FIG. 137D is another view of FIG. 137A.
Figure 137E:
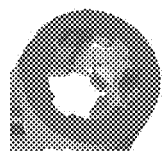
FIG. 137E is a view of an end of FIG. 137A.
Figure 137F:
FIG. 137F is another view of an end of FIG. 137A.
Figure 138A:
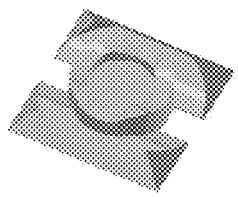
Figure 138B:
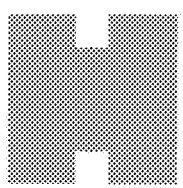
FIG. 138B is a profile view from the bottom of FIG. 138A.

FIGS. 70 through 191 are basic building pieces that follow the same logic as the logic of the alphabets described above. As basic building pieces, they enable alphabet constructions to connect (with knobs at FIG. 70, for example), to connect with more strength (with the reinforcement rod at FIG. 74 for example), have sloped surfaces (FIG. 114 for example) or curved surfaces (FIG. 163).

FIG. 192 is a beam made up of cube shapes that reinforces, extends, or holds a letter construction or other construction together with more strength.

FIG. 193 is a beam with male knobs off set so that the beams can fit into themselves in a reversible manner. The beams can also be stacked one on top of the other.

FIG. 194 is a beam with a hook on the end with which it can pull constructions together with more strength. This hook fits into recessed knob locations of other pieces and of itself.

FIGS. 195 through 205 are panels, curved edges and related pieces with which to build a box that holds the alphabets and other pieces of the Innovation. The box that holds the Innovation is itself part of the building set. The building set therefore does not require packaging or additional boxes. The box (which can be seen in its assembled form at FIGS. 206V, 206W and 206X) is a valuable, functional piece by itself that can also serve as a building block. Beams and knobs can be inserted into the holes on its sides, which are the same as the recessed parts of the cubes that the male knobs fit into and that the poles go through. The boxes can be assembled together with those same knobs and they can be magnetically connected when the panels are magnetized with alternating positive and negative square pieces (this way each positively charged part of the panel is attracted to a negatively charged part of the same panel and pull together to itself in a reversible way).

The fully assembled box in FIGS. 206V, 206W and 206X has the rounded beam that is FIG. 196, the rounded corners that are FIG. 195, and panels with knobs on the edges arranged in a reversible manner (so panels of the same shape fit into themselves: they also fit into the beam with rounded edges that is FIG. 196).

The panels with reversible knobs (they are FIG. 199) that fit into each other and into the edges of the box are shown in FIGS. 206A and 206B.

FIGS. 206C, 206D and 206E are different views of the box in different stages of being assembled to show how the pieces come together to form the box.

FIGS. 206F, 206G and 206H show how the hook and snap beam (which is FIG. 198) hooks to the rounded edges of the box (the rounded edges are FIG. 196) and snaps into place to secure each side of the box. The side of the box that has the swivel door does not necessarily have this hook and snap beam so as to give the door a greater opening; however, it can be placed there to secure the box with more strength. Partially assembled boxes at different stages of assembly with the snap beam with hooks appear in FIGS. 206F, 206G, 206H, 206I, 206J, 206K and 206L.

The box has a door that opens. It is made up of the panel with rounded edges that is FIG.

That swiveling door is held in place by FIG. 203 and locked with FIG. 202 in the manner shown on FIG. 206M. The panel door swivels at element 34 in FIG. 206M and it locked in place with FIG. 202 at element 35 in FIG. 206M. The FIG. 202 locking mechanism swivels up and can be pushed into a locked position as is shown in FIG. 206M at element 35. That locking mechanism can swivel down and be secured inside the panel in the place that is recessed in the panel. A close-up view of the locking mechanism in its unlocked position is shown at FIG. 206O. Element 36 shows the lock stick has been pulled away from the recessed curved side where it hooks. If the lock is pushed up to swivel into the recessed part of the panel, then the box will have all flat sides. The swivel point with the highlighted pole for the door is at element 37 and the highlighted locking mechanism (to show what it looks like beneath the surface of the panel) appears at element 38 in FIG. 206P.

Element 39 in FIG. 206Q shows the locking mechanism in its locked position. The highlighted lock (which is highlighted to show how it appears beneath the surface of the box) shows the lock inserted into the side of the curved edge at element 39 in FIG. 206Q.

FIG. 206R shows the door partially open. FIG. 206S shows the box with the pole at element 40 but without the panel door (for increased clarity). The panel next to the swiveling partially open door is FIG. 205, which has no knobs protruding from it to allow the door to swivel freely. FIG. 205 is secured in place not with its own knobs but with the knob at FIG. 70. The panels on the other sides of the box, which are not on the side of the opening door, are secured in place with their own reversible male knobs because they are FIG. 199.

FIGS. 206T and 206U show different angels of the box with the door open.

FIGS. 206V, 206W and 206X show different views of the box with the door closed.

FIG. 207 contains examples of how the alphabet cubes can be assembled with different kinds of cubes (i.e., cubes held together with knobs, magnets, or simply resting on each other). FIGS. 207E, 207F and 207G show how additional building blocks (beyond just the alphabet blocks) can be assembled and used to strengthen constructions.

The invention claimed is:

1. A block system comprising:
   a plurality of self-standing first, second, third and fourth type blocks;
   each of the first, second, third, and fourth type of blocks generally having a cubic, or multiples of a cubic, shape;
   wherein all of the blocks have knob protrusions on at least one surface and knob recesses on at least another surface so that the plurality of blocks can be assembled into an interconnected construction using the knob protrusions and recesses;
   the first type of block further comprising upper-case alphabet blocks that are the shapes of capital letters in the alphabet and occupy only the positive space of the letters themselves, without occupying any additional space, such that at least one side of the perimeter of the first type of block defines the actual shape of the capital letter;
   the second type of blocks further comprising lower-case alphabet blocks that are the shapes of lower-case letters in the alphabet and occupy the positive space of the letters themselves, without occupying any additional space, such that at least one side of the perimeter of the second type of block defines the actual shape of the lower-case letter;
   the third type of blocks further comprising number blocks that that are the shapes of numbers and occupy the positive space of the number themselves, without occupying any additional space, such that at least one side of the perimeter of the third type of block defines the actual shape of the number,
   and the fourth type of blocks further comprising punctuation blocks having at least one solid surface on the perimeter that occupies the positive space of the block itself, wherein a punctuation mark shape occupies a negative recess within the at least one solid side surface of the fourth type of block;
   and wherein the positive spaces of the blocks also define a hollow cavity such that the plurality of blocks are configured to also be assembled by joining the blocks with sticks, nails, poles, hooks, snaps, screws or magnets.

2. A modular block system comprising:
   (a) the block system of claim 1; and
   (b) a plurality of cylindrical shapes that assemble into constructions and that are compatible with the block system of claim 1;
   wherein the cylindrical shapes also have knob protrusions and recesses such that the block system and the plurality of cylindrical shapes can be assembled into the interconnected constructions using the knob protrusions and recesses;
   and wherein the plurality of cylindrical shapes also define a hollow cavity such that the plurality of cylinder shapes are configured to also be assembled by joining the cylinders with sticks, nails, poles, hooks, snaps, screws or magnets.

3. A kit comprising:
   (a) the block system of claim 1; and
   (b) a puzzle system comprising objects that assemble into a box shape to hold the pieces of the block system of claim 1;
   wherein the objects further comprise at least five knob panels, each knob panel having two flat faces and four side surfaces connecting the two flat faces, and a grid of knob recesses within the flat face;
   wherein the side surfaces have knob protrusions aligned in an offset manner that allows an interconnection of adjacent knob panels at a perpendicular angle such that the box shape may be formed;
   and a top knob panel completing the box shape, wherein the top knob panel has a door allowing access to the inside of the box.

* * * * *